(12) United States Patent
Byrne

(10) Patent No.: US 8,496,492 B2
(45) Date of Patent: Jul. 30, 2013

(54) MODULAR POWER DISTRIBUTION ASSEMBLY WITH MULTIPLE CIRCUITS

(76) Inventor: Norman R. Byrne, Ada, MI (US)

( * ) Notice: Subject to any disclaimer, the term of this patent is extended or adjusted under 35 U.S.C. 154(b) by 0 days.

(21) Appl. No.: 12/814,792

(22) Filed: Jun. 14, 2010

(65) Prior Publication Data

US 2011/0021050 A1    Jan. 27, 2011

Related U.S. Application Data

(60) Provisional application No. 61/186,882, filed on Jun. 14, 2009.

(51) Int. Cl.
*H01R 4/60* (2006.01)
(52) U.S. Cl.
USPC .......................................... 439/215; 439/210
(58) Field of Classification Search
USPC ................................ 439/207–216
See application file for complete search history.

(56) References Cited

U.S. PATENT DOCUMENTS

| | | | |
|---|---|---|---|
| 1,187,010 A | 6/1916 | Rodrigues | |
| 2,540,575 A | 2/1951 | Finizie | |
| 4,135,775 A | 1/1979 | Driscoll | |
| 4,382,648 A | 5/1983 | Propst | |
| 4,551,577 A | 11/1985 | Byrne | |
| 4,959,021 A | 9/1990 | Byrne | |
| 5,013,252 A | 5/1991 | Nienhuis | |
| 5,073,120 A | 12/1991 | Lincoln | |
| 5,096,431 A | 3/1992 | Byrne | |
| 5,096,434 A | 3/1992 | Byrne | |
| 5,164,544 A | 11/1992 | Snodgrass | |
| 5,178,555 A | 1/1993 | Kilpatrick | |
| 5,259,787 A | 11/1993 | Byrne | |
| 7,114,972 B1 * | 10/2006 | Riner | 439/215 |
| 2006/0024996 A1 * | 2/2006 | Johnson et al. | 439/215 |
| 2009/0130879 A1 * | 5/2009 | Johnson et al. | 439/215 |

* cited by examiner

*Primary Examiner* — Neil Abrams
*Assistant Examiner* — Travis Chambers
(74) *Attorney, Agent, or Firm* — Varnum, Riddering, Schmidt & Howlett LLP

(57) ABSTRACT

A modular power distribution system (110) comprises an incoming power cable (118) adapted to connect to jumper cable assemblies (140) having female end connectors (142) and jumper cables (148) connecting together the female end connectors. Junction blocks (150) are connectible to the jumper cable assemblies (140) and are adapted to provide for multiple circuits. Electrical receptacle blocks (152) are adapted to electrically connect to the junction blocks (150), and are configured so as to electrically connect to one of the multiple circuits.

1 Claim, 65 Drawing Sheets

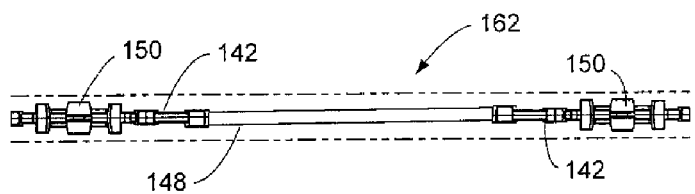
Fig. 7
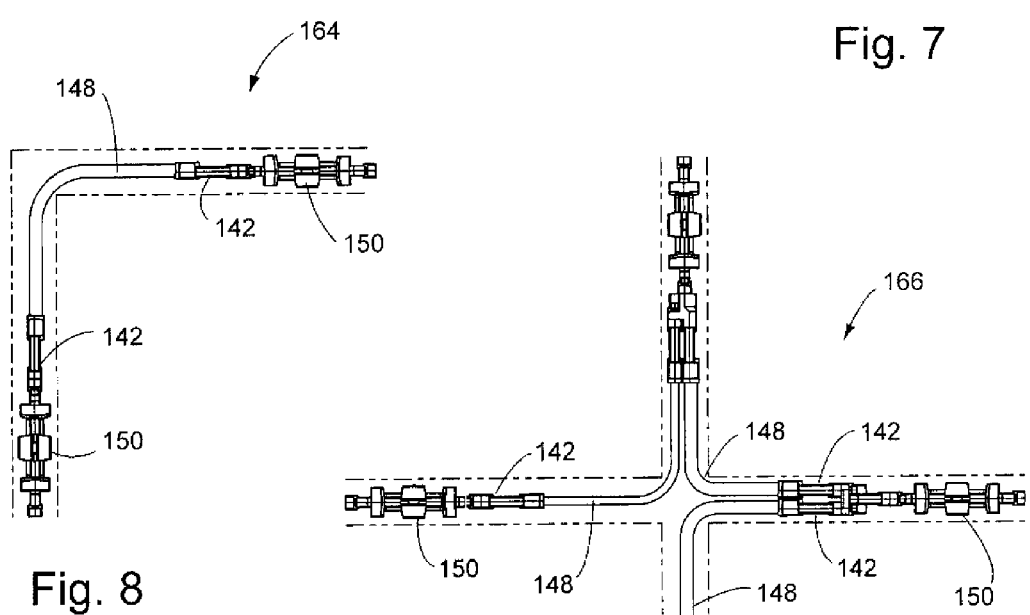
Fig. 8
Fig. 9
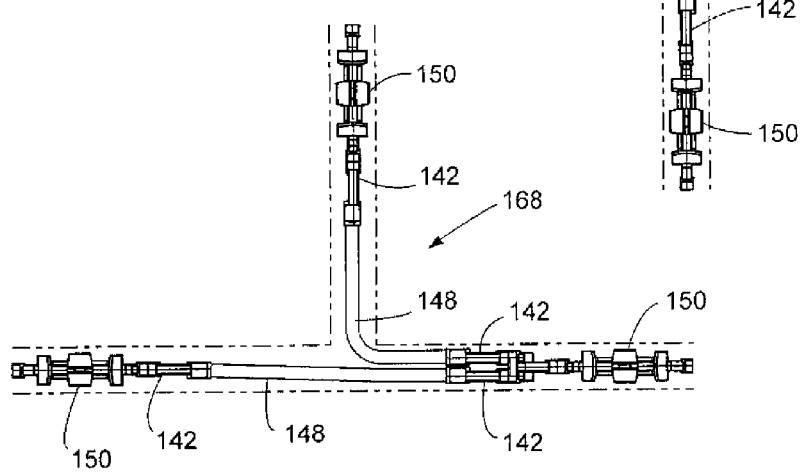
Fig. 10

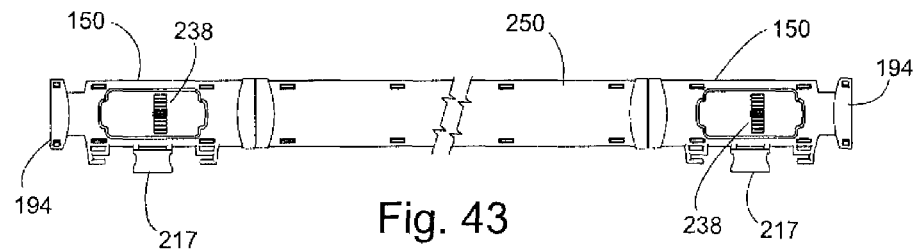
Fig. 43
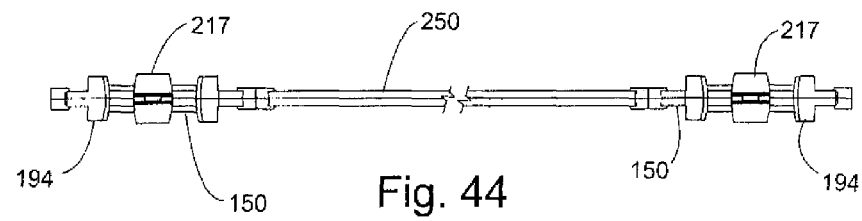
Fig. 44
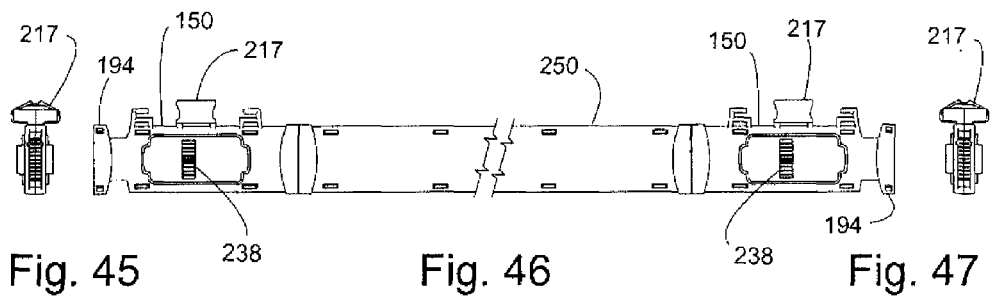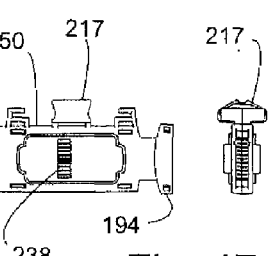
Fig. 45    Fig. 46    Fig. 47
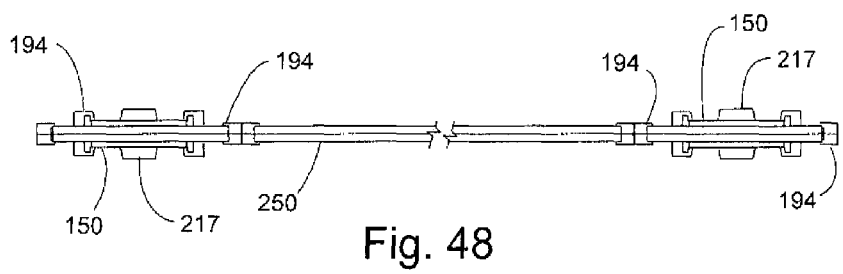
Fig. 48

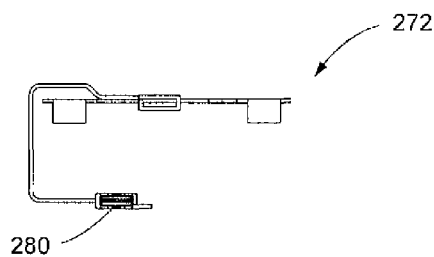
Fig. 102
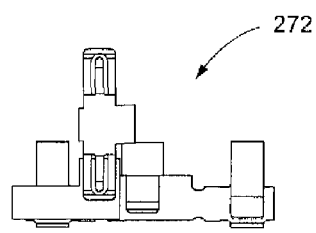
Fig. 103
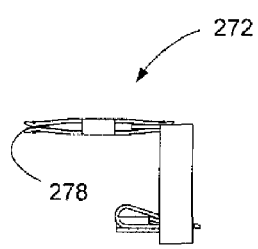 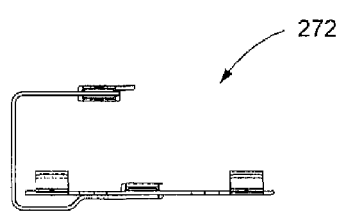 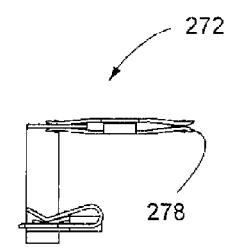
Fig. 104        Fig. 105        Fig. 106
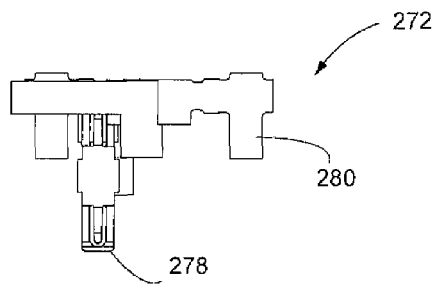
Fig. 107

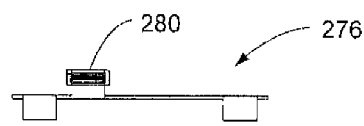
Fig. 114
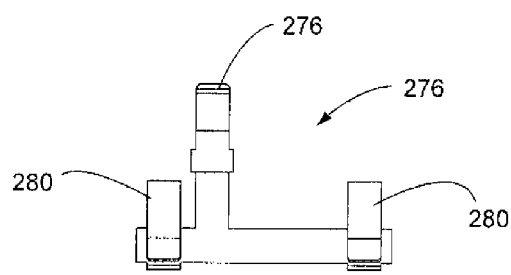
Fig. 115
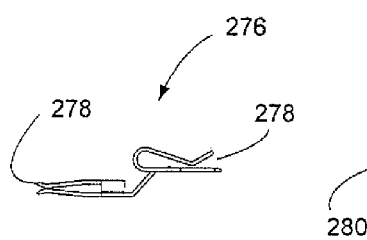 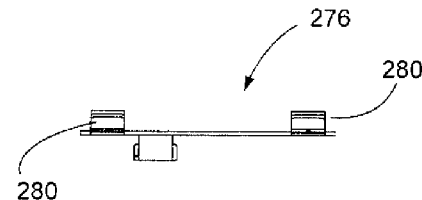 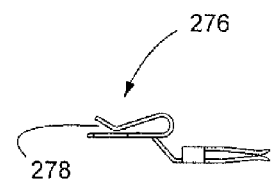
Fig. 116  Fig. 117  Fig. 118
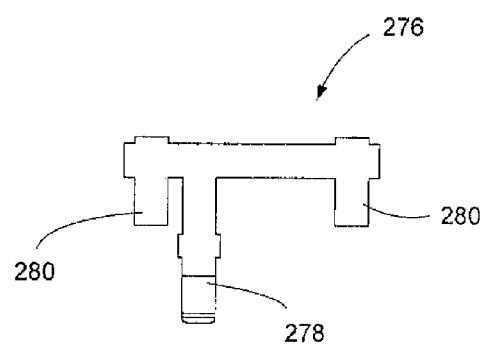
Fig. 119

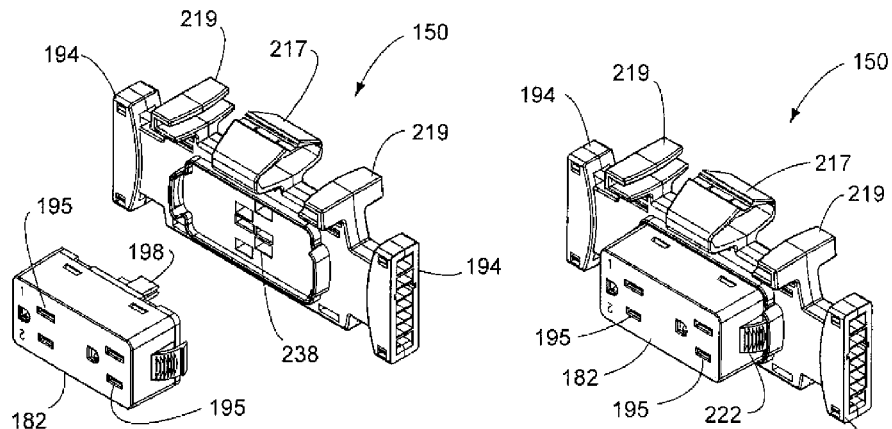
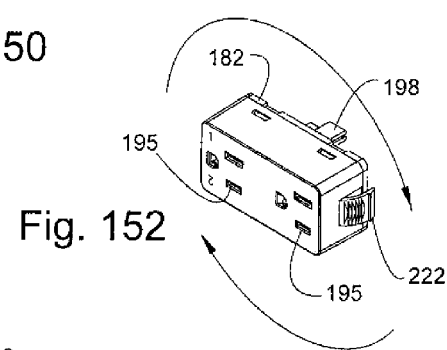
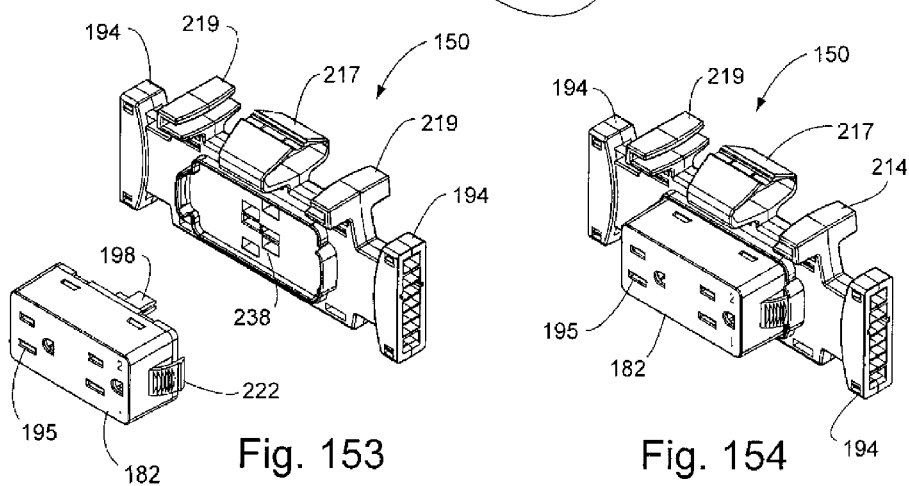

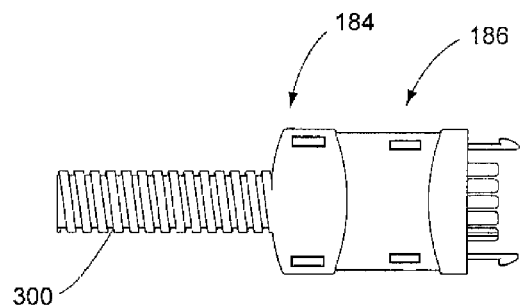
Fig. 155
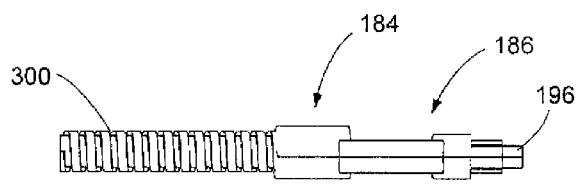
Fig. 156
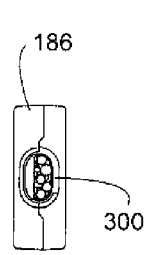 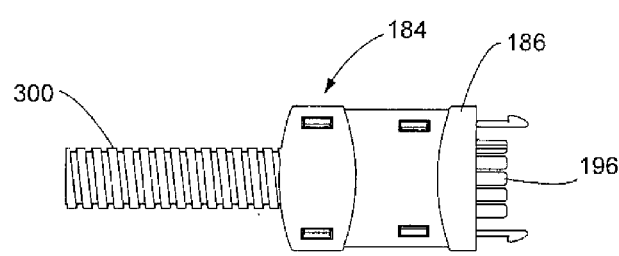 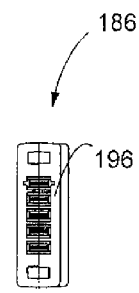
Fig. 157  Fig. 158  Fig. 159
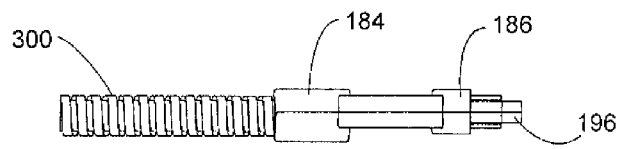
Fig. 160

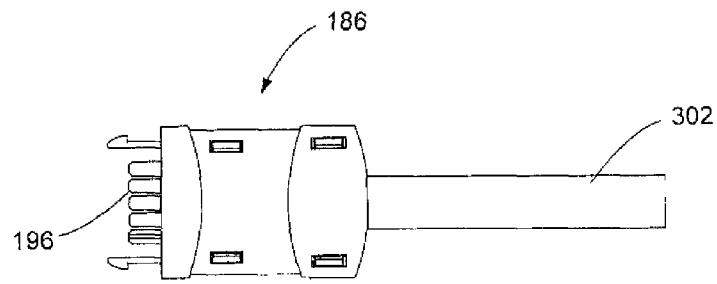
Fig. 161
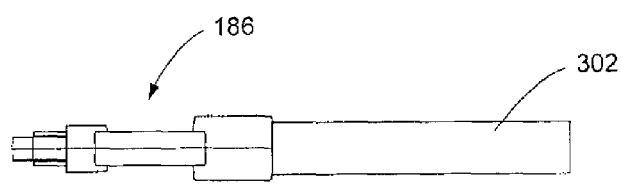
Fig. 162
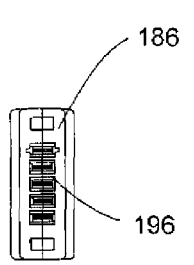 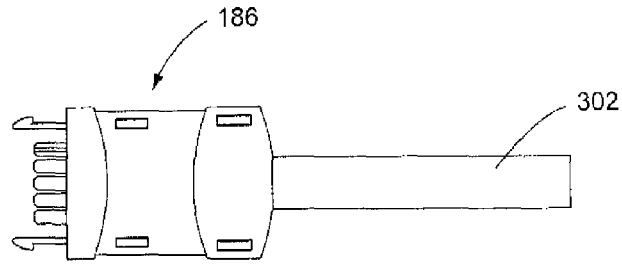 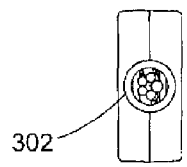
Fig. 163  Fig. 164  Fig. 165
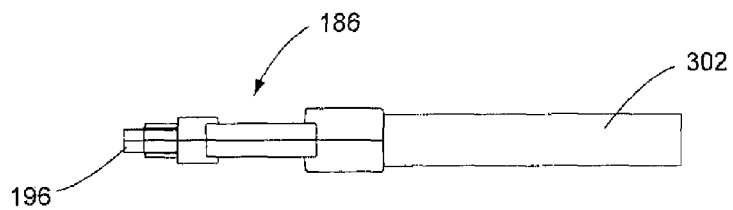
Fig. 166

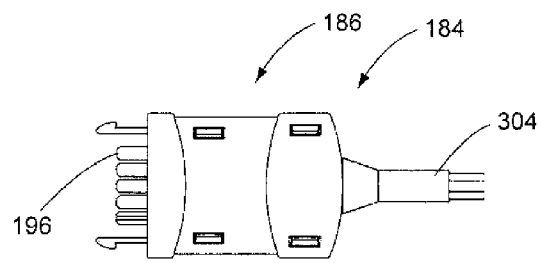
Fig. 167
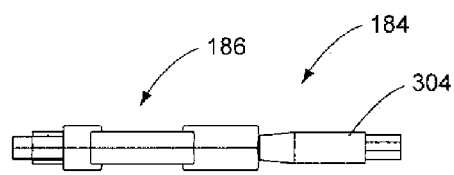
Fig. 168
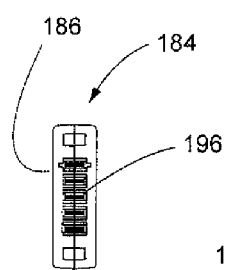 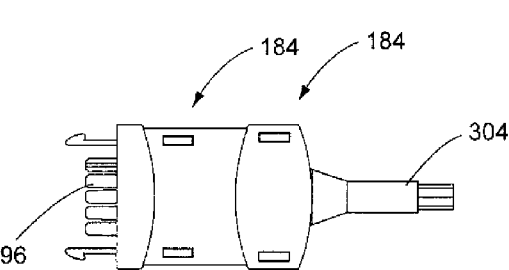 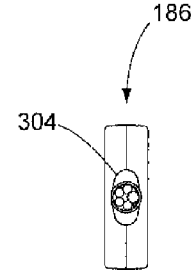
Fig. 169          Fig. 170          Fig. 171
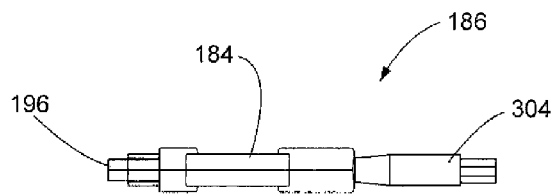
Fig. 172

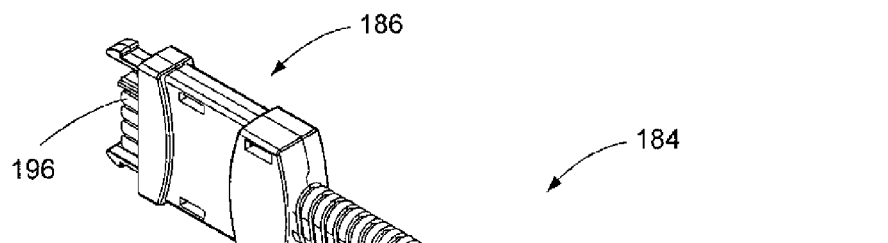
Fig. 179
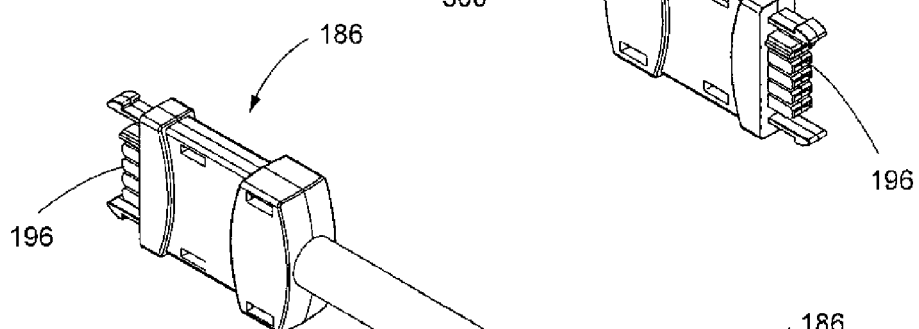
Fig. 180
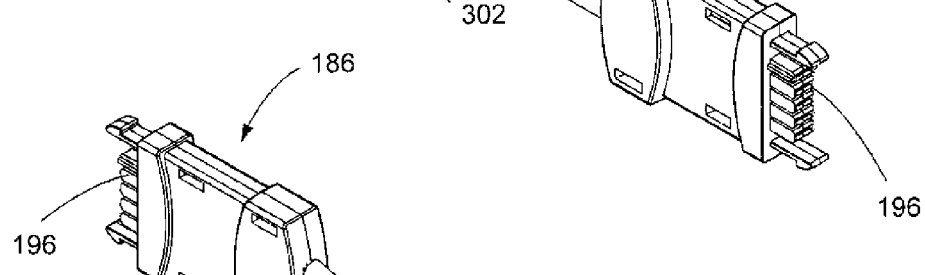
Fig. 181
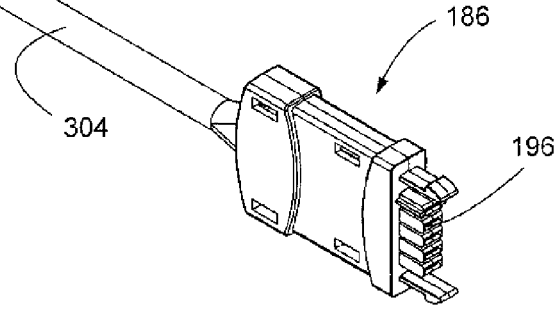

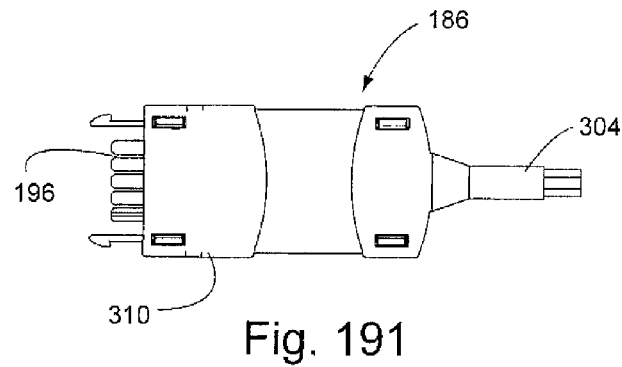
Fig. 191
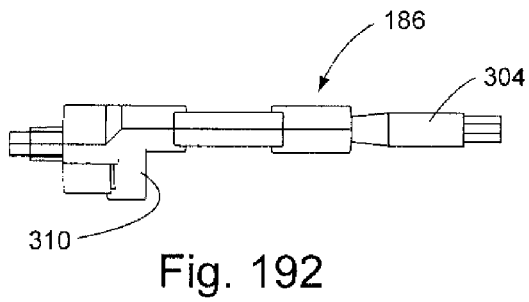
Fig. 192
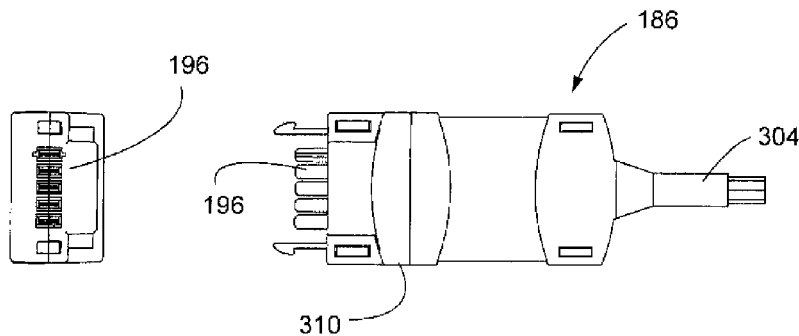 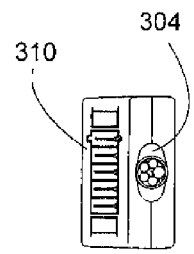
Fig. 193    Fig. 194    Fig. 195
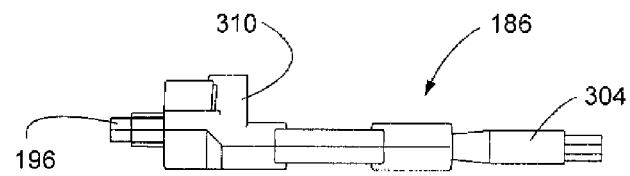
Fig. 196

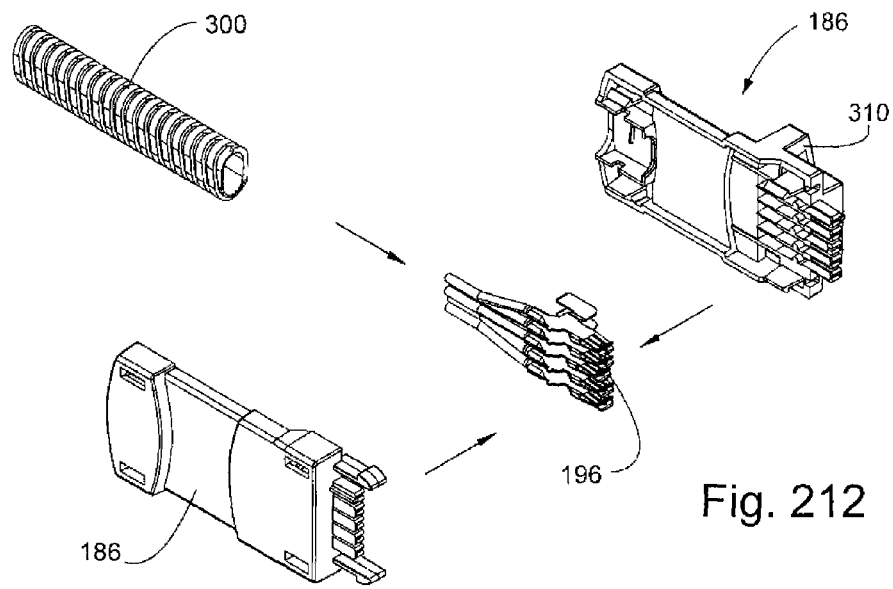
Fig. 212
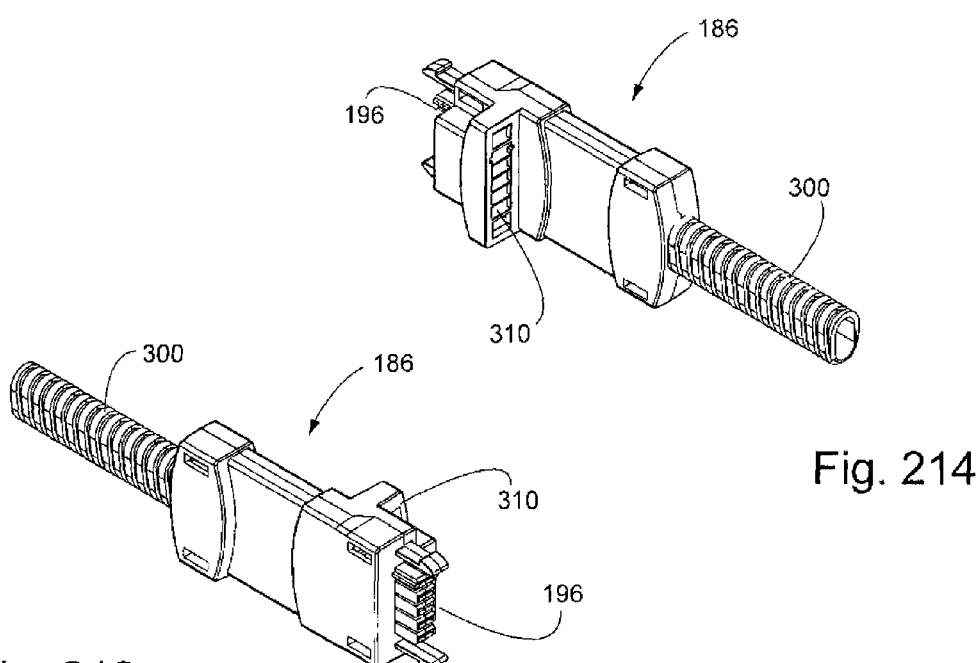
Fig. 214
Fig. 213

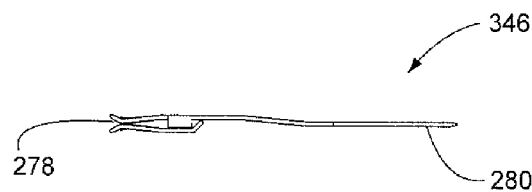
Fig. 226
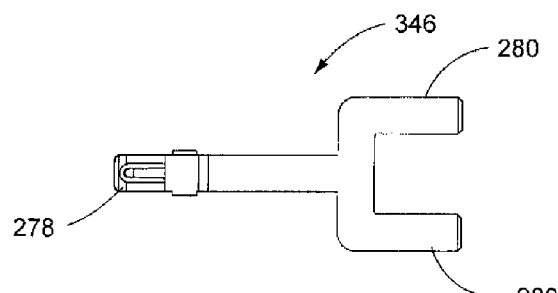
Fig. 227
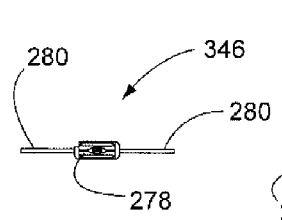 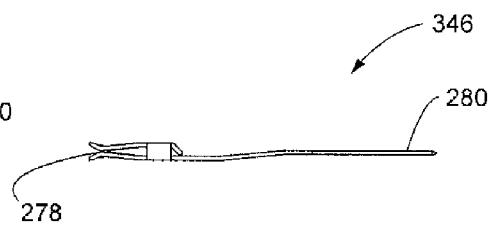 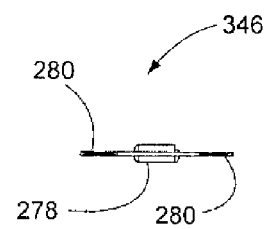
Fig. 228  Fig. 229  Fig. 230
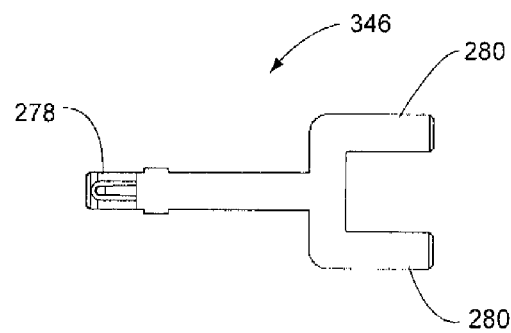
Fig. 231

MODULAR POWER DISTRIBUTION ASSEMBLY WITH MULTIPLE CIRCUITS

CROSS-REFERENCE TO RELATED APPLICATIONS

This application is based upon and claims priority of U.S. Provisional Patent Application Ser. No. 61/186,882, filed Jun. 14, 2009.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The invention relates to electrical power and communications distribution systems and, more particularly, to systems employing modular components with the capability of utilizing multiple circuit configurations, with arrangements for electrically interconnecting outlet receptacle blocks so as to provide for a selected one of a plurality of power supply circuits.

2. Background Art

Known interior wall systems typically employ pre-fabricated modular units. These units are often joined together in various configurations, so as to divide a workplace into smaller offices or work areas. Generally, such modular wall panels may be equipped with means for receiving general building power and, possibly, general communications. Such building power may, for example, be conventional AC power received either under floor or from relatively permanent walls or the like. In various types of environments comprising electrical equipment, or wherein electrical apparatus are otherwise employed, interconnections of electrical components to incoming utility power are typically provided by means of cables or wires. For example, in office systems compromising modular furniture components, it is often necessary to provide electrical interconnections between incoming power supplies and various types of electrical devices typically used in an office environment, such as electric typewriters, lamps, etc. Computer-related devices, such as video display terminals and similar peripherals, are also now commonly employed in various office and industrial environments.

One advantage inherent in modular office systems is the capability to rearrange furniture components as necessitated by changes in space requirements, resulting from changes in the number of personnel and other business-related considerations. However, these modular systems must not only allow for change in furniture configurations, but also must provide for convenient interconnection of electrical devices to utility power, regardless of the spacial configuration of the modular systems and resultant variable distances between electrical devices.

In providing the interconnection of electrical apparatus and power inputs, it is necessary to include an arrangement for feeding the incoming utility power to the power outlets. In stationary structures, such as conventional industrial buildings and the like, a substantial amount of room would normally exist behind stationary walls and other areas in which to provide the requisite cabling for interconnecting incoming utility power to electrical receptacles mounted in the walls. Such systems, however, can be designed so as to remain stationary throughout their lifetime, without requiring general changes in the office or industrial environment areas.

In addition to receiving electrical power from the general incoming building power supply, modular office systems typically require communications connections for office equipment such as telephones, internet communications and the like. The problems associated with providing distribution of communications essentially correspond to the same problems existing with respect to distribution of conventional electrical power.

In this regard, it is known to provide modular wall panels with areas characterized as raceways. Often, these raceways are located along bottom edges of modular panels. The raceways are adapted to house electrical cabling and electrical junction blocks. The cabling and junction blocks are utilized to provide electrical outlets and electrical power connections to adjacent panels. However, it is also apparent that to the extent reference is made herein to providing electrical outlets and electrical power connections for adjacent panels, the same issues exist with respect to providing communications among panels.

Still further, it is known that the raceway of one modular wall unit may be provided with a male connector at one end, and a female connector at another end. Pairs of junction blocks, each provided with electrical outlets, made to be disposed at spaced-apart positions along the raceway. Conduits may be extended between the junction blocks and between the connectors in the junction blocks. In this manner, electrical interconnection is provided between the units.

The modular panels of a space-divider may be configured, such that adjacent panels are in a straight line, or at various angular positions relative to each other. It is common to configure intersecting walls in such a fashion that three or four modular wall panels may intersect at right angles. Each of the panels typically requires electrical outlets, and may require outlets on both sides of the panels. In any event, electrical power has to be provided to all of the panels, and often only one of the panels at the multiple panel junction is connected to a power supply source. Under such circumstances, the interconnecting wiring becomes a significant problem. That is, special modifications may have to be made to power systems of wall panels to be used in such a configuration. Because interchangeability of wall panels is highly desirable, custom modifications are preferably avoided. Still further, modifications of wall panels on site at the installation facility is complex and may be relatively expensive.

In addition to the foregoing issues, problems can arise with respect to the use of junction blocks and the amount of room which may exist within a raceway. That is, raceways require sufficient room so as to provide for junction blocks, electrical outlet receptacle blocks, and cabling extending between junction blocks and between adjacent panels.

One example of a prior art system is illustrated in Propst's, et al., U.S. Pat. No. 4,382,648 issued May 10, 1983. In the Propst, et al. system, mating connectors of opposing panels are engaged when the panels are aligned in a straight line. When the panels are positioned in an intersecting relationship, specially manufactured couplers are utilized. One type of special coupler is used when the panels are positioned at right angles. Another type is used with adjoining panels arranged at angles other than right angles. Consequently, costly inventory of couplers must be maintained. The Propst, et al. system uses a double set of connectors comprising a male and female connector for each conductor to be interconnected. When a single one of these prior art panels intersects two adjacent panels, one of the specially manufactured couplers connects the female terminals to one of the adjacent panels, and another of the couplers connects the male terminals to the adjacent panel.

A further system is disclosed in Driscoll, U.S. Pat. No. 4,135,775, issued Jan. 23, 1979. In the Driscoll system, each panel is provided with an electrical outlet box in its raceway. Panels of different widths are provided with a pair of female connectors. Outlet boxes of adjacent panels are interconnected by means of flexible cables having male connectors at both ends. When three or four panels are adjoined in an intersecting arrangement, two cables may be connected the pair of female connectors at one end of an outlet box. In this manner, connection of two adjacent panels is facilitated.

With respect to both of the foregoing systems, and other than in the special intersecting relationship, one half of the double set of terminals of these systems is superfluous. There is a distinct disadvantage in modern day systems, where several independent electrical circuits are needed in a wall panel system, with each requiring separate connectors. Space for such circuits and their connectors is very limited in the raceway areas of modern, thin-line wall panels.

Other systems also exist with respect to electrical connectors, junction boxes, and the like. For example, Rodrigues, U.S. Pat. No. 1,187,010 issued Jun. 13, 1916, discloses a detachable and interchangeable electrical switch plug adapted for use in connection with various electrically heated appliances. A clamping device is positioned in a fixed, but detachable relationship to one end of the plug. Means are provided to enclose and prevent sharp flexure of the cord comprising a flexible enclosing tube gripped under tension by the other end of the clamping device. The plug and the clamping device may be simultaneously removed from the socket.

Finizie, U.S. Pat. No. 2,540,575, issued Feb. 6, 1951, discloses a cord guide member for utensil plugs. The concept is to reduce wear on the cord and the connector plug, and to provide a connection which will withstand heavy pulling strains without injury. Strain relief is also provided. A sectional body is equipped anteriorally adjacent one end of the body with terminals. The other end of the body contains an anterior chamber or socket. A pivotable cord-guiding member having a pivot member is movably mounted in the socket. A wedge-shaped strain relief insert is received within a wedge-shaped recess in the pivot member. A cord extends into the pivot member and includes wires passing from the cord toward the terminals. The incoming portions of the wires are moved around the insert and firmly wedged within the recess.

Byrne, U.S. Pat. No. 4,551,577, issued Nov. 5, 1985, describes a retractable power center. The power center provides for conveniently located electrical power source receptacles adapted to be mounted on a work surface. In one embodiment, the power center includes a rectangular housing received within a slot in a work surface. A clamping arrangement is utilized to secure the housing to the work surface. A lower extrusion is connected to the lower portion of the housing. A movable power carriage mounts the receptacles and a catch assembly releasably maintains a carriage in a closed and retracted position. In response to manual activation, the catch assembly is released and springs tensioned between the carriage and the extrusion exert forces so as to extend the carriage upward into an extended, open position. In the open position, the user can energize the desired electrical devices from the receptacles, and then lower the carriage into the retracted position.

Byrne, U.S. Pat. No. 4,959,021, issued Sep. 25, 1990, discloses a pivotable power feed connector having a pivotal connector adapted to be connected to a flexible conduit or cable. The cable has a series of conductors extending there through. The connector is pivotably connected to a block assembly through which the conductors extend. The block assembly, in turn, is connectable to a contact block, with the conductors conductively connected to a set of prong terminals extending outwardly from the block. A cover is secured over the block so as to prevent the prong terminals from being exposed during assembly and disassembly.

The cover automatically exposes the prong terminals as the power feed connector is moved into engagement with a receptacle in a modular office panel. The connector allows the conduit or cable to be swiveled to an arc of approximately 180 degrees to any desired position. The connector is also manually removable from interconnection with the block assembly. Such removal allows the conduit or cable to be pulled back from the conductors and cut to a desired length. The connector includes a power feed cover which can be utilized in part to maintain the connector in either of two spatial configurations relative to the block assembly.

Nienhuis, et al., U.S. Pat. No. 5,013,252, issued May 7, 1991, discloses an electrified wall panel system having a power distribution server located within a wall panel unit. The server includes four receptacle module ports oriented in an h-shaped configuration. A first receptacle port is located on the first side of the wall panel unit and opens toward a first end of the unit. A second receptacle unit is also located on the first side of the wall panel unit, and opens toward a second end of the wall panel unit. A third receptacle port and a second sided wall panel unit opens toward the first end of the wall panel unit, while correspondingly, a fourth receptacle port on the second side of the wall panel unit opens toward the second end of the wall panel unit. First and second harnesses are each electrically connected at first ends thereof to the power distribution server. They extend to opposite ends of the wall paneled unit and include connector ports on the second ends thereof for providing electrical interconnection of adjacent wall panel units. The Nienhuis, et al. patent also discloses a system with a wall panel connector interchangeably usable with the interconnection of two, three or four units. The connector includes a hook member for connecting together adjacent vertical members of frames of adjacent wall panel units at a lower portion thereof. A draw naught for connecting together adjacent vertical members of frames of adjacent wall panel units and an odd proportion thereof is provided by vertical displacement thereof.

Lincoln, et al., U.S. Pat. No. 5,073,120, issued Dec. 17, 1991, discloses a power distribution assembly having a bussing distribution connector. The connector includes a series of bus terminals positioned within an electrically insulative housing. A series of electrical terminals are positioned in the housing for distributing more than one electrical circuit. At least one ground terminal, one neutral terminal, and three hot terminals are provided. A grounding shell partially surrounds the bus connector and includes a grounding tab grounding the one ground terminal to the metallic grounding shell. In another embodiment, two bus connectors are interconnected together, so as to provide for an increased number of output ports.

Byrne, U.S. Pat. No. 5,096,431, issued Mar. 17, 1992, discloses an outlet receptacle with rearrangeable terminals. The receptacle is provided with input terminals to selected positions, for engagement with terminals of an electrical junction block. The block includes a series of terminals representing a plurality of different electrical circuits. The receptacle block has neutral, ground and positive flexible positive conductor bars electrically connected to neutral, ground and positive electrical terminals. Input terminals of the block are formed integral with the flexible conductor bars and levers are provided for moving the terminal ends of the conductor bars to physically different positions. In one configuration, the receptacle block housing is provided with openings at opposing ends, and the flexible conductor bars have terminal ends controlled by levers at both ends of the outlet receptacle block. In another configuration, the block has output terminals in a front wall, and the input terminals of the receptacle block are formed as ends of the flexible bars and extend at an approximately 90 degree angle to the bars. They further send through openings in the back wall of the outlet receptacle for engagement with terminals of a junction block. Levers are provided in the back wall of the receptacle block for positioning the terminal ends in alignment with different terminals of the junction block, and windowed openings in the front wall expose indices on the levers identifying selected circuits.

Byrne, U.S. Pat. No. 5,096,434, issued Mar. 17, 1992, discloses an electrical interconnection assembly for use in wall panels of a space divider wall system. The system includes junction blocks having several receptacle connectors, so as to provide a plurality of electrical outlets on both sides of a wall panel. The junction block is connected by means of conduits extending from both ends of the junction block to oppositely directed connector blocks for connection to adjoining panels. The assembly of the junction block and connector blocks allows electrical power to be supplied to one end of the panel and conducted to and through the junction block to other panels. The receptacle connectors on the junction block each have one type of terminal configuration, e.g., a female electrical terminal configuration. One of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are joined to a third panel, all at one point, the arrangement of this invention allows the male connector block to be connected to the female connector block of one of the other two panels, and the male connector of the other of the two panels may be connected to one of the receptacle connectors of the junction block on either of the other two panels, in this manner establishing a three way interconnection arrangement. In a similar fashion, a fourth, or other additional panels may be added to the junction and plug into receptacle outlets of other panels in order to provide an arrangement of panels that is totally interconnected, electrically.

Snodgrass, et al., U.S. Pat. No. 5,164,544, issued Nov. 17, 1992, describes an electrified space dividing panel having a panel member, raceway, modular, or electric system disposed in a raceway and raceway covers for gaining access to the system. The system includes a single terminal block having end and side sockets, with first and second electrical receptacles being respectively removeably engaged with the end socket and the side sockets, such that the first and second electrical receptacles are disposed in horizontally spaced, side-by-side relation and project outwardly for predetermined light dimensions through receptacle openings in one of the raceway covers. The raceway can include a web having an opening which cooperates with a support ear on the first receptacle during engagement of the first receptacle with an end socket, so as to provide additional lateral support for the electrical receptacle when a plug is removed there from.

Kilpatrick, et al., U.S. Pat. No. 5,178,555, discloses a kit which includes a junction box for installation along a raceway. The kit includes a mounting bracket having a first adjustable mounting mechanism for locating the bracket along the raceway. This provides an initial adjustment, and a second adjustable mounting mechanism is provided for securing the junction box to the mounting bracket. This adjustably locates the junction box along the mounting bracket, and provides a second or final adjustment to accurately locate the junction box between two pre-measured lengths of cable.

Byrne, U.S. Pat. No. 5,259,787, issued Nov. 9, 1993, discloses an electrical junction block mounting assembly, which may be utilized for mounting the junction block within a raceway. The assembly includes a cantilever beam formed on an outer wall of the junction block. This beam is provided with a transversely extending channel for engagement with a support structure. The beam is attached to the junction block by means of a resilient hinge section, and is provided with a first arm section extending between the hinge section and the channel, and a second arm section extending beyond the channel. The first arm section has a sloping surface sloping away from the outer channel between the hinge section of the panel. The second armed section has a sloping surface sloping toward the wall beyond the channel. The surfaces will contact a mounting rail or similar structure during installation of the junction block. In this manner, the hinged cantilever beam is deflected until the rail is in alignment with the channel for engagement with the structural support member.

Another issue which exists with respect to raceway systems has to do with size, when the number of circuits provided by 8, 12 or 14 wire electrical configurations is unnecessary. For example, a system can be provided through the use of four wires, where the four wires can provide for two separate electrical circuits. In such an instance, each circuit consists of a hot, common and ground wire. The two separate circuits utilize two separate hot wires. However, the two circuits also use the same ground wire and the same common or neutral wire. With these types of configurations, it would be preferable for the electrical holding components to be of a size which would be appropriate for four wire circuitry.

A further issue which can arise relates to physical size somewhat independent of the issue of the number of circuits. That is, some furniture designs utilize relatively narrow panels and desk systems. Concurrently, these narrow panels and desk systems have relatively small raceways. It will be advantageous to provide for a modular electrical system of a size which readily fits within the small raceways.

Still further, one disadvantage of known modular electrical systems relates to the substantial large volume of individual components. In this regard, it would be advantageous to be able to combine certain known electrical components into one physical element. For example, it is relatively common for electrical receptacles to be separate components which are electrically interconnected to junction blocks. To reduce the number of parts required for panels and desk assemblies, it would be advantageous for the junction blocks and the receptacles to be mechanically formed as one piece.

Relatively inherent difficulties with a number of known modular electrical systems relates to the ease of assembly and installation. It is sometimes a "trade off" with known systems to facilitate assembly and installation, while still providing for relatively secure latching or other connection mechanisms between electrical components. In this regard, it would be advantageous to provide for a system which facilitates assembly and installation, while maintaining a positive latching mechanism structure.

Still further, one difficulty which arises with respect to connectors utilized with modular interval systems relates to ensuring for correct polarization and circuitry configurations.

In this regard, it would be advantageous to include male and female connector configurations which are keyed so as to provide for correct polarization and circuitry. Correspondingly, for different types of circuit configurations, it would be advantageous to provide for the keying to be modified.

BRIEF DESCRIPTION OF THE DRAWINGS

The invention will now be described with reference to the drawings, in which:

FIG. 7 illustrates a cable connection having a straight line configuration;

FIG. 8 illustrates a cable assembly having a 90 degree corner configuration;

FIG. 9 illustrates a cable assembly having a cross-configuration;

FIG. 10 illustrates a cable assembly having a "T" connection configuration;

Figure 21:
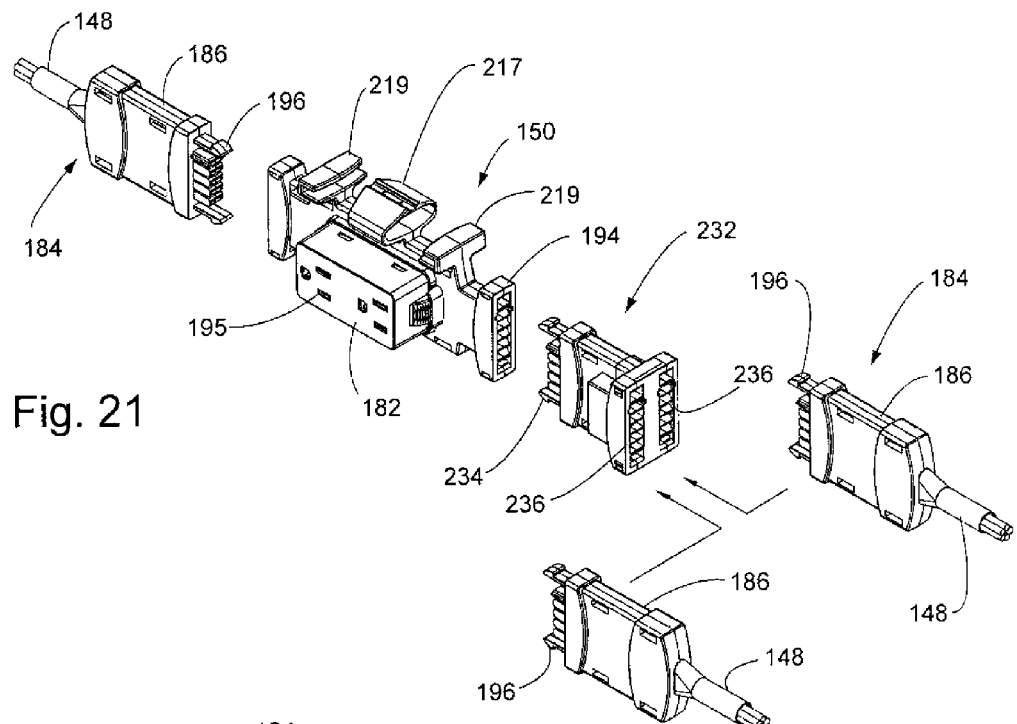
FIG. 21 is a composite and partially exploded illustration showing a number of elements which may be utilized with the power distribution assembly in accordance with the invention, with the elements including.
Figure 22:
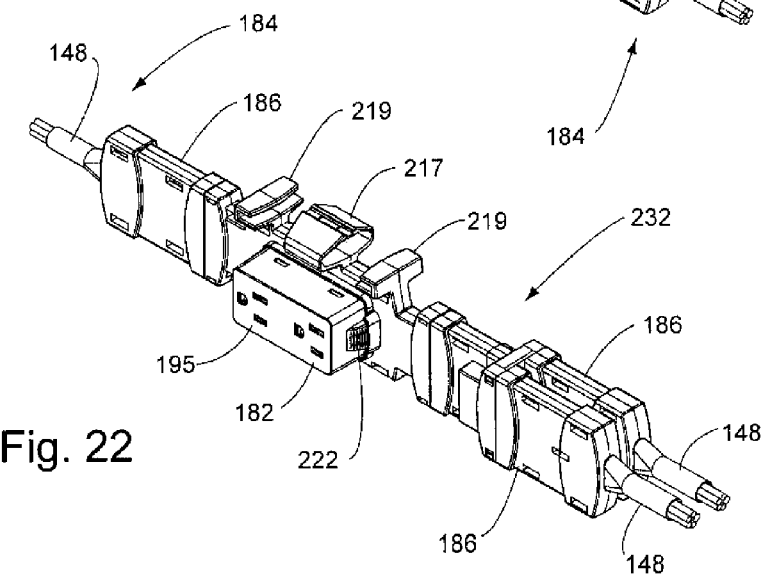
Figures 23, 24:
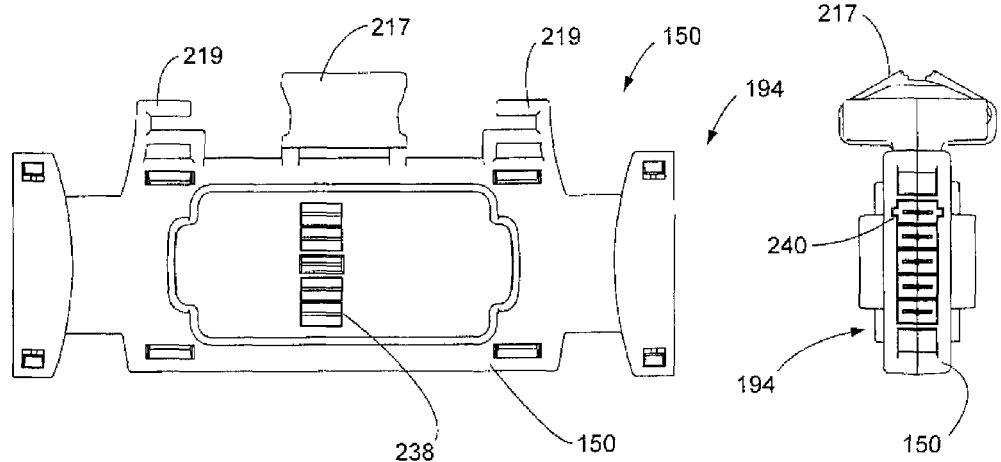
Figure 24A:
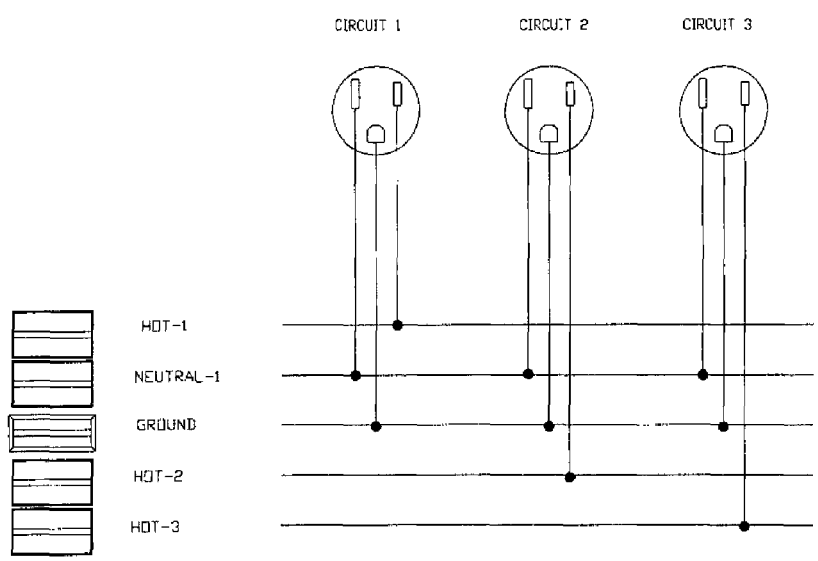
Figures 25, 26:
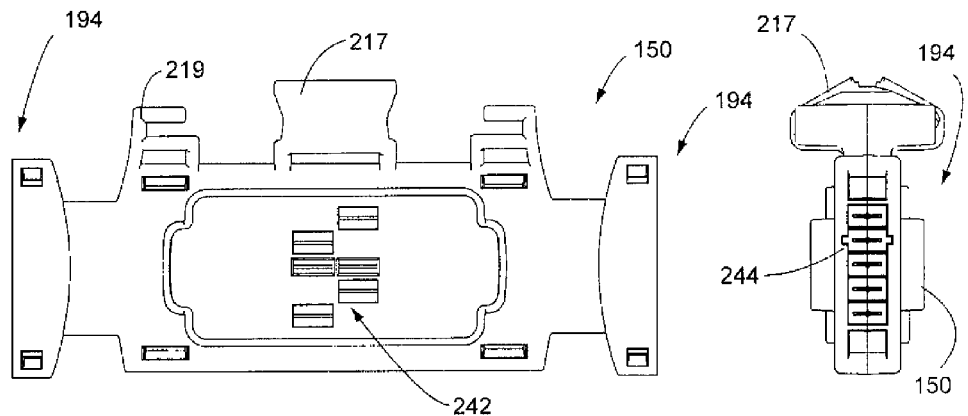
Figure 26A:
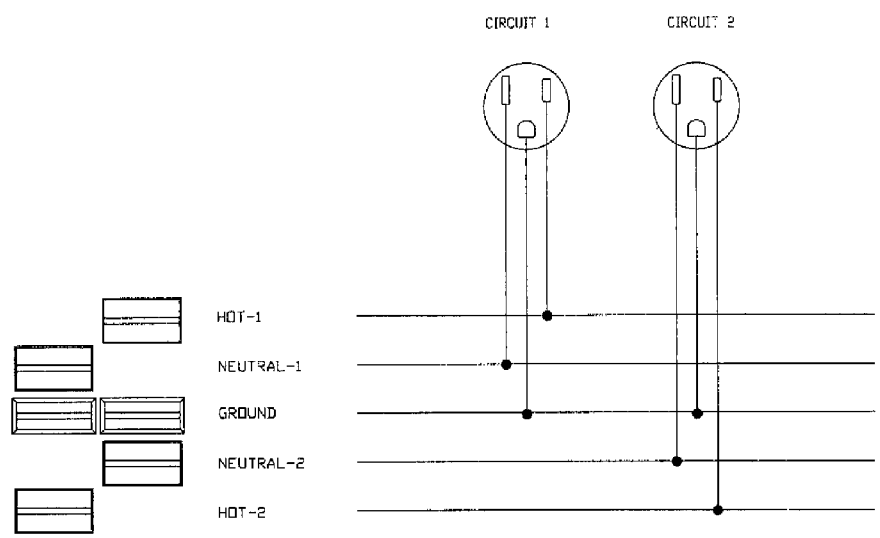
Figure 27:
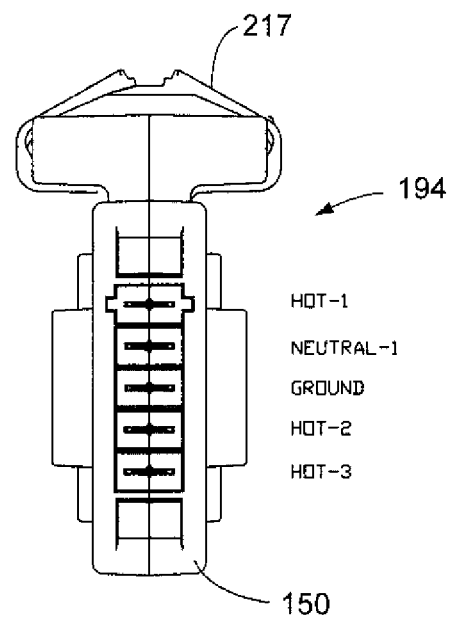
Figure 28:
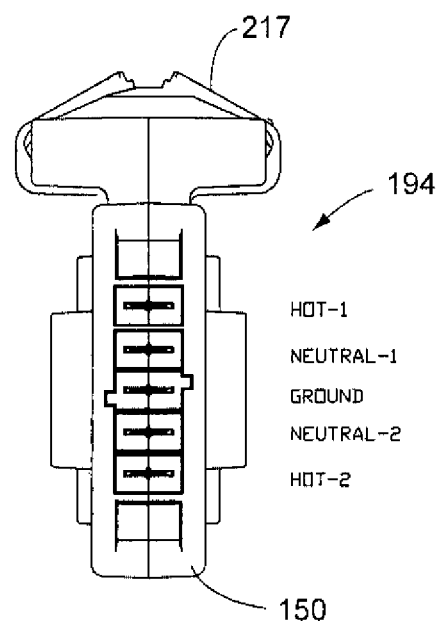
Figure 29:
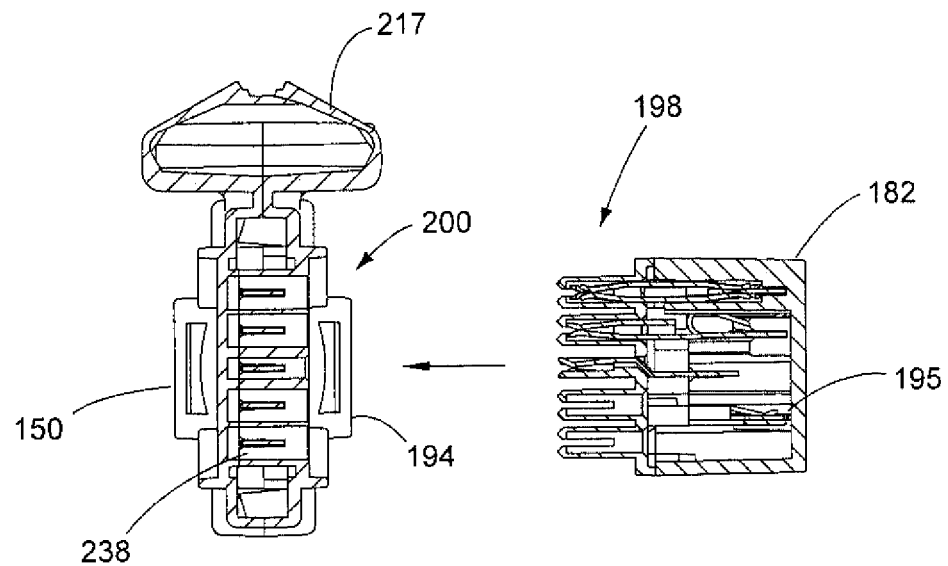
Figure 30:
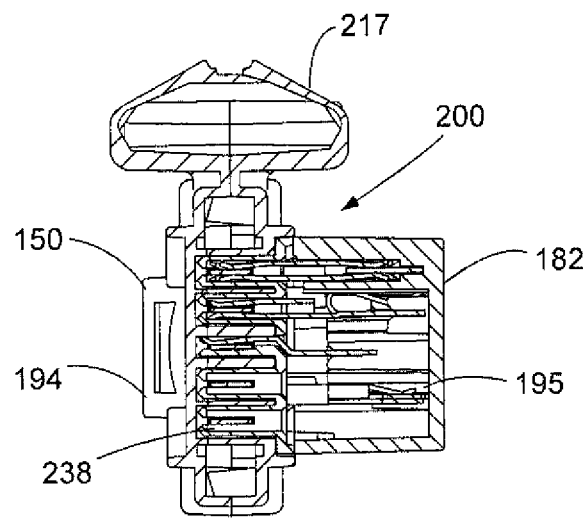
Figure 31:
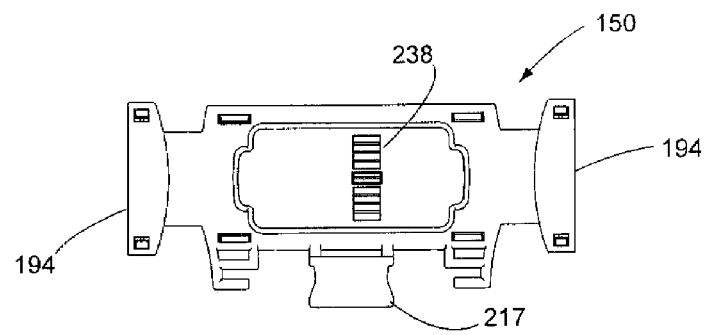
Figure 32:
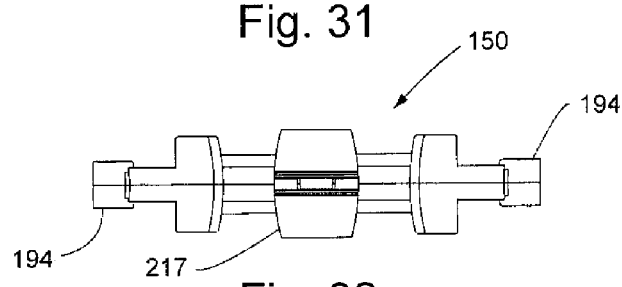
Figures 33, 34, 35:
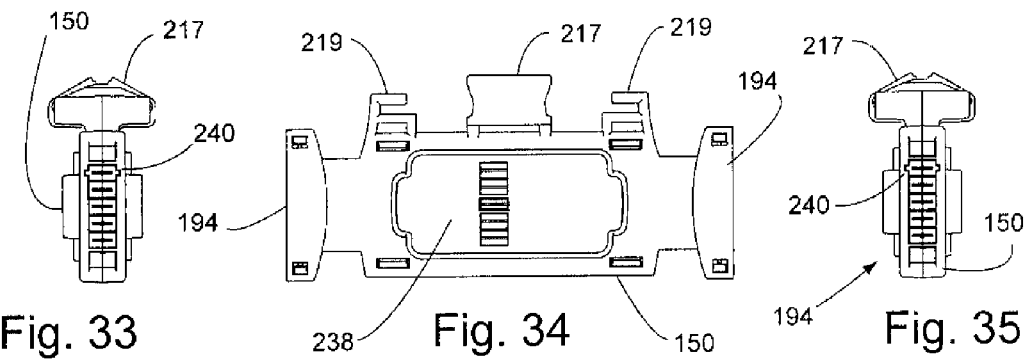
Figure 36:
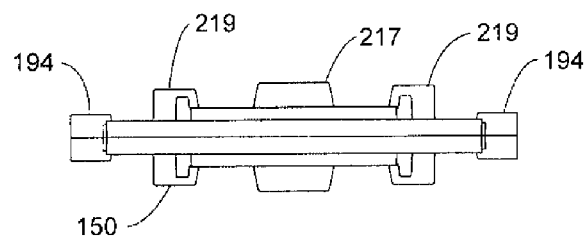
Figure 37:
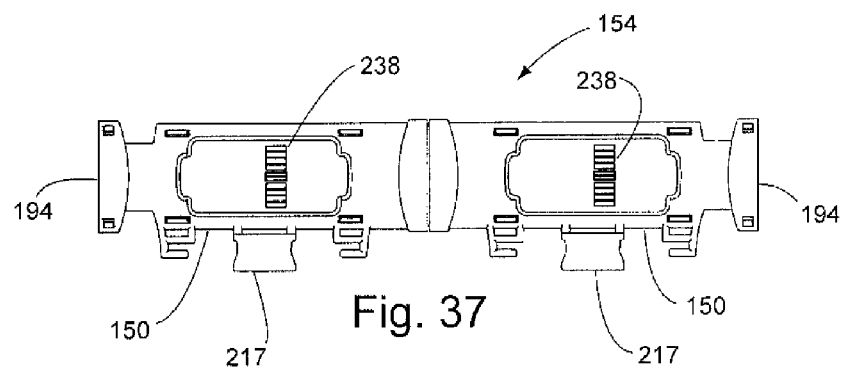
Figure 38:
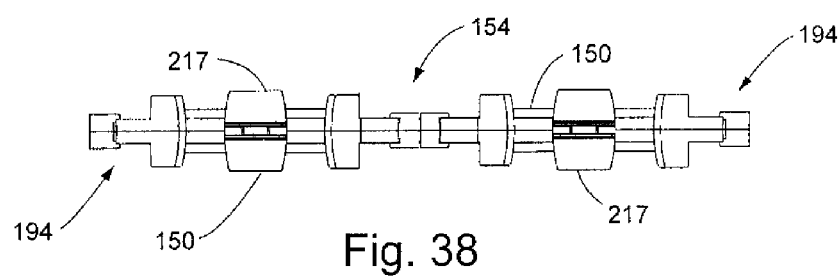
Figures 39, 40, 41:
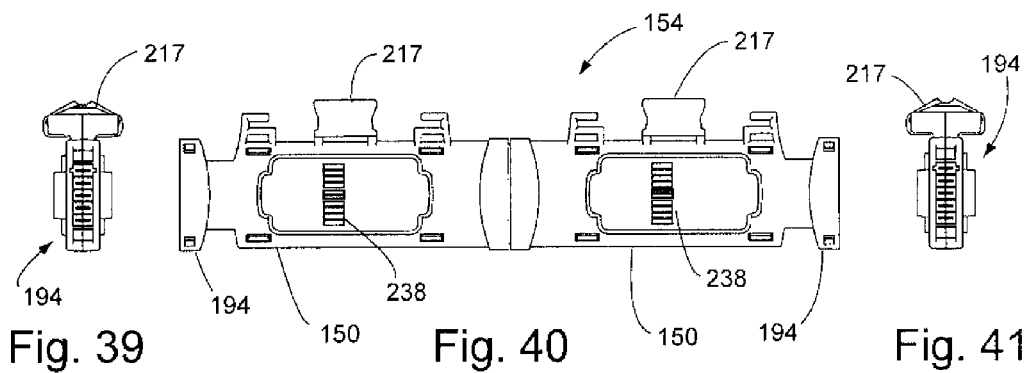
Figure 42:
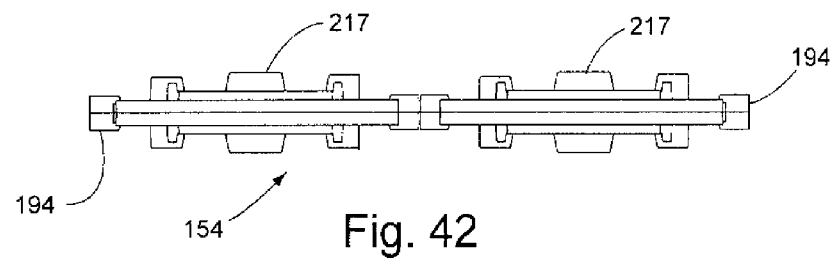
Figure 49:
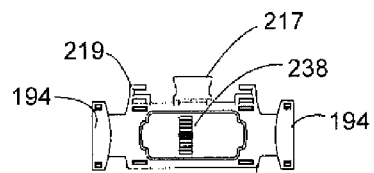
Figure 50:
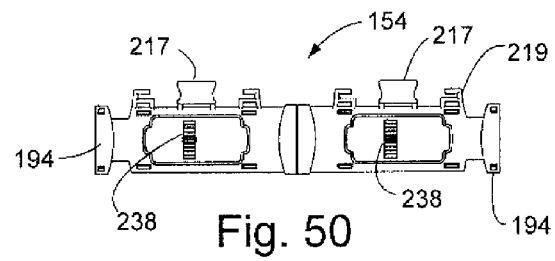
Figure 51:
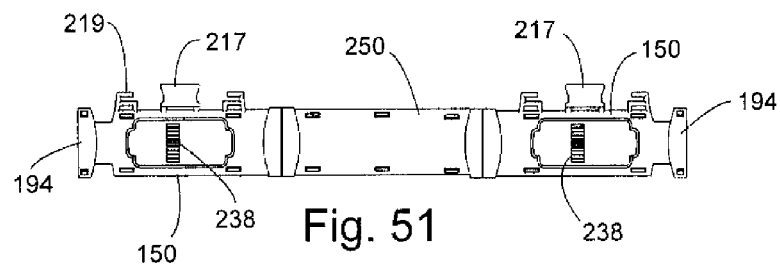
Figure 52:
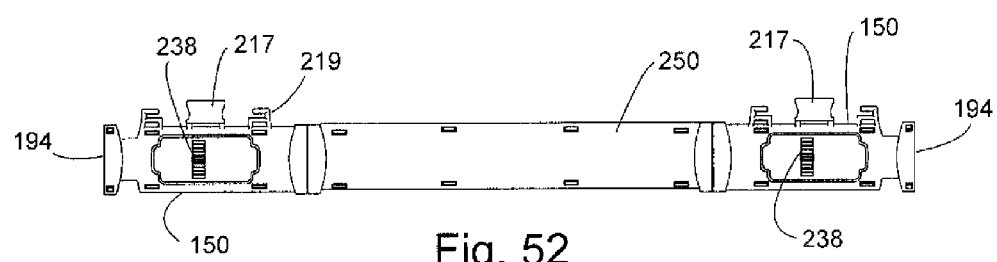
Figure 53:
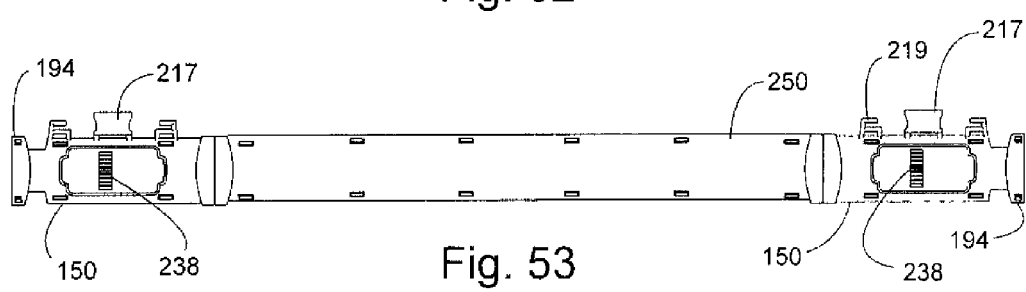
Figure 54:
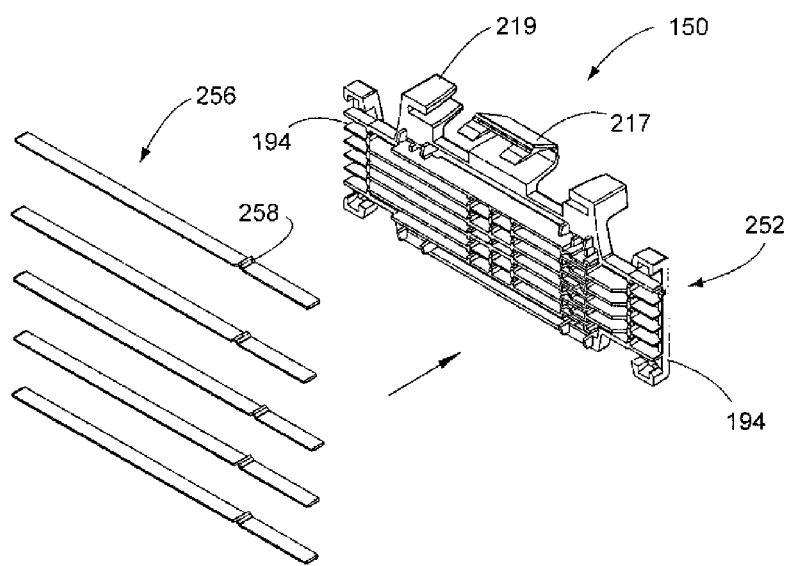
Figure 55:
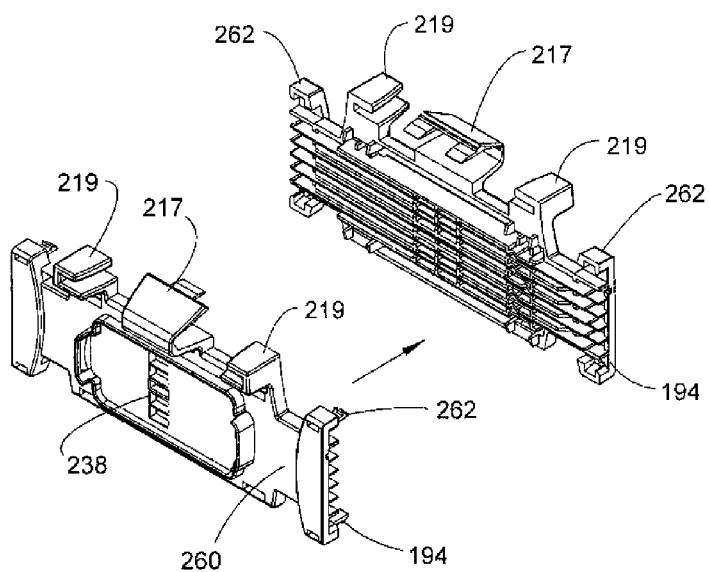
Figure 56:
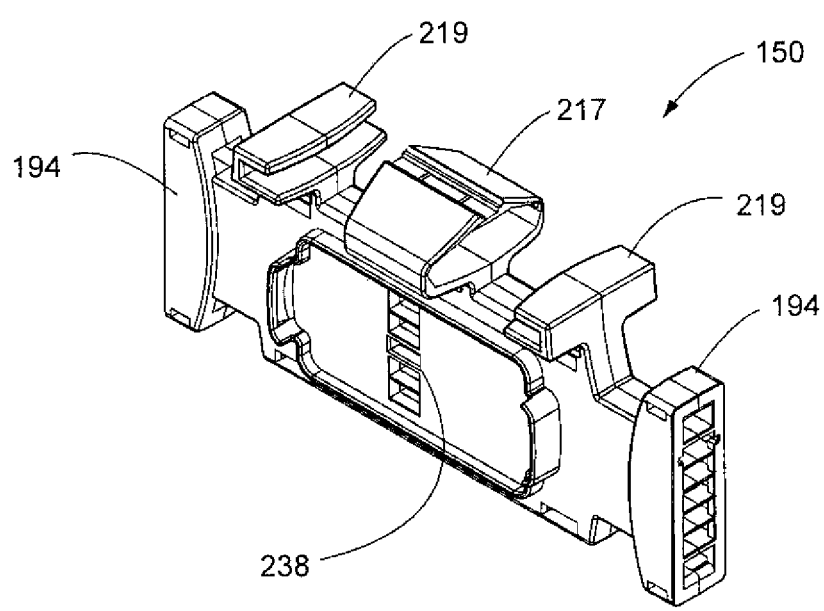
Figure 57:
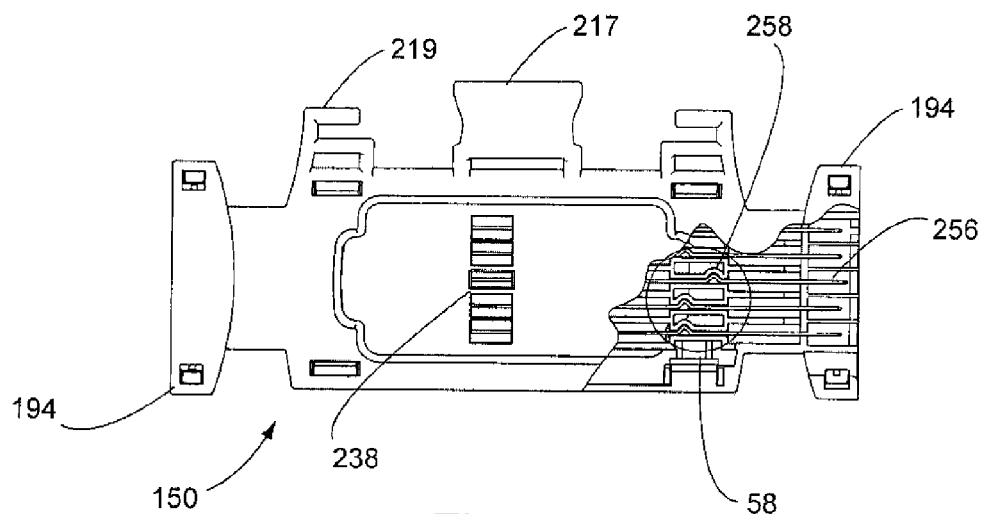
Figure 58:
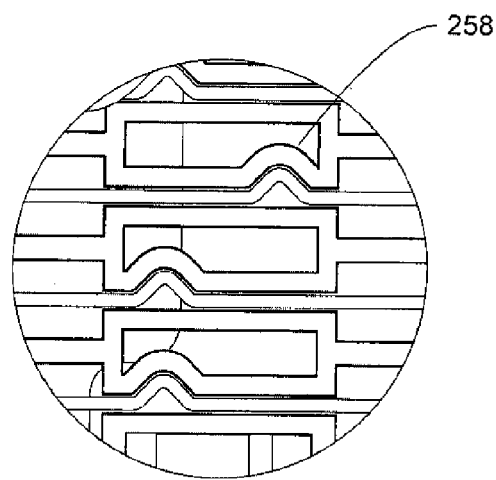
Figure 59:
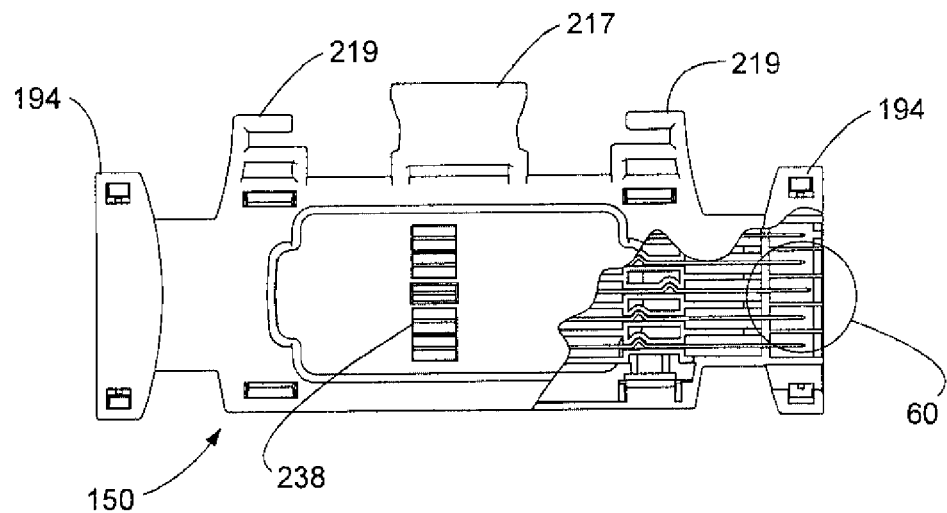
Figure 60:
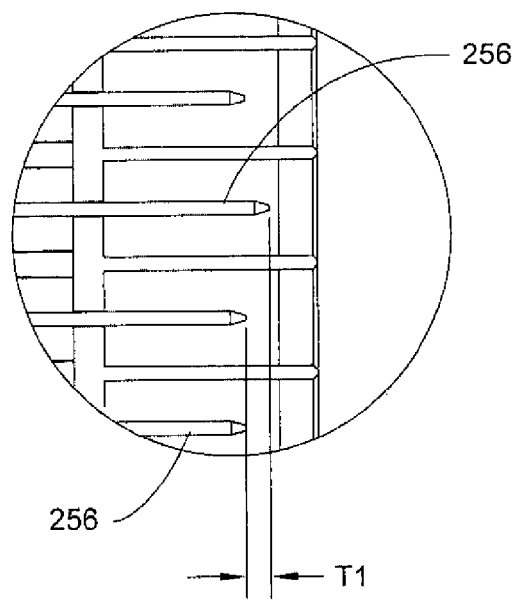
Figure 61:
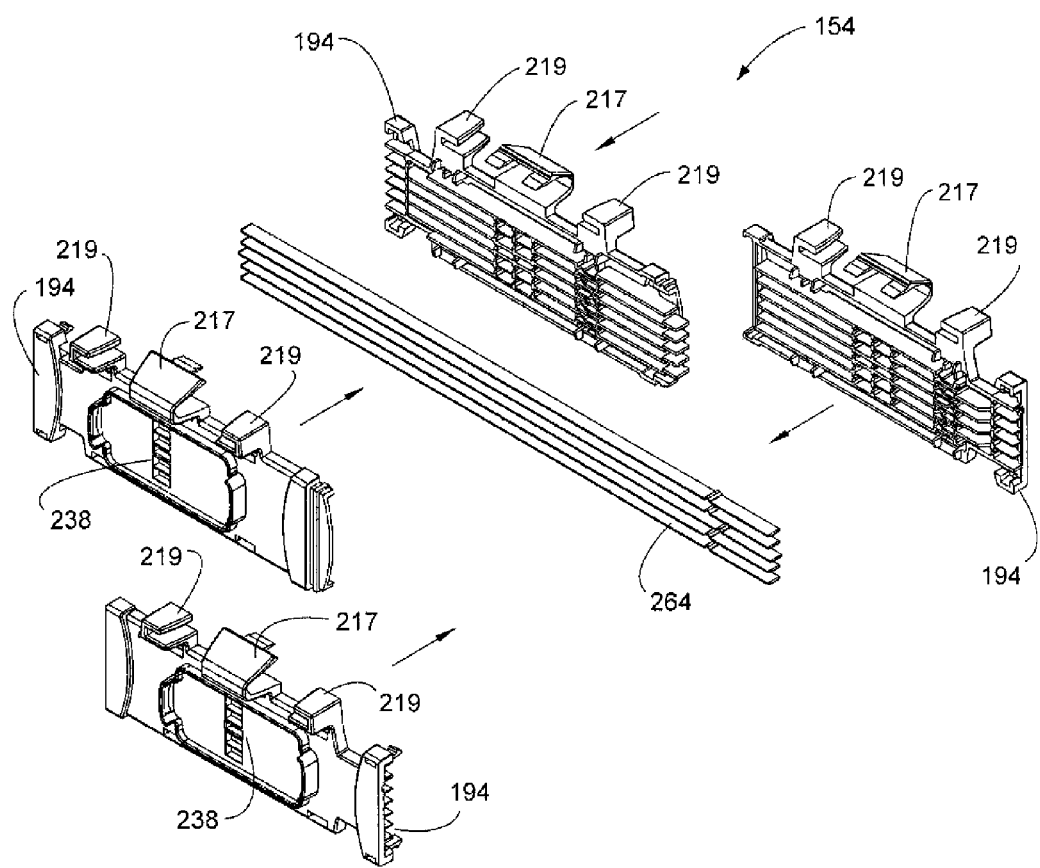
Figure 62:
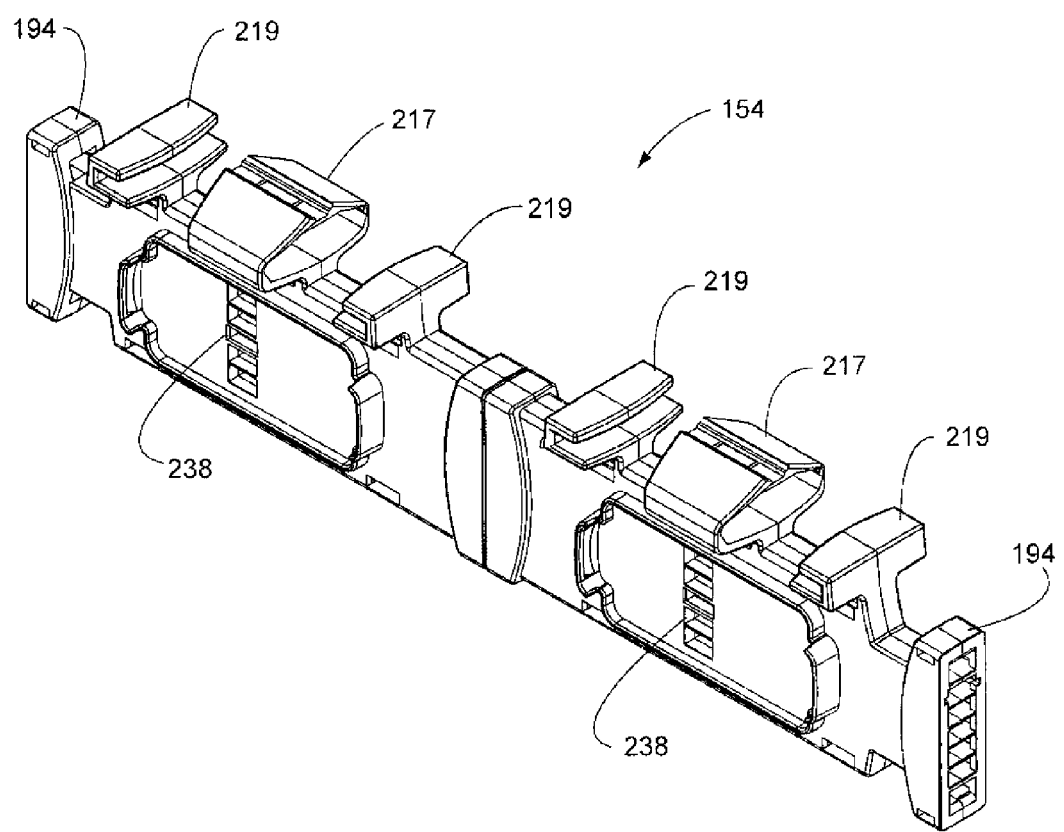
Figure 63:
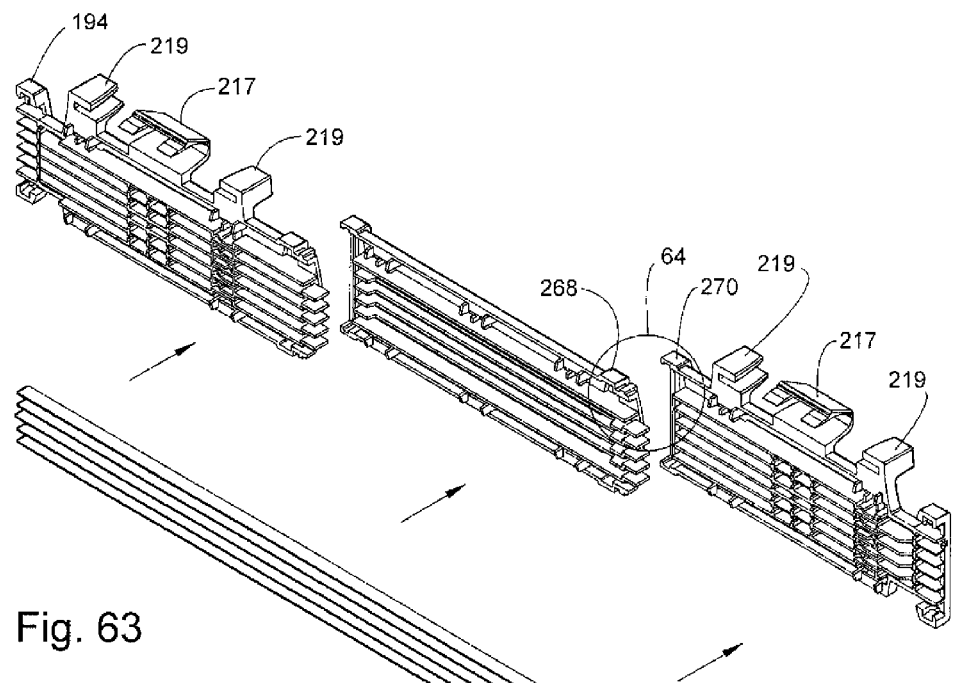
Figure 64:
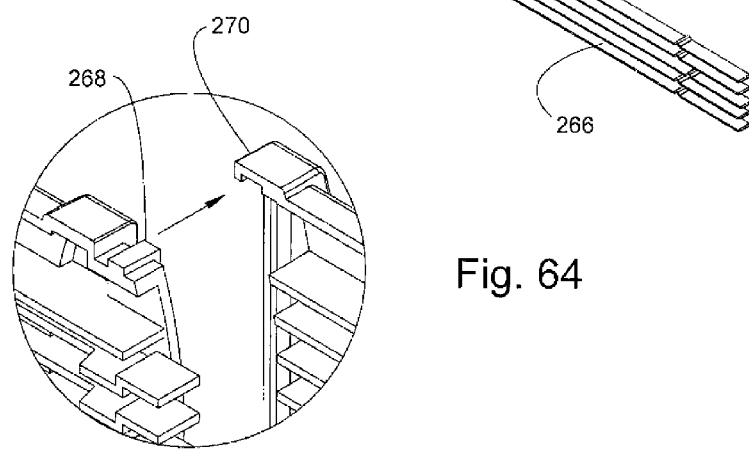
Figure 65:
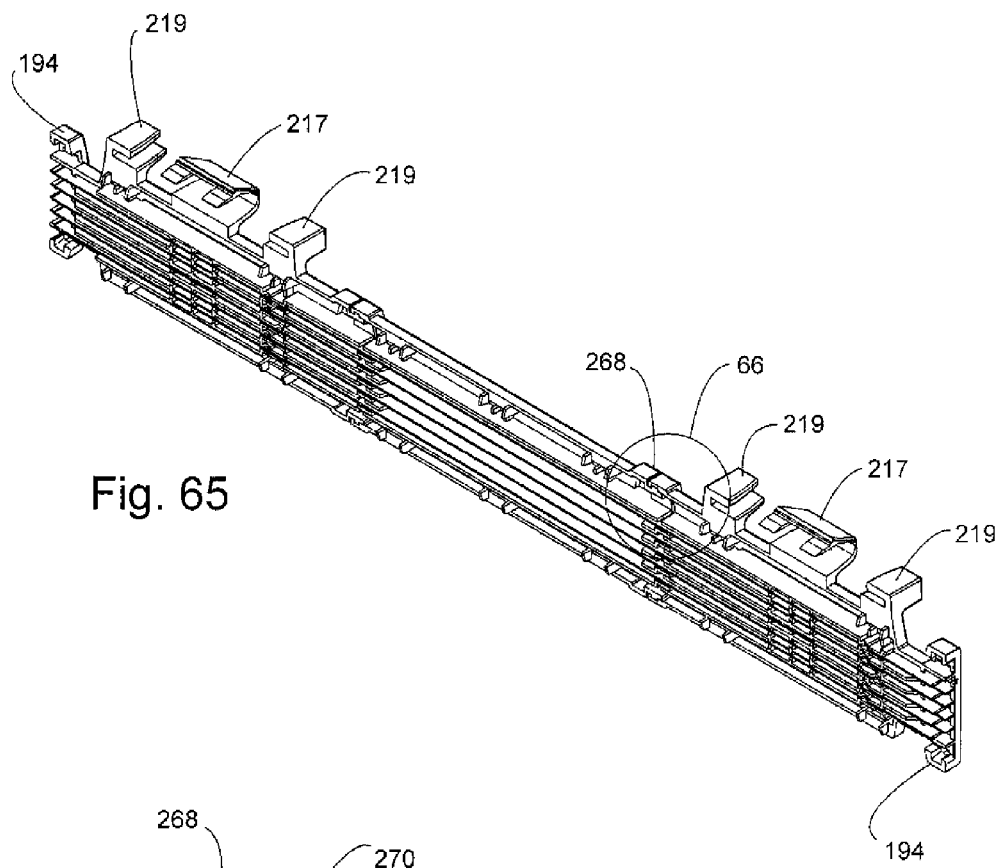
Figure 66:
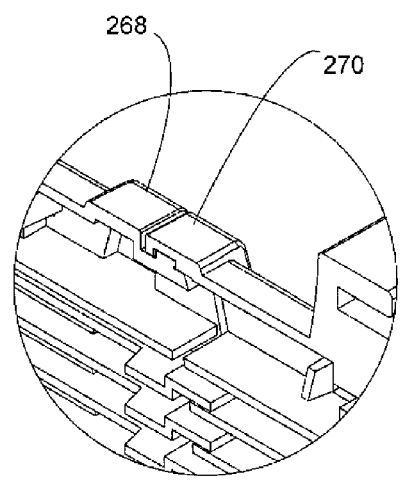
Figure 67:
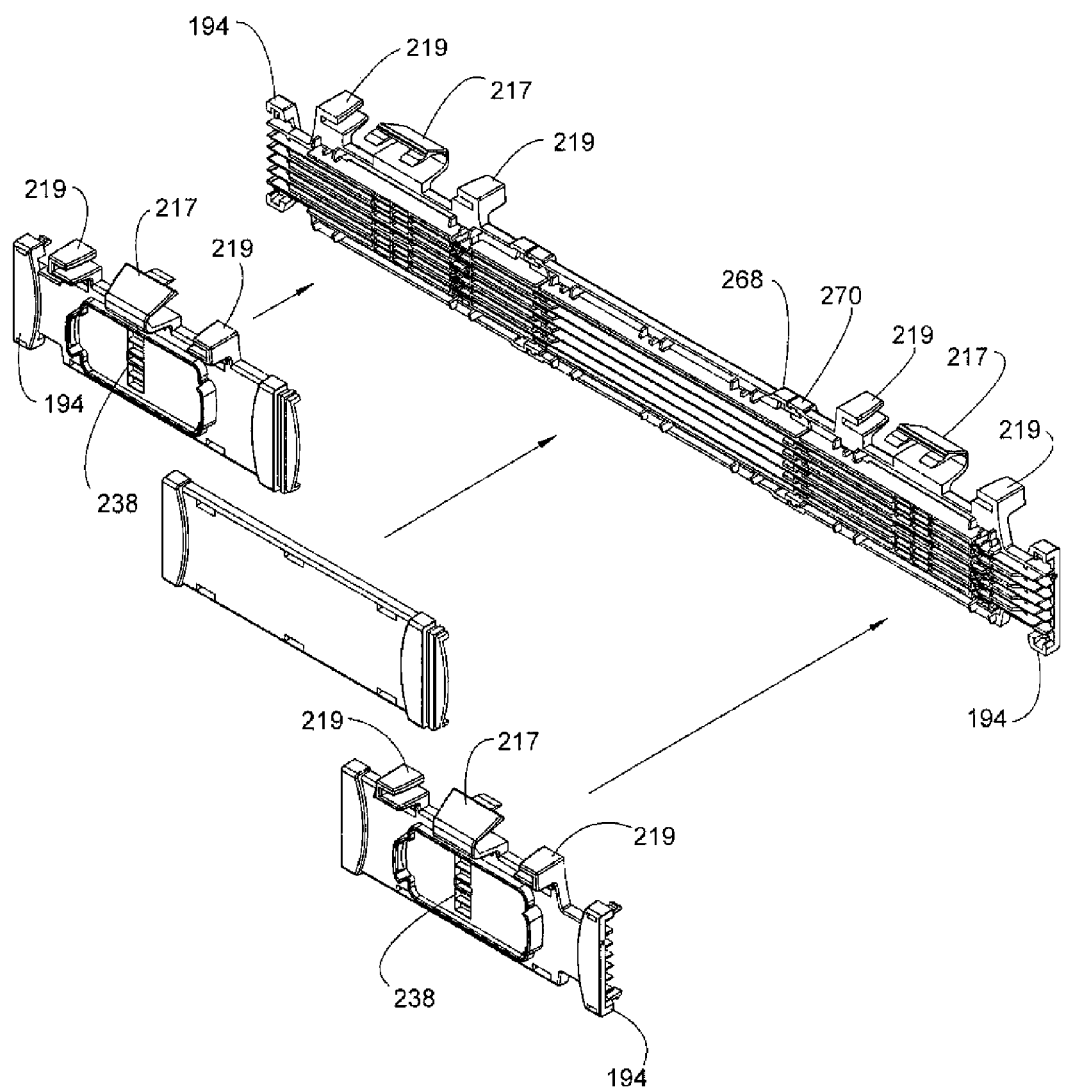
Figure 68:
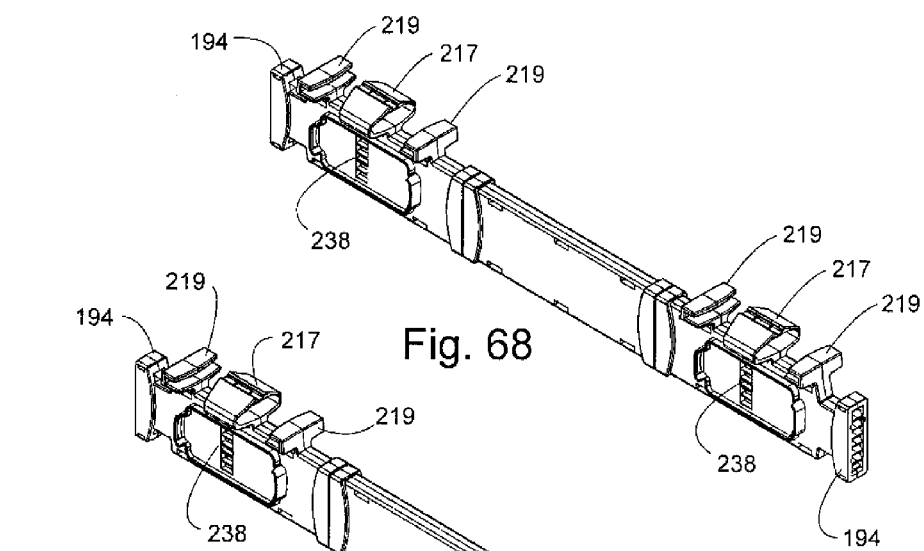
Figure 69:
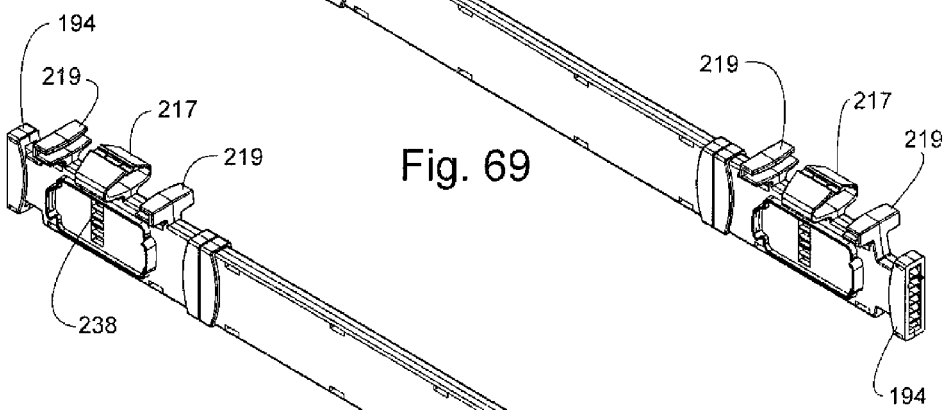
Figure 70:
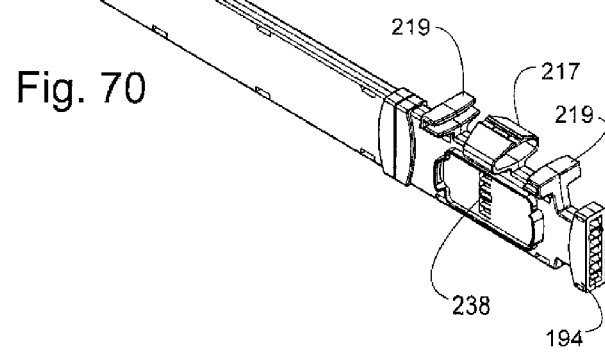
Figure 71:
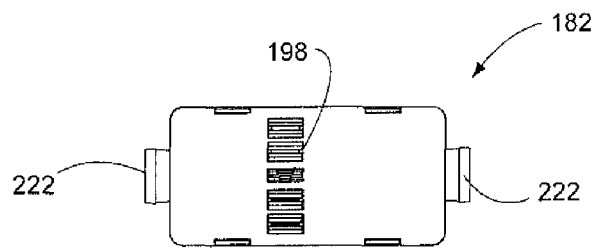
Figure 72:
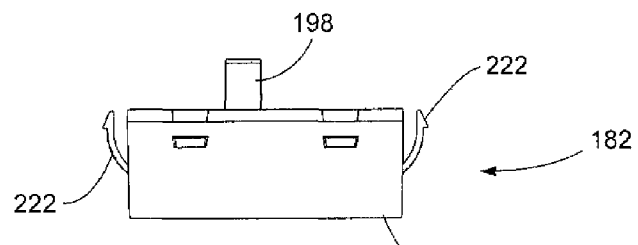
Figure 73:
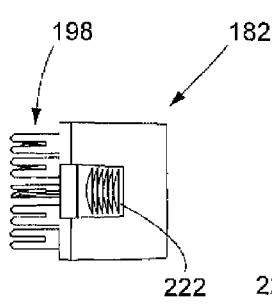
Figure 74:
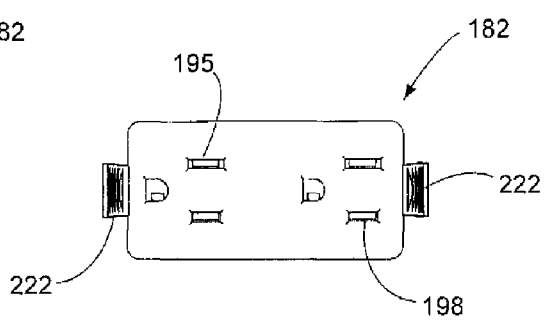
Figure 75:
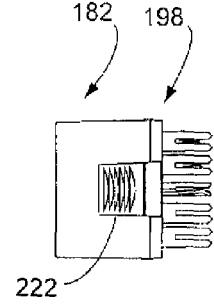
Figure 76:
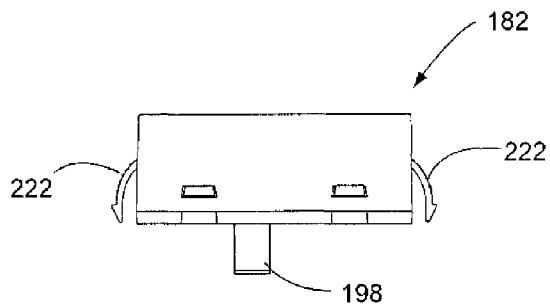
Figure 77:
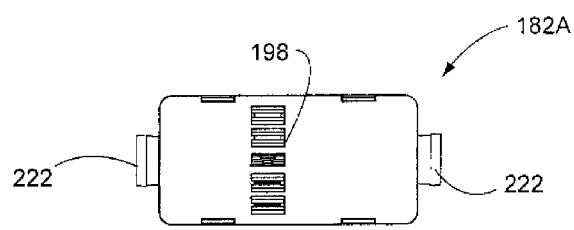
Figure 78:
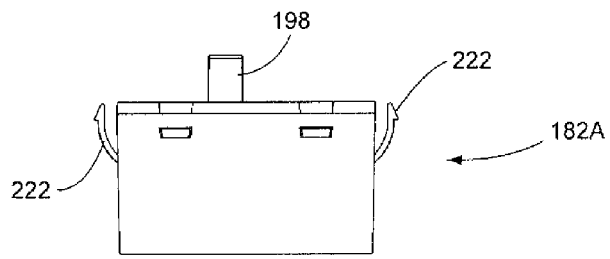
Figure 79:
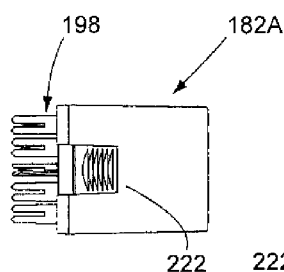
Figure 80:
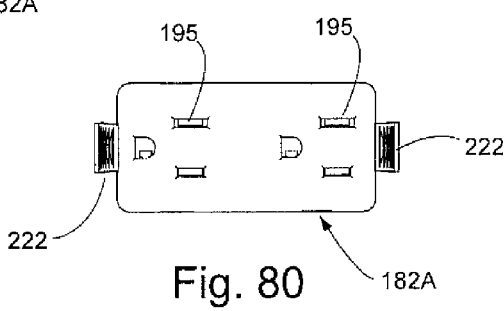
Figure 81:
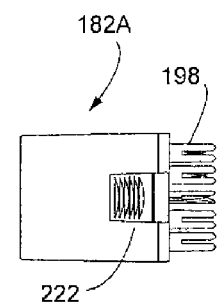
Figure 82:
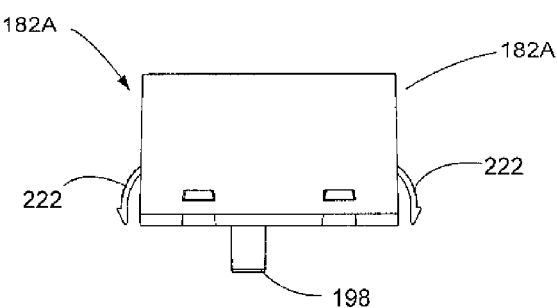
Figure 83:
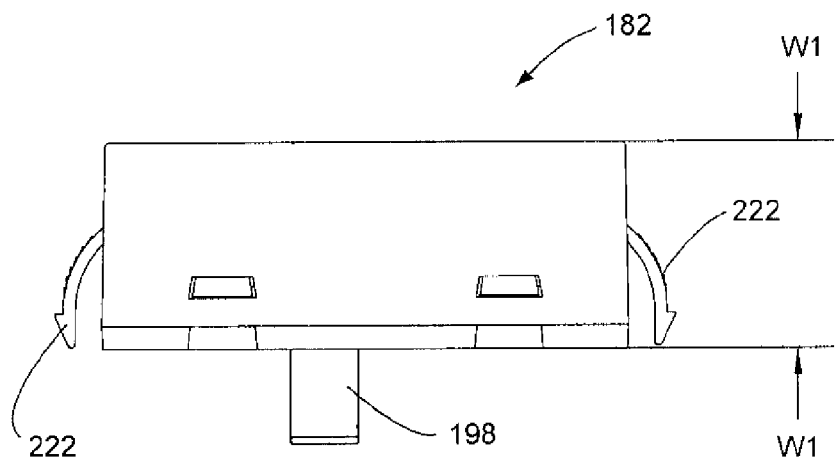
Figure 84:
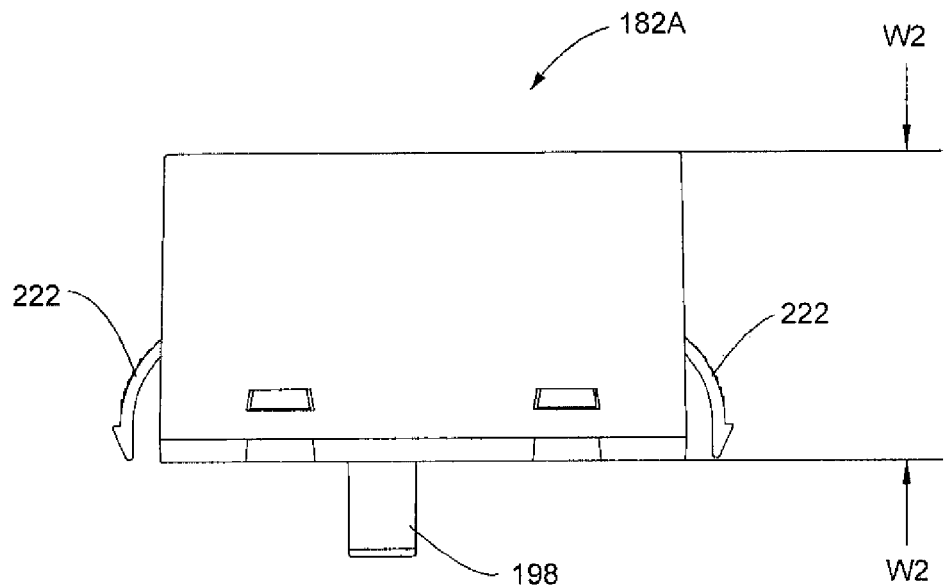
Figure 85:
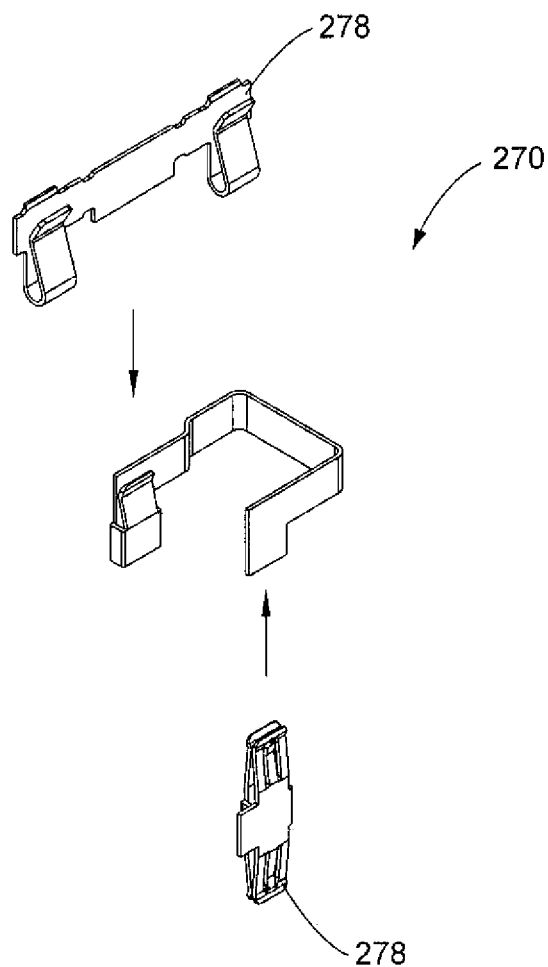
Figure 86:
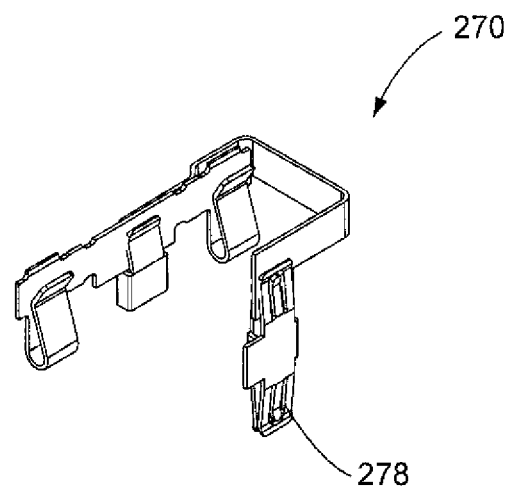
Figure 87:
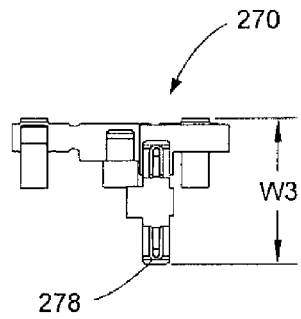
Figure 88:
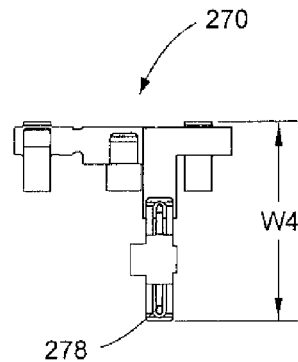
Figure 89:
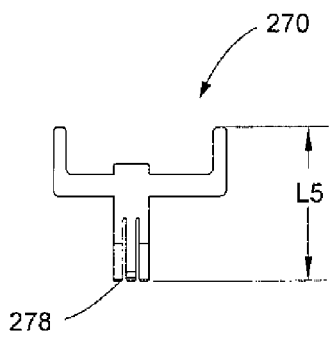
Figure 90:
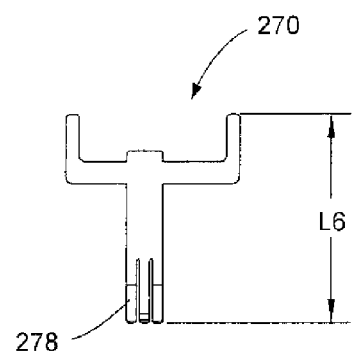
Figure 91:
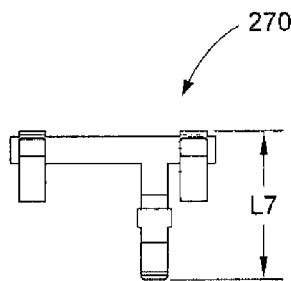
Figure 92:
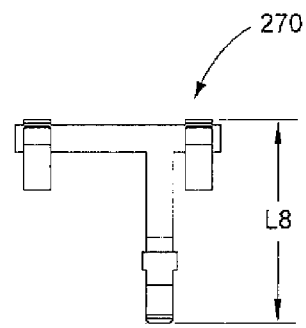
Figure 93:
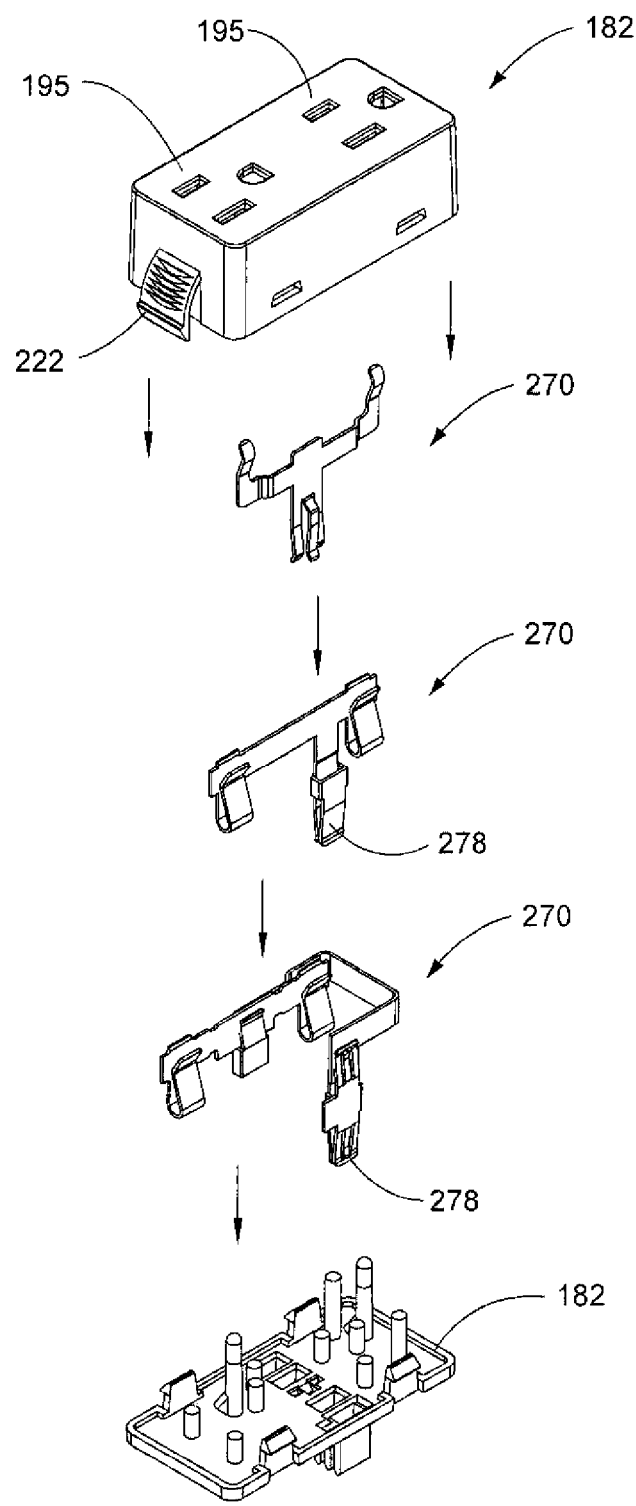
Figure 94:
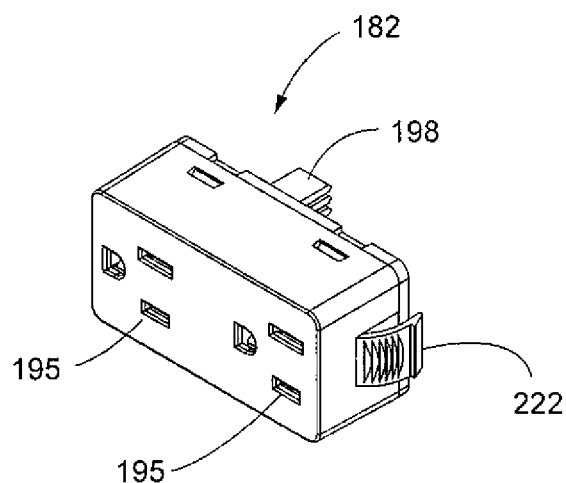
Figure 95:
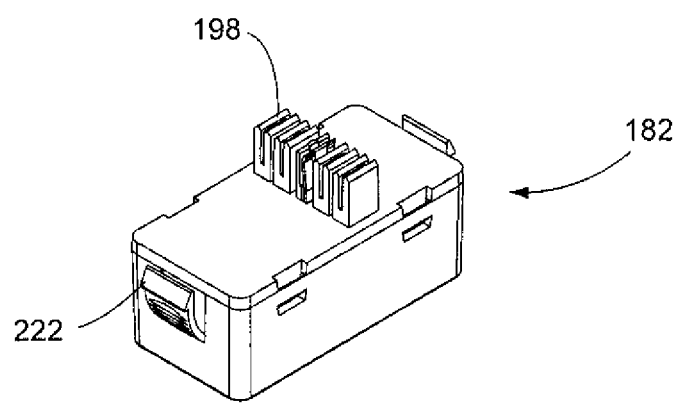
Figure 96:
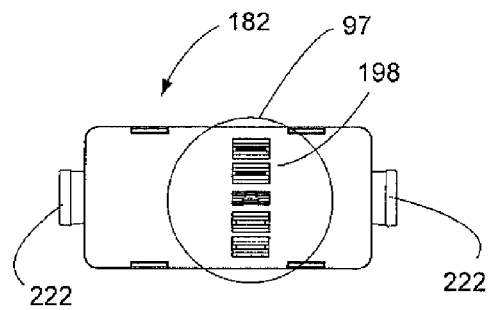
Figure 97:
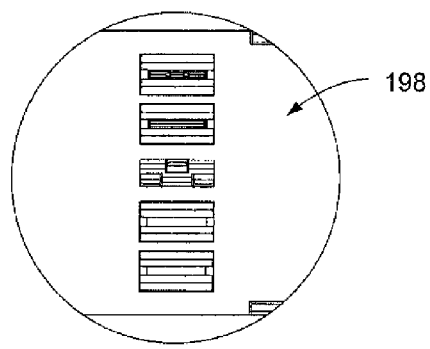
Figure 98:
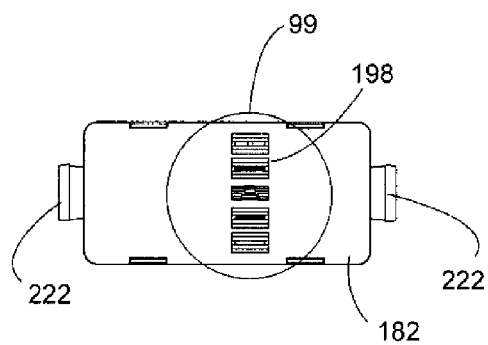
Figure 99:
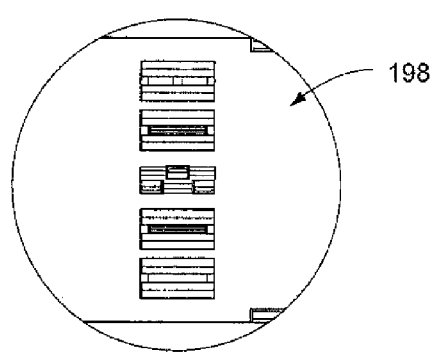
Figure 100:
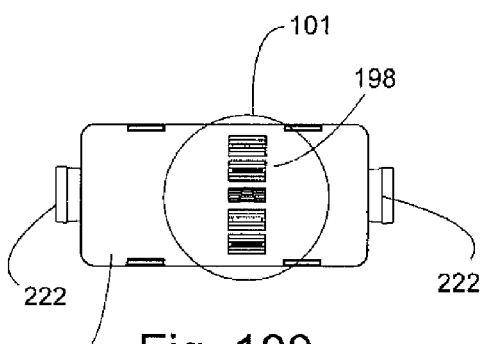
Figure 101:
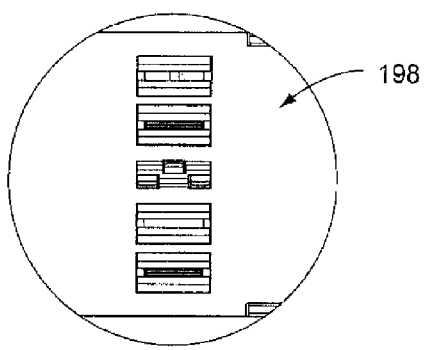
Figure 108:
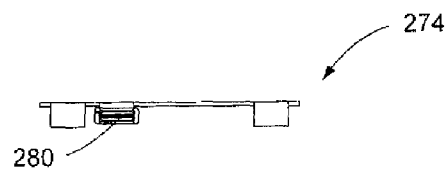
Figure 109:
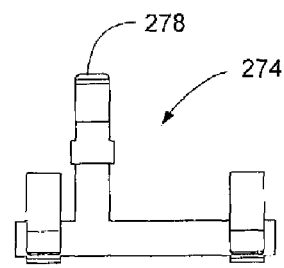
Figure 110:
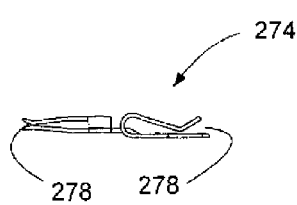
Figure 111:
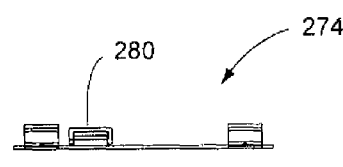
Figure 112:
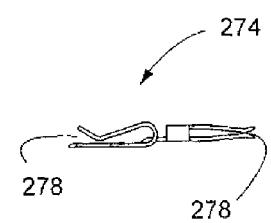
Figure 113:
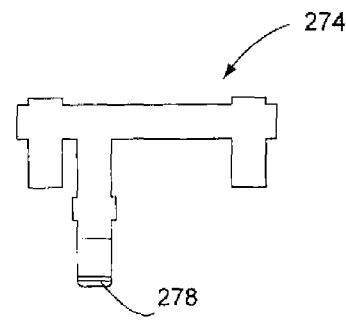
Figure 120:
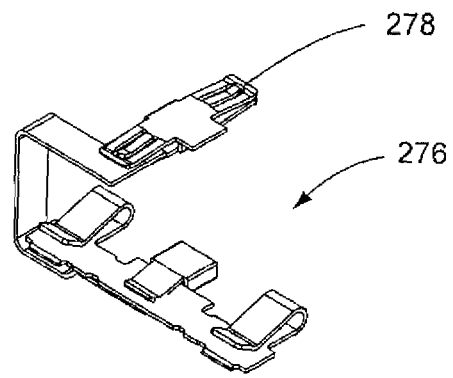
Figure 121:
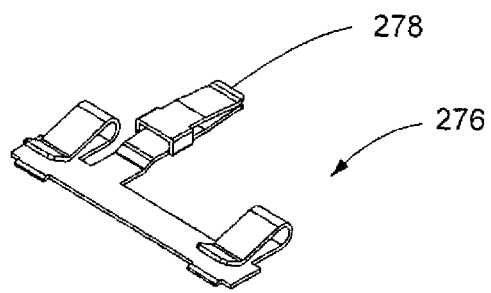
Figure 122:
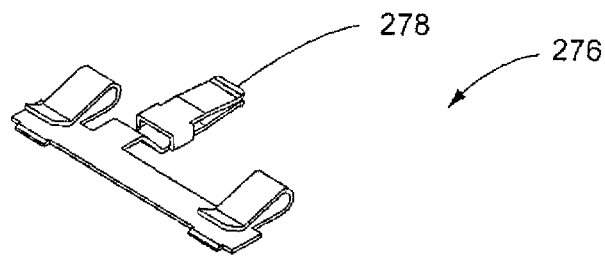
Figure 123:
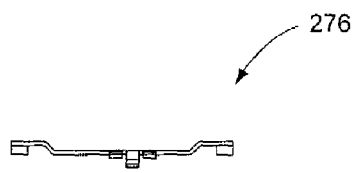
Figure 124:
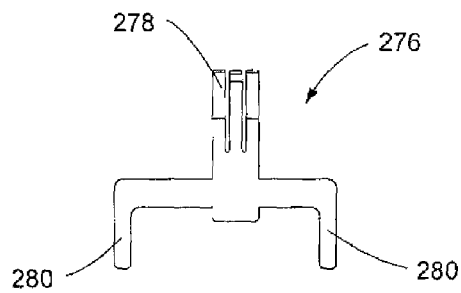
Figure 125:
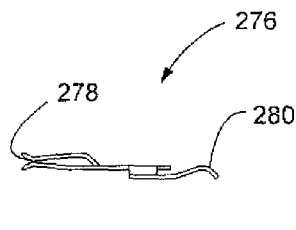
Figure 126:
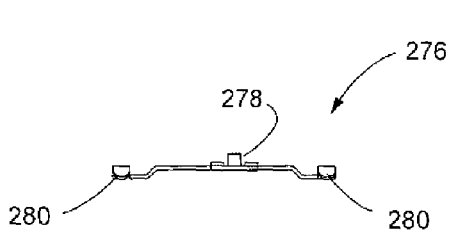
Figure 127:
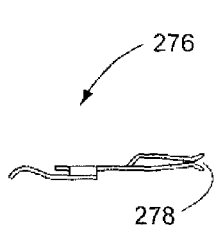
Figure 128:
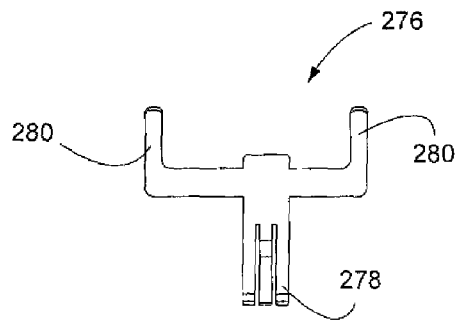
Figure 129:
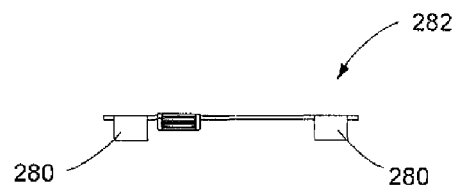
Figure 130:
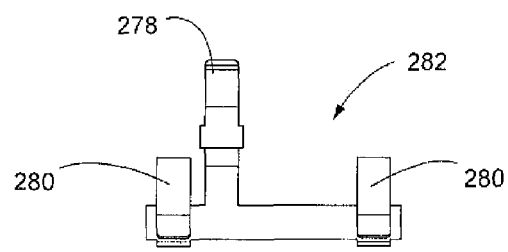
Figure 131:
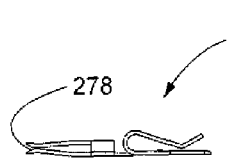
Figure 132:
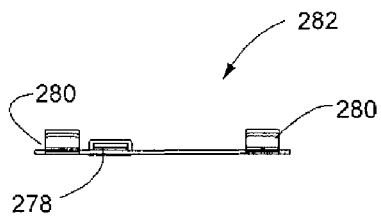
Figure 133:
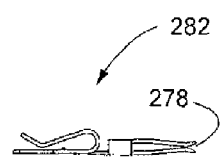
Figure 134:
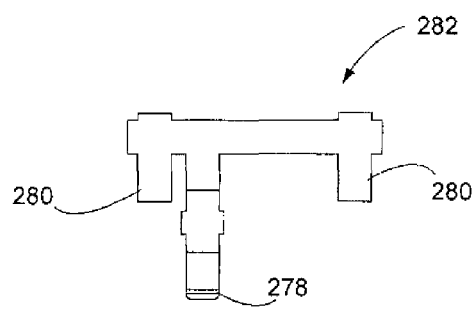
Figure 135:
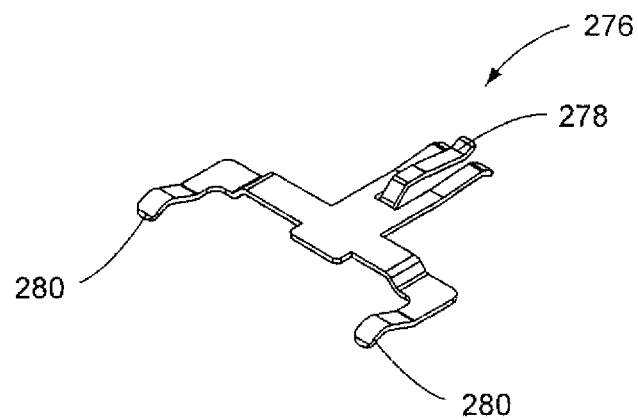
Figure 136:
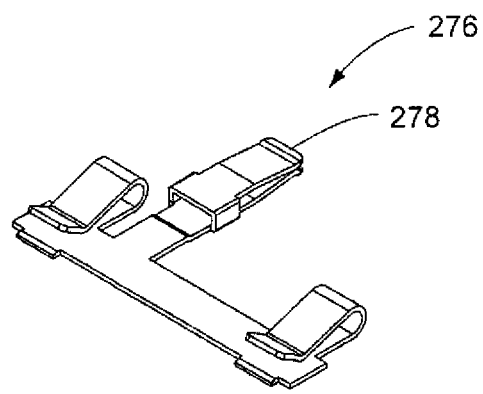
Figure 137:
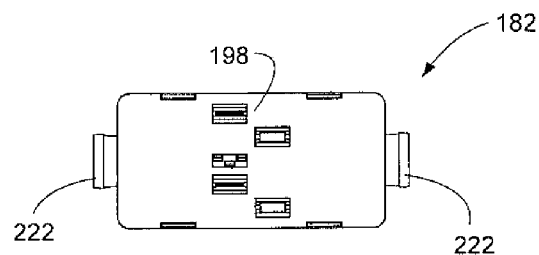
Figure 138:
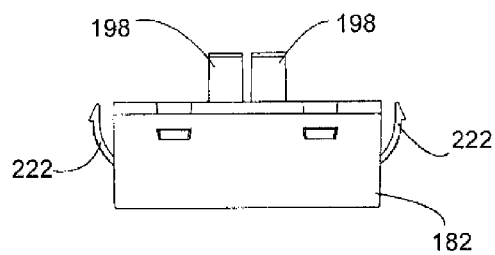
Figure 139:
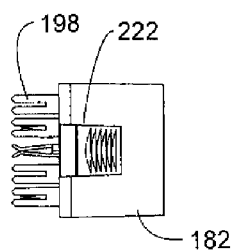
Figure 140:
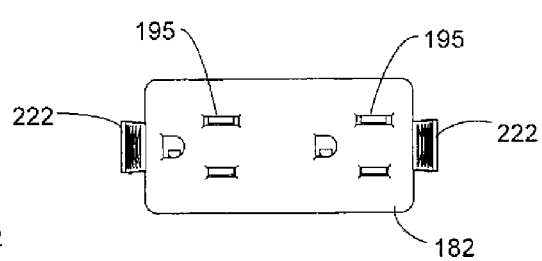
Figure 141:
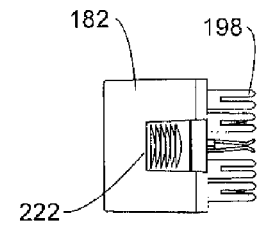
Figure 142:
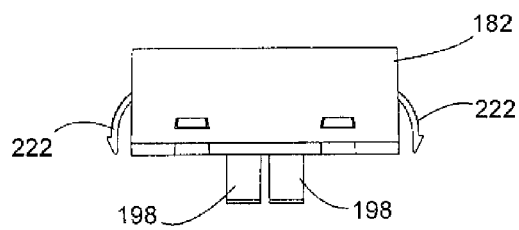
Figure 143:
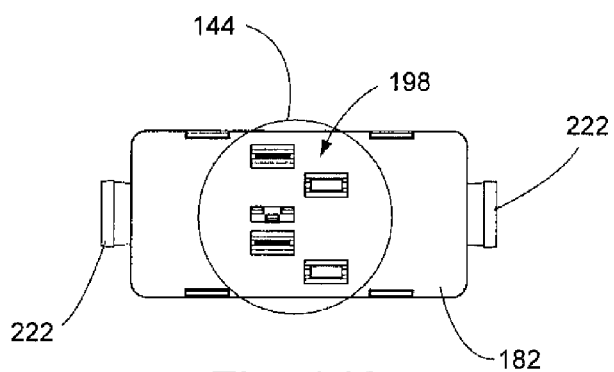
Figure 144:
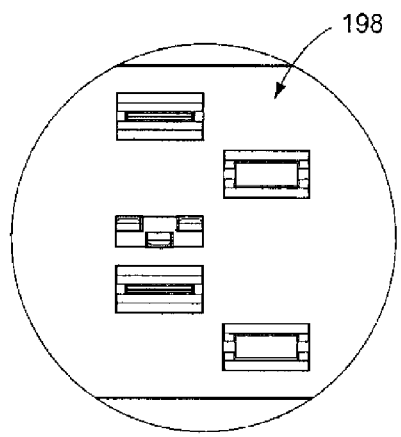
Figure 145:
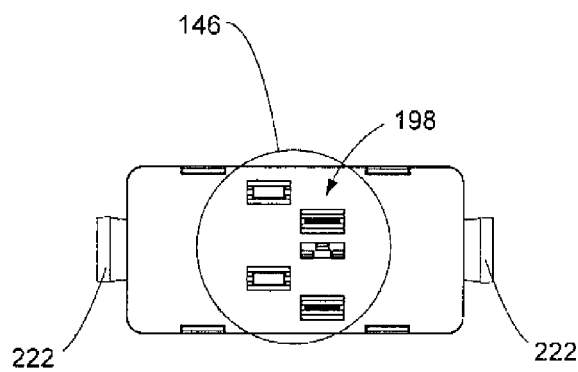
Figure 146:
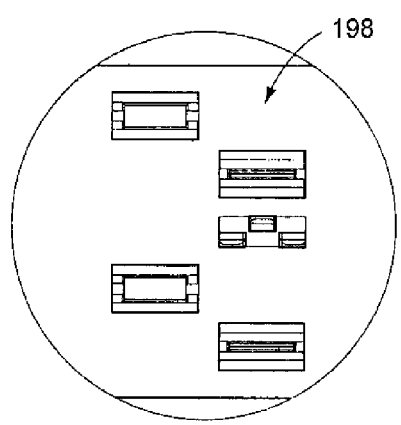
Figure 147:
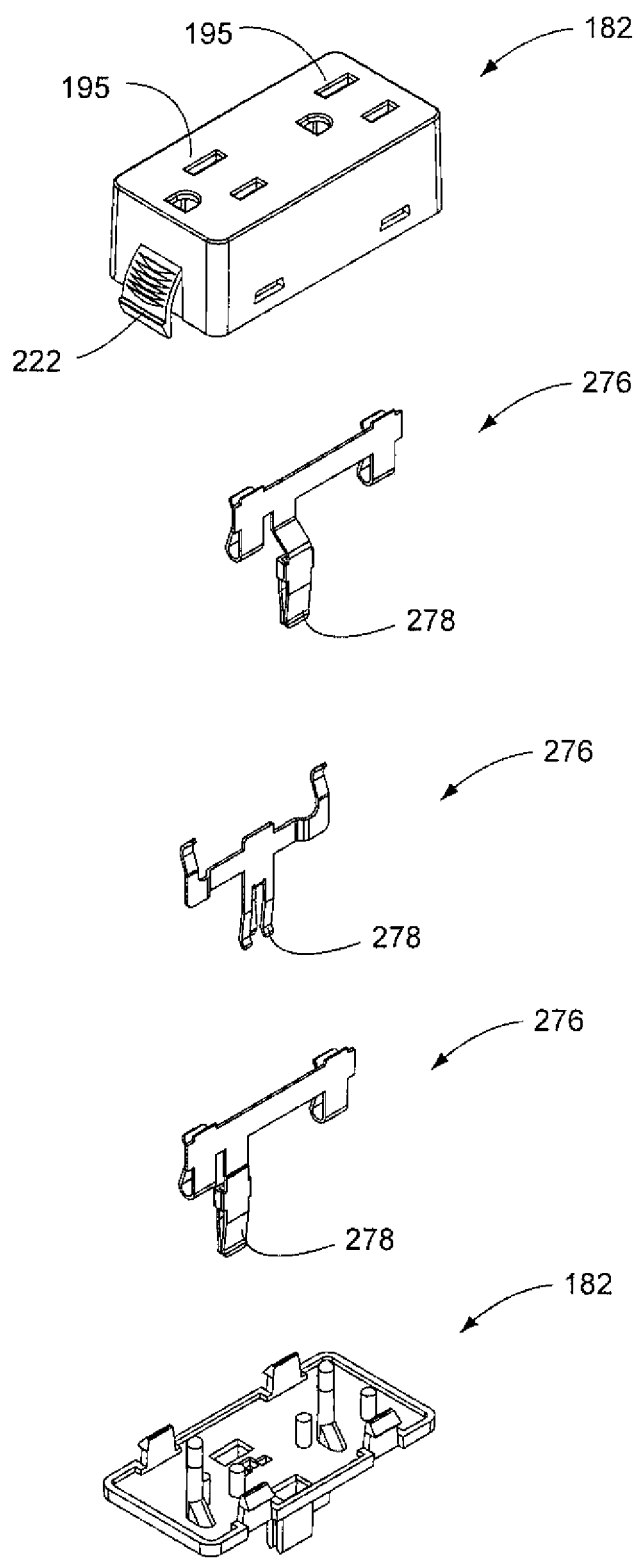
Figure 148:
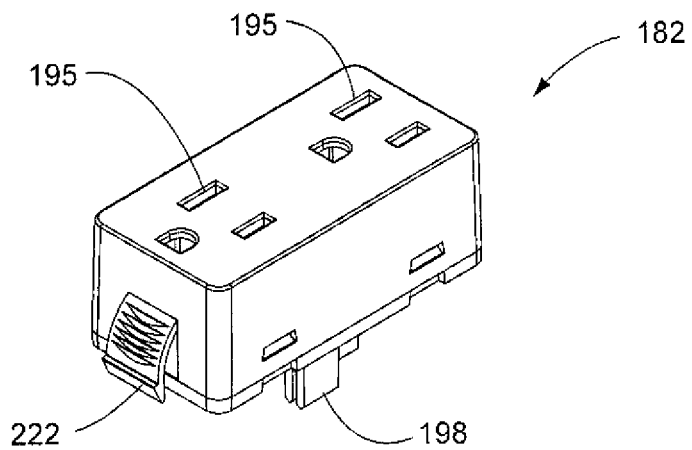
Figure 149:
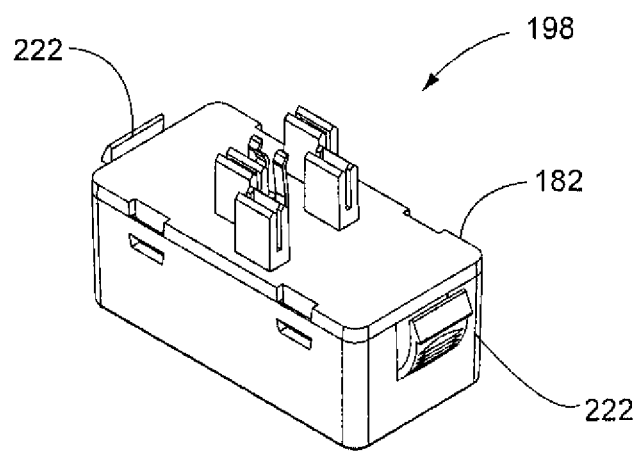

a junction block, with an electrical receptacle block connected thereto;

the female end connector of a separate cable assembly;

a double end connector having a female end connector at one end and a pair of male terminal connector sets at the other end;

a pair of female end connectors of separate cable assemblies, positioned so as to be inserted into a double-sided end connector;

FIG. 22 is a perspective view of the elements shown in FIG. 21 in a fully assembled state;

FIG. 23 is a side, elevation view of a junction block in accordance with the invention;

FIG. 24 is an end view of the junction block shown in FIG. 23, and showing the male end connector of the junction block;

FIG. 24A is a partially schematic drawing showing the five-wire configuration of the junction block of FIG. 23, and showing the circuit configurations of the hot, neutral and ground wires for purposes of achieving the capability of connection to circuit 1, circuit 2 or circuit 3 of the power distribution assembly;

FIG. 25 is a side, elevation view of a junction block in accordance with the invention, for use with a two circuit configuration;

FIG. 26 is an end view of the junction block shown in FIG. 25;

FIG. 26A is a partially schematic diagram of the five-wire configuration of the junction block shown in FIG. 25, and the particular configuration of hot, neutral and ground wires to be utilized to achieve a connection to either circuit 1 or circuit 2 of the two-circuit configuration;

FIG. 27 is an end view of a junction block having a particular configuration of end connectors, so as to insure that only an mating end connector with an appropriate circuit configuration can be used with the end connector of FIG. 27;

FIG. 28 is an end view of another end connector of another junction block, showing a different configuration, with each of the junction block end connectors of FIGS. 27 and 28 having a different keyed connector configuration;

FIG. 29 is a sectional view of a junction block and a corresponding electrical receptacle block, and showing the two in an exploded view with the receptacle block being positioned to be interconnected to the junction block;

FIG. 30 is a sectional view of the junction block and electrical receptacle block shown in FIG. 29, and showing the two elements in a fully assembled state;

FIG. 31 is an elevation view of a junction block of the power distribution assembly in accordance with the invention, and showing the junction block rotated 180 degrees;

FIG. 32 is a plan view of the junction block shown in FIG. 31;

FIG. 33 is a left-side end view of the junction block shown in FIG. 32;

FIG. 34 is a side, elevation view of one side of the junction block shown in FIG. 32;

FIG. 35 is a right-side end view of the junction block shown in FIG. 32;

FIG. 36 is an underside view of the junction block shown in FIG. 32;

FIG. 37 is a view of a double junction block configuration, shown rotated 180 degrees;

FIG. 38 is a plan view of the double junction block configuration shown in FIG. 37;

FIG. 39 is a left-side end view of the double junction block shown in FIG. 38;

FIG. 40 is a side, elevation view of the double junction block shown in FIG. 38;

FIG. 41 is a right-side end view of the double junction block shown in FIG. 38;

FIG. 42 is an underside view of the double junction block shown in FIG. 28;

FIG. 43 is a side, elevation view of a pair of junction blocks interconnected with an intermediate connector, and rotated 180 degrees;

FIG. 44 is a plan view of the junction block configuration shown in FIG. 43;

FIG. 45 is a left-side end view of the junction block configuration shown in FIG. 44;

FIG. 46 is a side, elevation view of the junction block configuration shown in FIG. 44;

FIG. 47 is a right-side end view of the junction block configuration shown in FIG. 44;

FIG. 48 is a plan view of the junction block configuration shown in FIG. 44;

FIG. 49 is a side, elevation view of a junction block in accordance with the invention;

FIG. 50 is a side, elevation view of two of the junction blocks shown in FIG. 49 interconnected together in a double configuration;

FIG. 51 is a side, elevation view of a pair of junction blocks interconnected with a first intermediate connector cable;

FIG. 52 is a view similar to FIG. 51, but showing the connection of the two junction blocks with a second intermediate connector cable of greater length;

FIG. 53 is a side, elevation view similar to FIGS. 51 and 52, and showing the pair of junction blocks being interconnected with a third intermediate connector of greater length than the connectors shown in FIGS. 51 and 52;

FIG. 54 is an exploded view of a portion of a junction block in accordance with the invention, showing the relative positioning of the five-blade terminals;

FIG. 55 is a perspective and exploded view showing the relative positioning of the opposing sides of the junction block;

FIG. 56 is a perspective view of the junction block shown in FIG. 55 in a fully assembled state;

FIG. 57 is a side, elevation view and partially sectional view showing the beads formed on the blade terminals so as to appropriately position them within the junction block;

FIG. 58 is a close-up view of the beads of the blade terminals, illustrated within circle 58 of FIG. 57;

FIG. 59 is a view similar to FIG. 58, but showing the relative positioning of the ends of the blade terminals as assembled within the junction block;

FIG. 60 is a close-up view of the portion of FIG. 59 shown within circle 60;

FIG. 61 is an exploded view of the double-length blade terminals used with the double junction block configuration of the invention;

FIG. 62 shows the double junction block configuration in a fully assembled state;

FIG. 63 shows the use of a first length of blade terminals in an exploded view relative to their positioning with the double junction blocks having an intermediate connector;

FIG. 64 is a close-up view showing the coupling interconnection of the intermediate connector to one of the junction blocks;

FIG. 65 is a perspective view showing the elements of FIG. 63 in a fully assembly state;

FIG. 66 is a close-up view of the portion of FIG. 65 shown within circle 66;

FIG. 67 shows a partially exploded view of the cable assembly shown in FIG. 63, and further showing the relative positioning of the sides of the pair of junction blocks and the intermediate connector;

FIG. 68 is a perspective view of one length of the junction block assembly using a pair of junction blocks and an intermediate connector;

FIG. 69 is a perspective similar to FIG. 68, but showing an assembly with a relatively longer intermediate connector;

FIG. 70 is a perspective view showing a still further length intermediate connector of the junction block assemblies shown in FIGS. 68 and 69;

FIG. 71 is a rear view of an electrical receptacle block in accordance with the invention;

FIG. 72 is a plan view of the receptacle block shown in FIG. 71;

FIG. 73 is a left-end view of the receptacle block shown in FIG. 72;

FIG. 74 is a front, elevation view of the electrical receptacle block shown in FIG. 72;

FIG. 75 is a right-side end view of the junction block shown in FIG. 72;

FIG. 76 is an underside view of the receptacle block shown in FIG. 72;

FIG. 77 is a rear view of a further electrical receptacle block in accordance with the invention;

FIG. 78 is a plan view of the receptacle block shown in FIG. 77;

FIG. 79 is a left-side end view of the receptacle block shown in FIG. 78;

FIG. 80 is a front, elevation view of the receptacle block shown in FIG. 78;

FIG. 81 is a right-side end view of the receptacle block shown in FIG. 78;

FIG. 82 is an underside view of the receptacle block shown in FIG. 78;

FIG. 83 is a plan view of a receptacle block in accordance with the invention, showing the block as having a width W1;

FIG. 84 is a plan view of the receptacle block similar to FIG. 83, but showing the block as having a width W2;

FIG. 85 is an exploded view of a connector arrangement, showing three elements of a connector;

FIG. 86 is a perspective view of the connector assembly shown in FIG. 85 in a fully assembled state;

FIG. 87 is a plan view of a connector assembly having a width W3;

FIG. 88 is a connector assembly similar in configuration to the assembly of FIG. 87, but having a width W4;

FIG. 89 is a half-H connector having a length L5;

FIG. 90 is a half-H connector similar to FIG. 89, but having a length L6;

FIG. 91 is a connector having a double configuration on one side and a single configuration on the other side, with a length L7;

FIG. 92 is a connector assembly similar to the assembly of FIG. 91, but having a length L8;

FIG. 93 is a perspective and exploded view of a receptacle block in connection with the invention, and showing the various connector configurations connector configurations;

FIG. 94 is a perspective view of the receptacle block shown in FIG. 93, in a fully assembled state;

FIG. 95 is a rear, perspective view of the receptacle block shown in FIG. 94;

FIG. 96 is a rear, elevation view of a receptacle block in accordance with the invention, having a first circuit configuration;

FIG. 97 is an enlarged view of the terminal configuration shown in circle 97 of FIG. 96;

FIG. 98 is a rear, elevation view of a receptacle block having a second circuit configuration;

FIG. 99 is an enlarged view of the portion of FIG. 98 shown within circle 99;

FIG. 100 is a rear, perspective view of a receptacle block in accordance with the invention having a third terminal configuration for use with a third circuit configuration;

FIG. 101 is an enlarged view of the portion of FIG. 100 shown within circle 101;

FIG. 102 is a side, elevation view of a further embodiment of a terminal configuration in accordance with the invention, rotated 180 degrees;

FIG. 103 is a plan view of the terminal shown in FIG. 102;

FIG. 104 is a left-side end view of the terminal shown in FIG. 102;

FIG. 105 is a front, elevation view of the terminal shown in FIG. 102;

FIG. 106 is a right-side end view of the terminal shown in FIG. 102;

FIG. 107 is an underside view of the terminal shown in FIG. 102;

FIG. 108 is a side, elevation view of a further embodiment of a terminal in accordance with the invention, rotated 180 degrees;

FIG. 109 is a plan view of the terminal shown in FIG. 108;

FIG. 110 is a left-side end view of the terminal shown in FIG. 108;

FIG. 111 is a front, elevation view of the terminal shown in FIG. 108;

FIG. 112 is a right-side, end view of the terminal shown in FIG. 108;

FIG. 113 is an underside view of the terminal shown in FIG. 108;

FIG. 114 is a side, elevation view of a still further embodiment of a terminal in accordance with the invention;

FIG. 115 is a plan view of the terminal shown in FIG. 114;

FIG. 116 is a left-side end view of the terminal shown in FIG. 114;

FIG. 117 is a front, elevation view of the terminal shown in FIG. 114;

FIG. 118 is a right-side end view of the terminal shown in FIG. 114;

FIG. 119 is an underside view of the terminal shown in FIG. 114;

FIG. 120 is a perspective view of the terminal shown in FIGS. 102-107;

FIG. 121 is a perspective view of the terminal shown in FIGS. 108-113;

FIG. 122 is a perspective view of the terminal shown in FIGS. 114-119;

FIG. 123 is a side, elevation view of a still further terminal configuration in accordance with the invention;

FIG. 124 is a plan view of the terminal shown in FIG. 123;

FIG. 125 is a left-side end view of the terminal shown in FIG. 123;

FIG. 126 is a front, elevation view of the terminal shown in FIG. 123;

FIG. 127 is a right-side end view of the terminal shown in FIG. 123;

FIG. 128 is an underside view of the terminal shown in FIG. 123;

FIG. 129 is a side, elevation view of a still further embodiment of a female connector terminal in accordance with the invention;

FIG. 130 is a plan view of the terminal shown in FIG. 129;

FIG. 131 is a left-side end view of the connector terminal shown in FIG. 129;

FIG. 132 is a front, elevation view of the terminal shown in FIG. 129;

FIG. 133 is a right-side end view of the terminal shown in FIG. 129;

FIG. 134 is an underside view of the terminal shown in FIG. 129;

FIG. 135 is a perspective view of the connector terminal shown in FIGS. 123-128;

FIG. 136 is a perspective view of the connector terminal shown in FIGS. 129-134;

FIG. 137 is a side, elevation view of an electrical receptacle block in accordance with the invention, rotated 180 degrees;

FIG. 138 is a plan view of the receptacle block shown in FIG. 137;

FIG. 139 is a left-side end view of the connector terminal shown in FIG. 137;

FIG. 140 is a front, elevation view of the connector terminal shown in FIG. 137;

FIG. 141 is a right-side end view of the connector terminal shown in FIG. 137;

FIG. 142 is an underside view of the connector terminal shown in FIG. 137;

FIG. 143 is a view similar to FIG. 137, but showing the terminal connectors in an enlarged view;

FIG. 144 is an enlargement of the area within circle 144 of FIG. 143;

FIG. 145 is a side, elevation view of the electrical receptacle block of FIG. 143 rotated 180 degrees, and showing an enlarged view of the terminal connectors;

FIG. 146 is an enlargement of the area within circle 146 of FIG. 145;

FIG. 147 is an exploded view of an electrical receptacle block in accordance with the invention, showing the relative positioning of three of the terminal connectors within the receptacle block;

FIG. 148 shows the receptacle block of FIG. 147 in a fully assembled state;

FIG. 149 is a rear, perspective view of the receptacle block of FIG. 148;

FIG. 150 is a perspective and partially exploded view illustrating a junction block having a series of terminals representing a plurality of different electrical circuits, and an electrical outlet receptacle block which could be selectively and electrically interconnected to different ones of the electrical circuits in accordance with the invention;

FIG. 151 is a perspective view of the components of FIG. 150 in a fully assembled state;

FIG. 152 is a perspective view of the receptacle block of FIG. 150, and showing the concept that the block can be rotated 180 degrees;

FIG. 153 shows the relative positioning of the electrical receptacle block shown in FIG. 150, with the block rotated 180 degrees relative to the junction block, so as to provide for the capability of interconnecting the receptacle block to a different circuit within the junction block;

FIG. 154 shows the components of FIG. 153 in a fully assembled state;

FIG. 155 illustrates a rear, elevation view of an end connector in accordance with the invention;

FIG. 156 is a plan view of the end connector shown in FIG. 155; and

Figure 173:
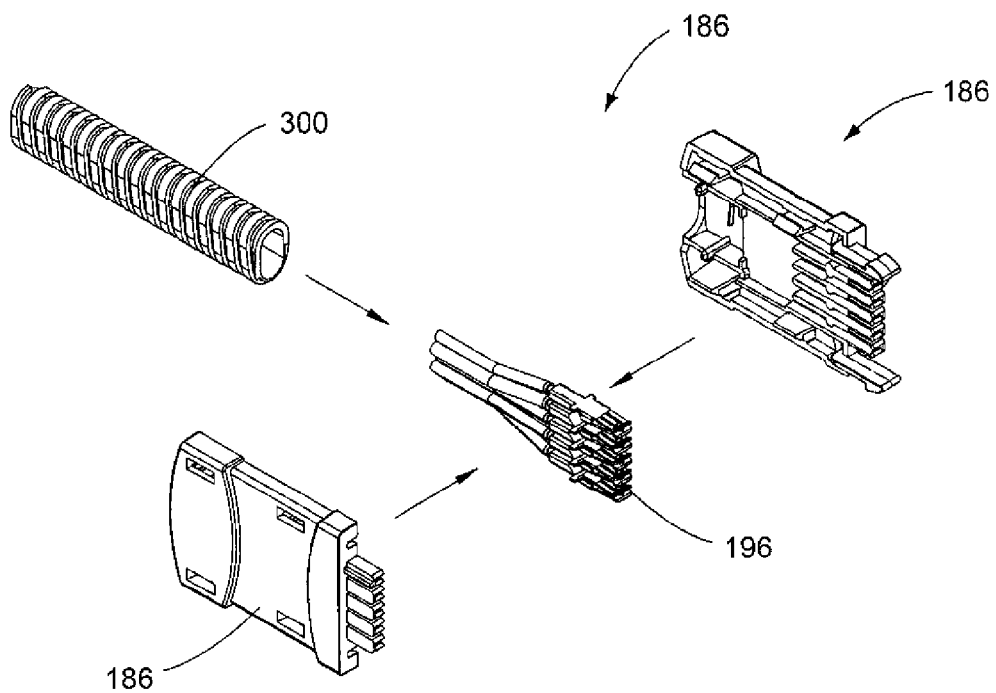
Figure 174:
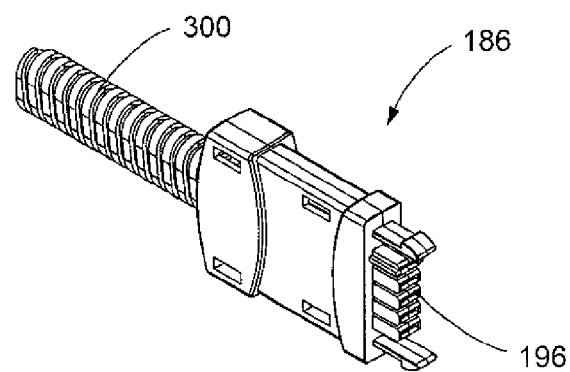
Figure 175:
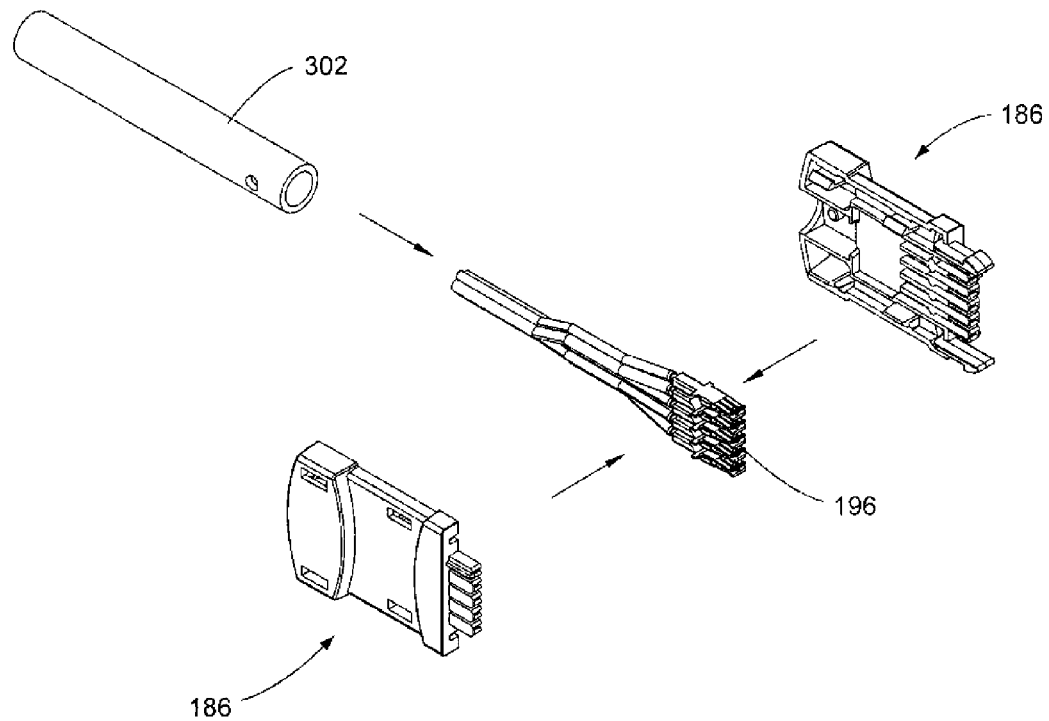
Figure 176:
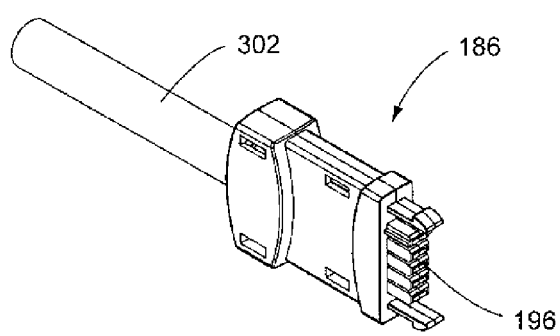
Figure 177:
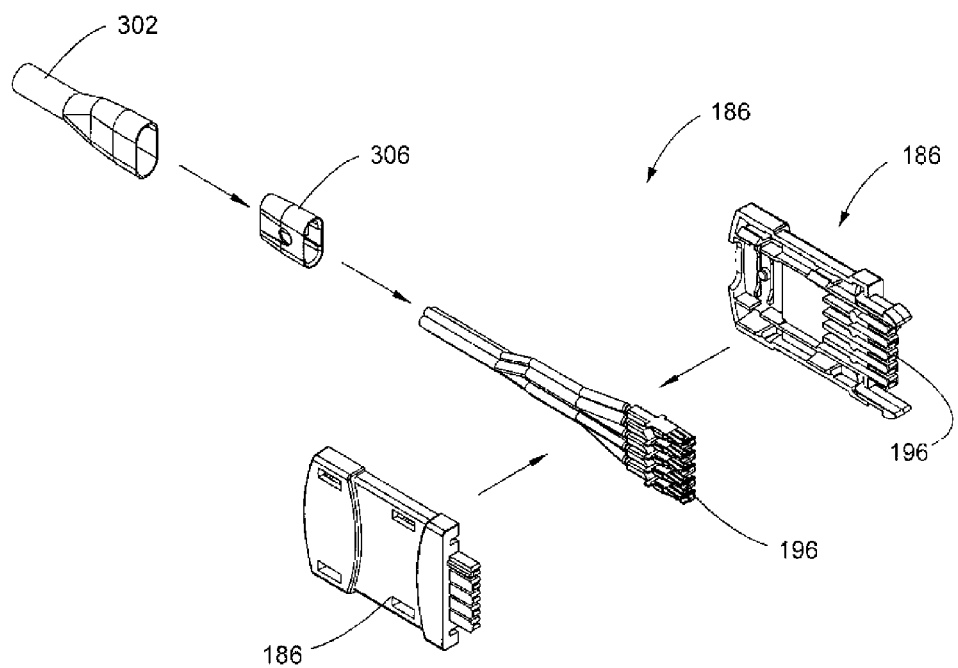
Figure 178:
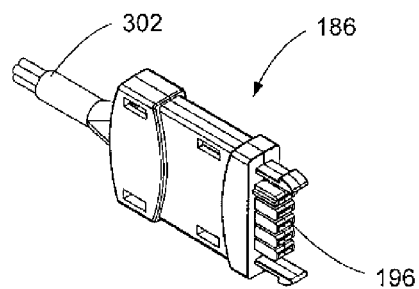
Figures 182, 183:
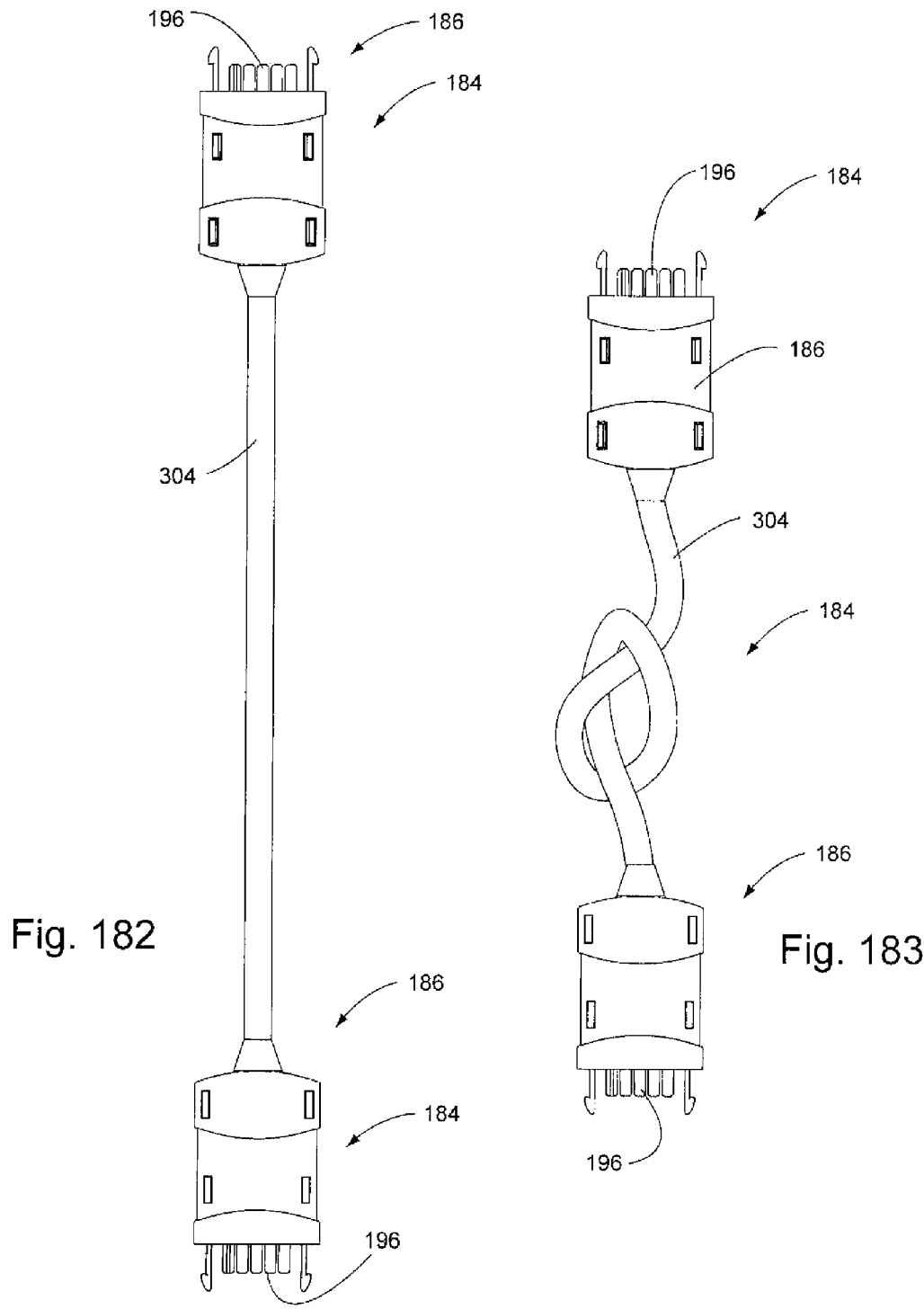
Figure 184:
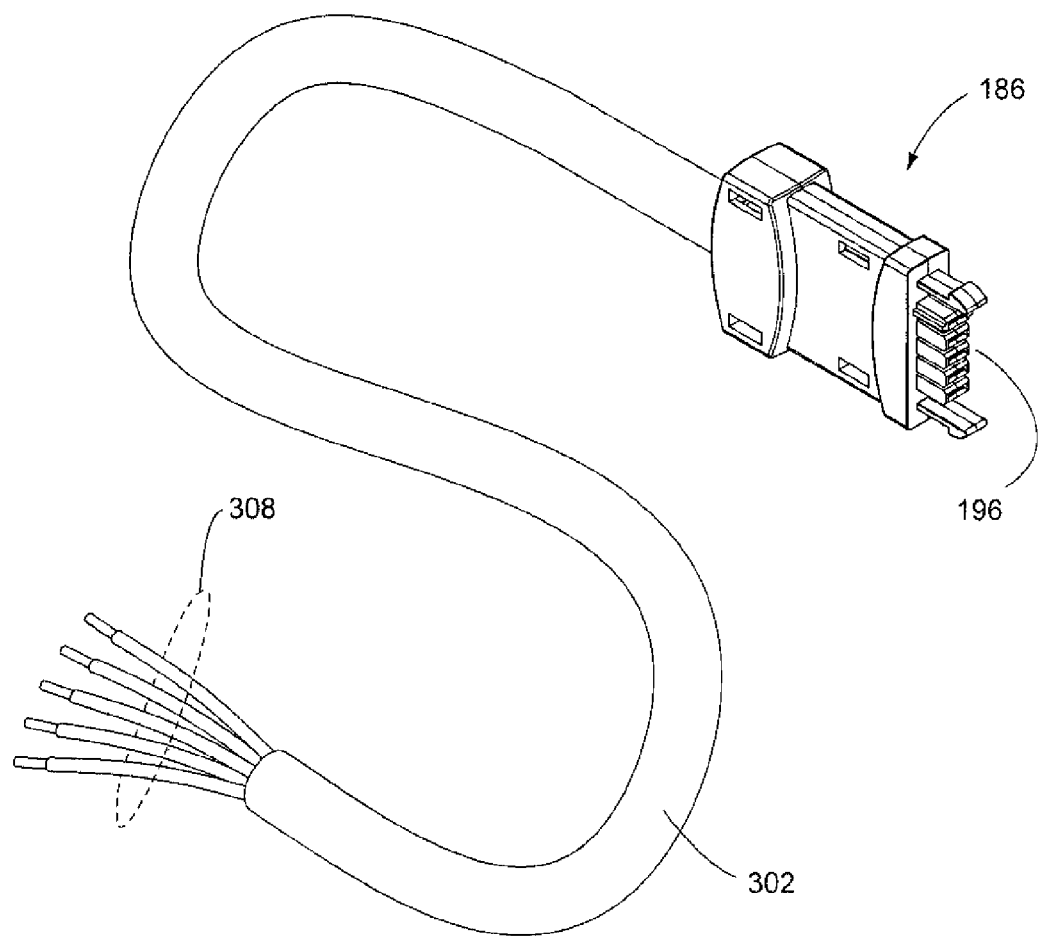
Figure 185:
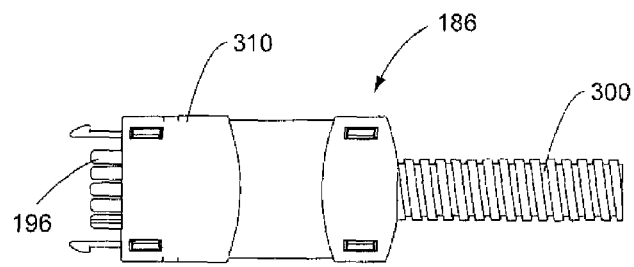
Figure 186:
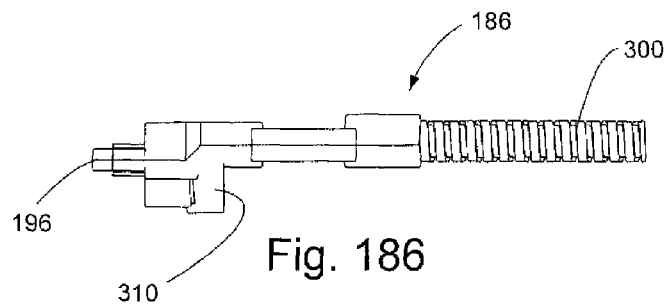
Figures 187, 188, 189:
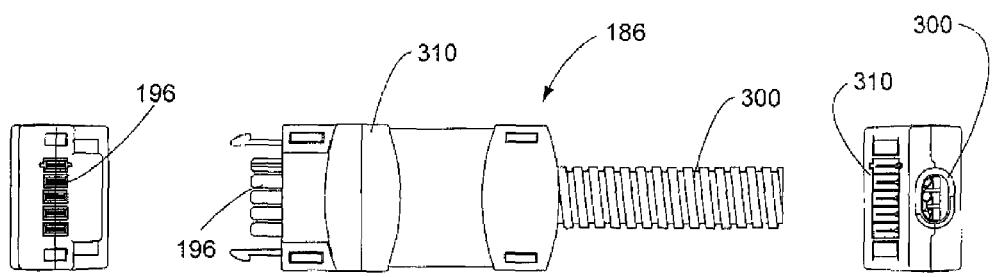
Figure 190:
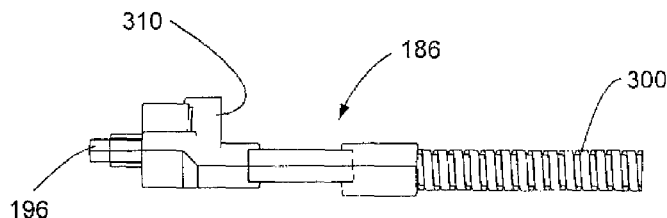
Figure 197:
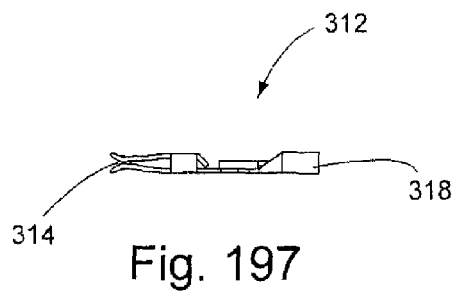
Figure 198:
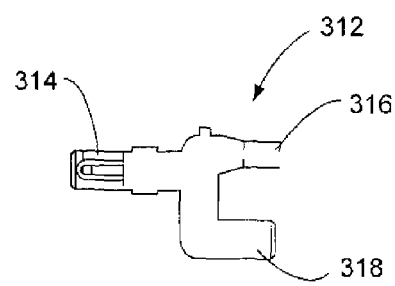
Figure 199:
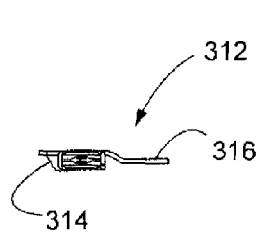
Figure 200:
Figure 201:
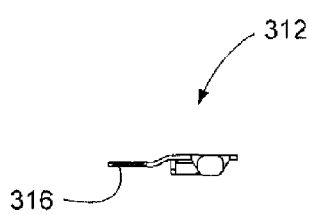
Figure 202:
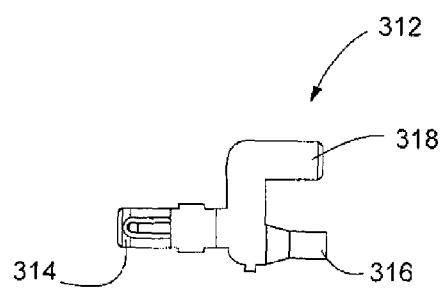
Figure 203:
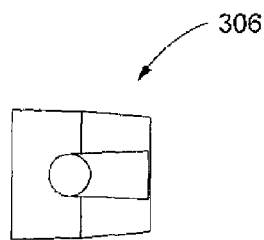
Figure 204:
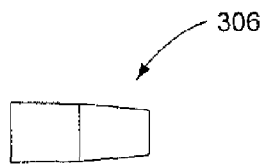
Figure 205:
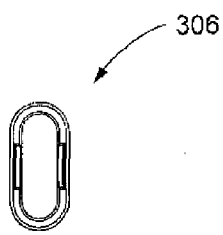
Figure 206:
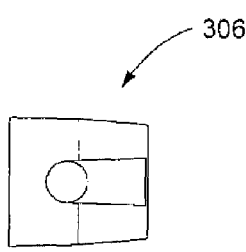
Figure 207:
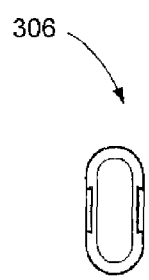
Figure 208:
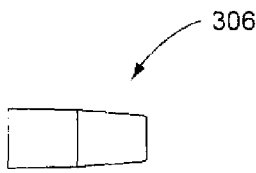
Figure 209:
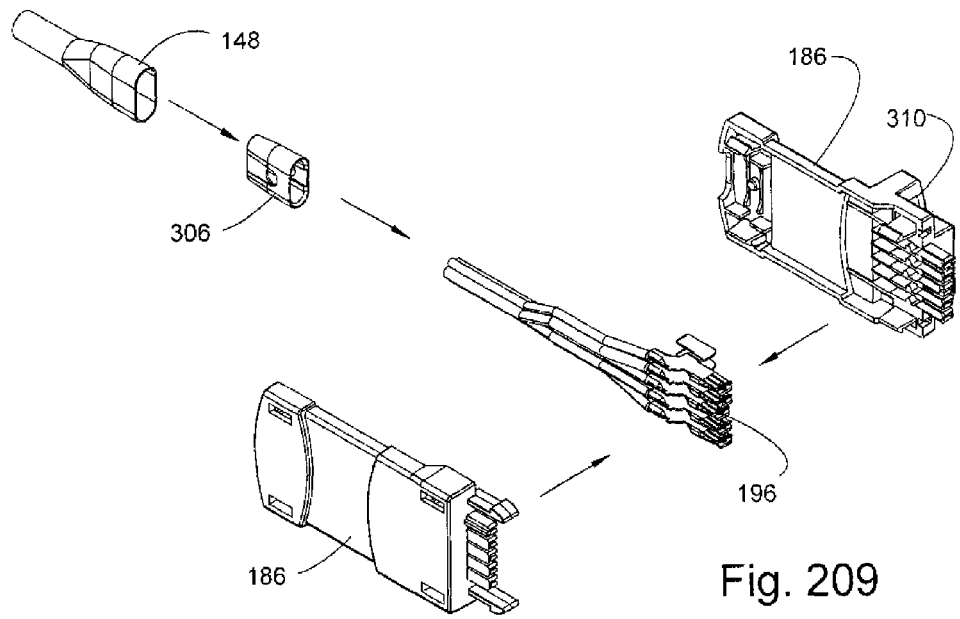
Figure 210:
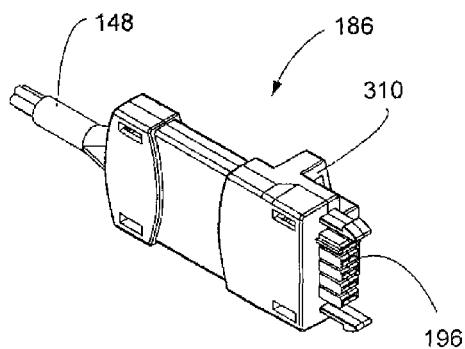
Figure 211:
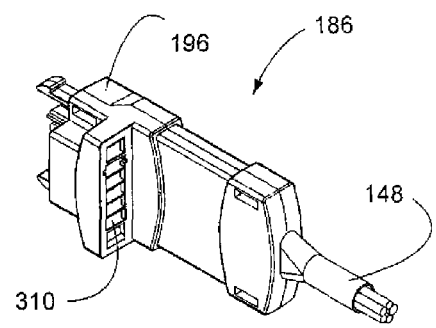
Figure 215:
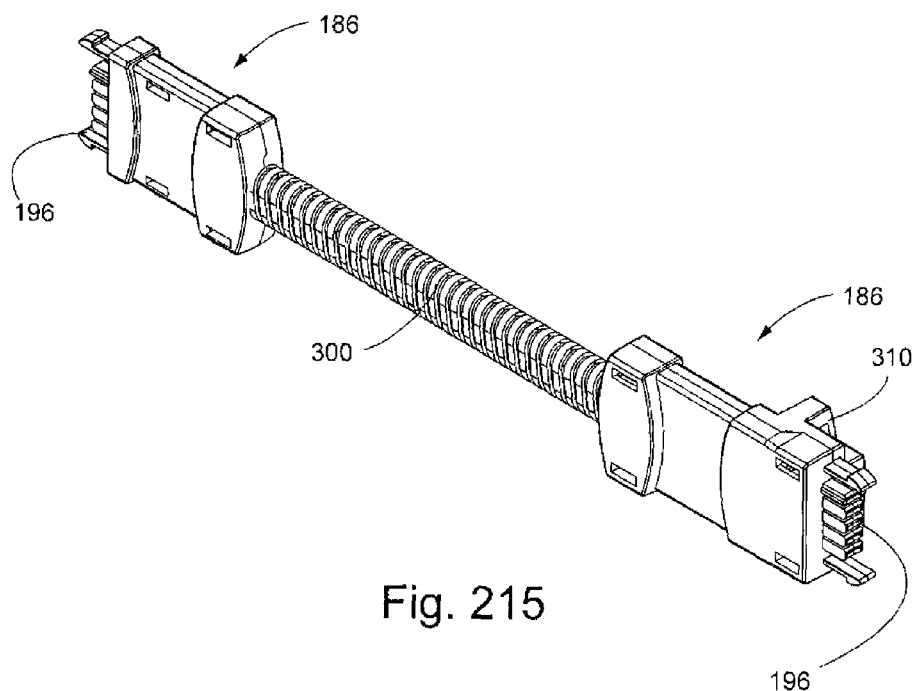
Figure 217:
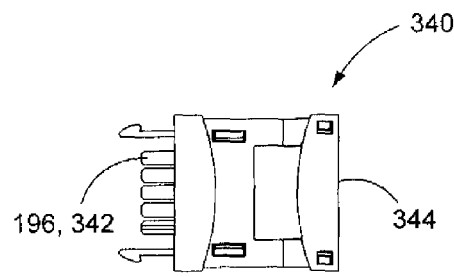
Figure 218:
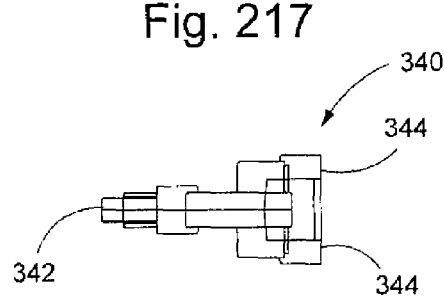
Figure 219:
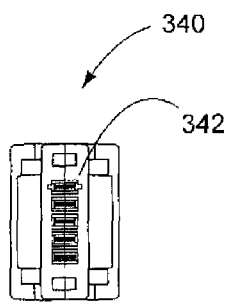
Figure 220:
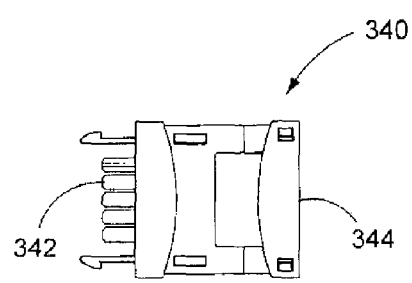
Figure 221:
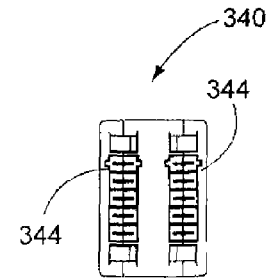
Figure 222:
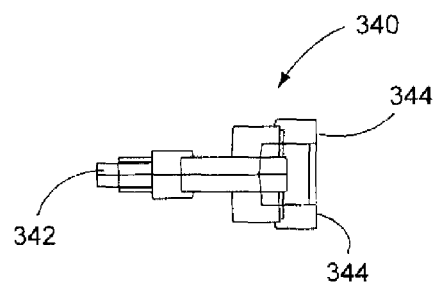
Figure 223:
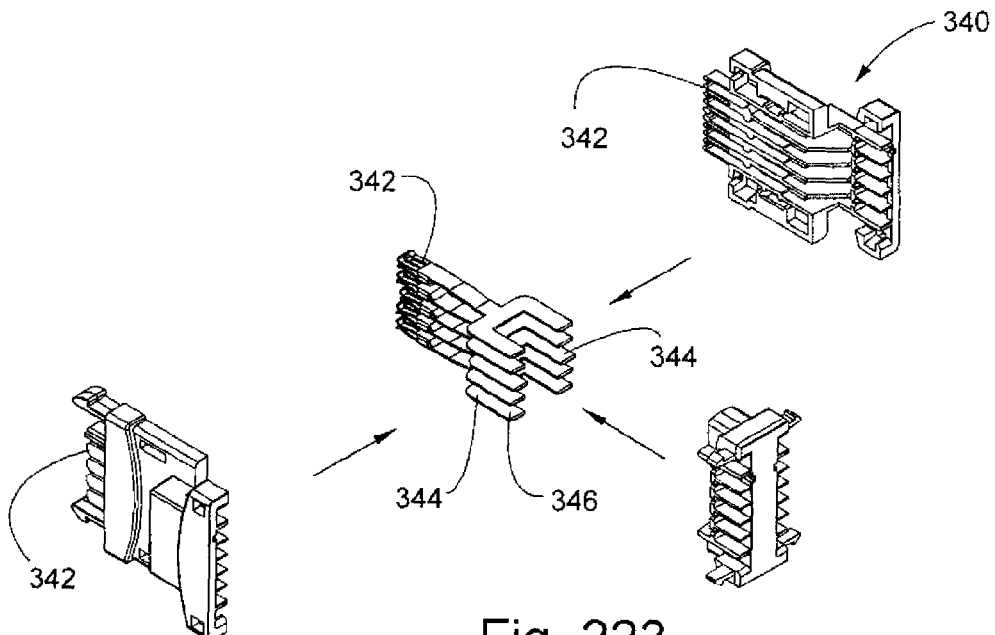
Figure 224:
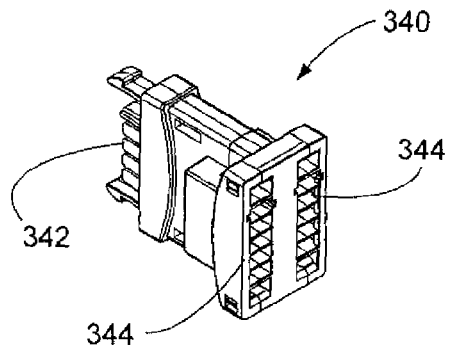
Figure 225:
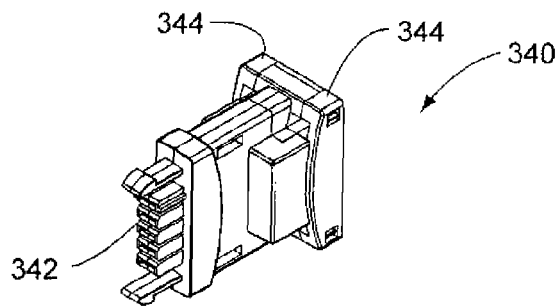

FIG. 157 is a left-side end view of the connector shown in FIG. 155;

FIG. 158 is a front, elevation view of the end connector shown in FIG. 155;

FIG. 159 is a right-side end view of the end connector shown in FIG. 155, and showing the concept of having one of the terminal connectors being a keyed connector;

FIG. 160 is an underside view of the end connector shown in FIG. 155;

FIG. 161 is a rear, elevation view of an end connector similar to that of FIG. 155, but showing the end connector with a conventional cable;

FIG. 162 is a plan view of the connector shown in FIG. 161;

FIG. 163 is a left-side end view of the connector shown in FIG. 161, and showing one of the terminal connectors as being a keyed connector;

FIG. 164 is a front, elevation view of the end connector shown in FIG. 161;

FIG. 165 is a right-side end view of the end connector shown in FIG. 161, and showing the individual wires within the cable;

FIG. 166 is an underside view of the connector shown in FIG. 161;

FIG. 167 is a rear, elevation view of an end connector similar to that shown in FIG. 161, but shown with a substantially flat or oval cable assembly;

FIG. 168 is a plan view of the connector shown in FIG. 167;

FIG. 169 is a left-side end view of the connector shown in FIG. 167;

FIG. 170 is a front, elevation view of the connector assembly shown in FIG. 167;

FIG. 171 is a right-side end view of the connector assembly shown in FIG. 167;

FIG. 172 is an underside view of the connector assembly shown in FIG. 167;

FIG. 173 is an exploded view of the components of the end connector shown in FIGS. 155-160;

FIG. 174 is a perspective view of the end connector shown in FIG. 173 in a fully assembled stated;

FIG. 175 is an exploded view of components of the end connector shown in FIGS. 161-166;

FIG. 176 is a perspective view of the end connector shown in FIG. 175, in a fully assembled state;

FIG. 177 is an exploded view of the end connector shown in FIGS. 167-172;

FIG. 178 is a perspective view of the end connector shown in FIG. 177, in a fully assembled state;

FIG. 179 is a perspective view of a connector assembly having two end connectors, with a conduit therebetween;

FIG. 180 is a connector assembly similar to FIG. 179, but having a conventional interconnecting cable;

FIG. 181 is a perspective view of a connector assembly similar to the assembly of FIG. 179, but utilizing a relatively smaller coaxial connector cable;

FIG. 182 is an elevation view of the connector assembly shown in FIG. 181;

FIG. 183 is an elevation view of the connector assembly shown in FIG. 182, but showing the flexibility of the connector cable, and the capability of the connector cable to actually be tied in a knot so as to shorten the cable;

FIG. 184 is a perspective view showing a connector assembly in part, and showing the internal wire arrangement at one end of the connecting cable;

FIG. 185 is a rear, elevation view of a center connector and single-side offset connector assembly;

FIG. 186 is a plan view of the connector assembly of FIG. 185;

FIG. 187 is a left-side end view of the connector assembly of FIG. 185;

FIG. 188 is a front, elevation view of the connector assembly of FIG. 185;

FIG. 189 is a right-side end view of the connector assembly of FIG. 185;

FIG. 190 is an underside view of the connector assembly of FIG. 185;

FIG. 191 is a rear, elevation view of a further embodiment of an end connector, using a flexible connecting cable;

FIG. 192 is a plan view of the connector of FIG. 191;

FIG. 193 is a left-side end view of the connector of FIG. 191;

FIG. 194 is a front, elevation of the connector of FIG. 191;

FIG. 195 is a right-side end view of the connector of FIG. 191;

FIG. 196 is an underside view of the connector of FIG. 191;

FIG. 197 is a rear, elevation view of one embodiment of a terminal connector in accordance with the invention;

FIG. 198 is a plan view of the terminal connector in accordance with the invention;

FIG. 199 is a left-side end view of the terminal connector of FIG. 197;

FIG. 200 is a front, elevation view of the connector of FIG. 197;

FIG. 201 is a right-side end view of the connector of FIG. 197;

FIG. 202 is an underside view of the terminal connector of FIG. 197, with the connector being shown in FIGS. 197-202 with a single-side offset female connector, and a double-sided connector on an opposing side having a female connector and a male blade terminal;

FIG. 203 is a rear, elevation view of a cable connector element adapted for use with cable connector assemblies in accordance with the invention;

FIG. 204 is a plan view of the connector element of FIG. 203;

FIG. 205 is a left-side end view of the connector element of FIG. 203;

FIG. 206 is a front, elevation view of the connector element of FIG. 203;

FIG. 207 is a right-side end view of the connector element of FIG. 203;

FIG. 208 is an underside view of the connector assembly of FIG. 203;

FIG. 209 is an exploded view of an end connector in accordance with the invention, and showing the use of a flexible interconnecting cable, cable connector element, wires and connector terminal, with a housing for the end connector;

FIG. 210 is a perspective view of the end connector shown in FIG. 209;

FIG. 211 is a rear perspective view of the end connector shown in FIG. 209;

FIG. 212 is an exploded view of an end connector similar to the connector shown in FIG. 209, but using conduit;

FIG. 213 is a perspective view of the end connector of FIG. 212 in a fully assembled state;

FIG. 214 is a rear, perspective view of the end connector shown in FIG. 212;

FIG. 215 is a perspective view of an end connector assembly utilizing an interconnecting conduit cable, with two end connectors, one of the end connectors being center connect and the other end connector being a connector having a configuration as shown in FIG. 214;

FIG. 217 is a connector element having a center connect set of female connectors on one end, and a double set of male blade terminals on the opposing end;

FIG. 218 is a plan view of the connector element of FIG. 217;

FIG. 219 is a left-side end view of the connector element of FIG. 217;

FIG. 220 is a front, elevation view of the connector element shown in FIG. 217;

FIG. 221 is a right-side end view of the connector element shown in FIG. 217, and showing the pair of male connector terminal sets;

FIG. 222 is an underside view of the connector element shown in FIG. 217;

FIG. 223 is an exploded view of the various components associated with the connector element of FIG. 217;

FIG. 224 is a front, perspective view of the connector element shown in FIG. 223;

FIG. 225 is a rear, perspective view of the connector element shown in FIG. 223;

FIG. 226 is a rear, elevation view of a terminal assembly in accordance with the invention, and usable with the connector element shown in FIG. 223;

FIG. 227 is a plan view of the terminal assembly shown in FIG. 226;

FIG. 228 is a left-side end view of the connector element shown in FIG. 226, and showing the female connector;

FIG. 229 is a front, elevation view of the terminal assembly of FIG. 226;

FIG. 230 is a right-side end view of the terminal assembly of FIG. 226; and

FIG. 231 is an underside view of the terminal assembly of FIG. 226.

DETAILED DESCRIPTION OF THE INVENTION

The principles of the invention are disclosed, by way of example, within modular electrical systems which provide for various configurations of receptacle configurations and the capability of providing five circuitry, for purposes of facilitating use within environments having raceway systems and work surfaces. In addition, the principles of the invention are directed to the modular power distribution assembly with multiple circuits. These inventive principles will be described with respect to systems illustrated in FIGS. 1-231. First, some general concepts associated with modular electrical systems in accordance with the invention will be described, and thereafter detailed descriptions are included with respect to the individual types of components which may be utilized in systems in accordance with the invention. Following this description, various types of configurations of interconnection of electrical components in accordance with the invention will be described.

Figure 1:
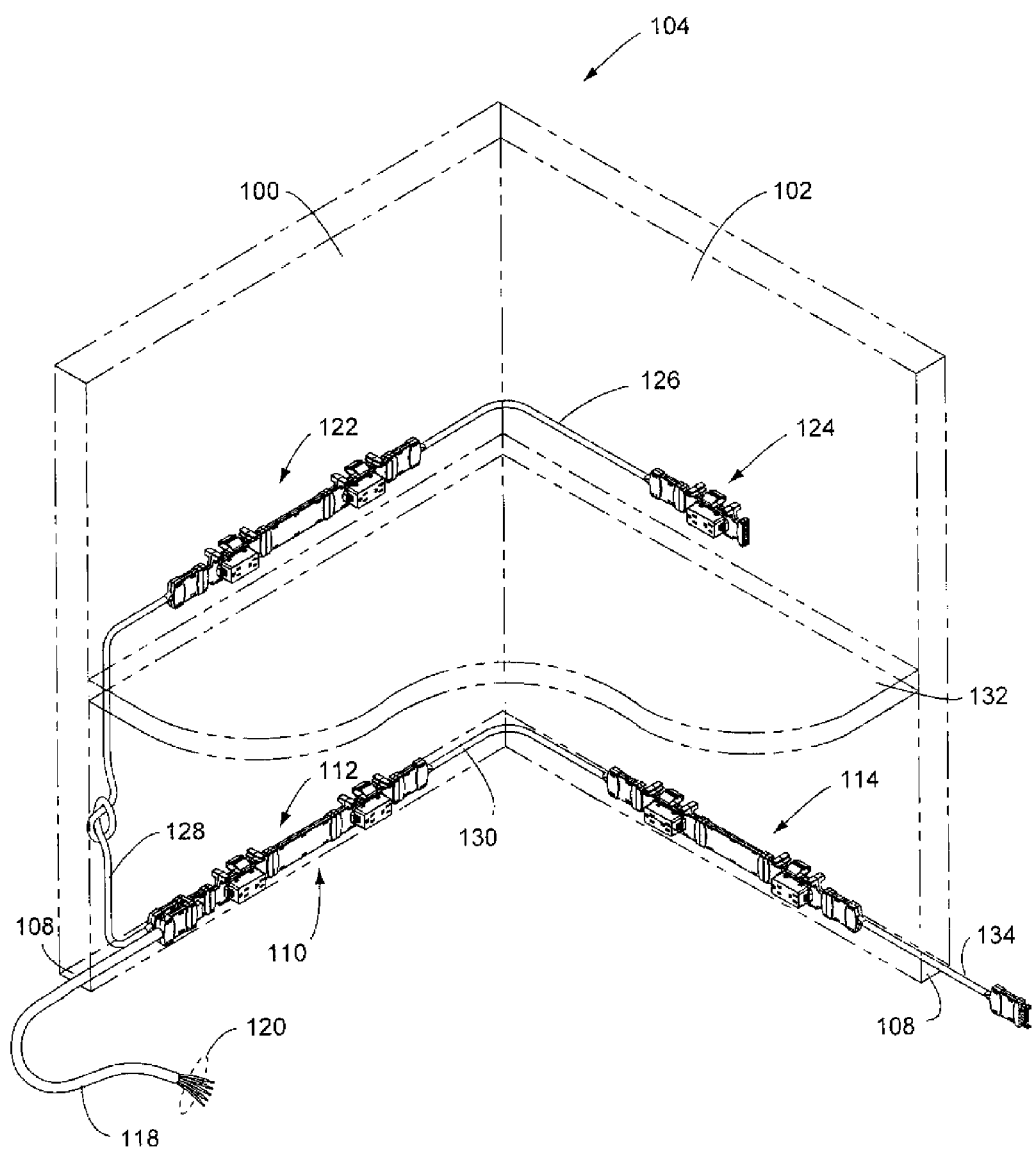
FIG. 1 is a fragmentary, perspective view of a plurality of adjacent wall panels and electrical connection assemblies arranged in the panels, with the electrical connection assemblies being part of a modular electrical system in accordance with the invention.

To provide for one example background of where modular electrical systems in accordance with the invention may be utilized, FIG. 1 illustrates a fragmentary, perspective view of a pair of adjacent modular wall panels 100, 102 of a rearrangable wall system 104. In this case, wall panel 100 is perpendicular to panel 102. Each of the wall panels includes a raceway area 108 formed along the lower edges of the wall panels 100, 102. For purposes of description, raceway covers, which would be customarily used, have been omitted from the drawing in FIG. 1 so as to better show the electrical components. The electrical components which are shown in FIG. 1 within the raceways 108 can be characterized in their entirety as a modular power distribution system 110 in accordance with the invention. It should be understood immediately that electrical systems in accordance with the invention do not consist of only a single specific configuration of electrical components. Instead, part of the invention resides in the capability of forming a substantial number of electrical component configurations in a relatively easy manner, for purposes of providing desired power distribution. Again for purposes of description, the system 110 shown in FIG. 1 is illustrated as including a first component set 112 within the raceway 108 of wall panel 100, and second component set 114 within the raceway 108 of wall panel 102. These electrical component sets 112, 114 are utilized for purposes of distributing power for facilitating use of power throughout the environment comprising the rearrangable wall system 104. In this particular case, FIG. 1 illustrates incoming power as being received only through a single power cable, namely, incoming power cable 118. Incoming power cable 118 may be connected to a source of suitable electrical power for purposes of energizing various types of application devices which may be connected to the system 110. In addition to the component sets 112, 114, the panel 100 also includes a further component set 122 mounted in the mid-section of the panel 100. In addition, a further component set 124 is interconnected to the component set 122 through an interconnecting cable 126.

In part, the power distribution system 110 may be particularly suitable for use in a five-wire electrical system, although the invention is not limited to such a five-wire system. This system may be suitable for providing electrical power when up to three separate circuits may be required. In particular, certain concepts of the system 100 in accordance with the invention are specifically directed to physical and electrical configurations which facilitate the use of the system 100 within the raceways 108 and in other areas of the panels 100, 102. Also, as subsequently described herein, power distribution systems in accordance with the invention may be suitably used with work surfaces and the like. Particularly when raceways are relatively narrow, electrical components designed for use with eight, ten or even 14 wires may be too bulky for use within the raceways. Also, such systems are inherently more expensive and comprise a waste of money and materials if three circuits may be sufficient for needs of the users. In such a five-wire system, the wire configuration would typically consist of three hot wires, a neutral wire and a ground wire. Electrical connections may be made to one of the three hot wires, dependent upon which particular circuit will be used.

Returning again to FIG. 1, the incoming power cable 118 is utilized to supply incoming power through the five-wire set 120 partially shown in FIG. 1. Although omitted from FIG. 1, the wire set 120 would be connected to a source of appropriate incoming electrical power, with the power being provided on a five-wire basis. The incoming power cable 118 would typically be a cover which is referred to as a "seal tight" cover. This type of cable would include an inner conduit, with a vinyl coating on the outside of the conduit. This type of cable is used particularly for incoming power.

As further shown in FIG. 1, the incoming power cable 118 is connected into the first component set 112. For purposes of efficiency in the description, the individual components of the set 112 will be described subsequently herein. These components will be made apparent from the subsequent description, including not only the individual components, but the means for interconnection therebetween. At this time, it may be stated that the power from the incoming power cable 118 is distributed as necessary from the component set 112. This distribution occurs through the connecting cables 126, 128 and 130. The connecting cable 130 extends between the first component set 112 and the second component set 114. The connecting cable 128 extends upwardly to the component set 122. The cable 126 connects the component set 122 to the component set 124. It should be noted that the component sets 122 and 124 can be associated with the work surface 132, which is shown in phantom line format in the same manner as the panels 100, 102. It should further be noted that for purposes of adjusting the length of the connecting cable 128, it is shown as being "knotted." To achieve this flexibility, a braided cable may be utilized. Also, it should be noted that the cables 126 and 130 are ones which are shown as being required to bend at a right angle. Again, for these types of connections, a braided cable may be utilized. Still further, another cable is shown as cable 132 extending from a far end of the component set 114 and outwardly of the panel 102. This cable is shown as being straight line, and it can be in the form of a conduit or other rigid or semi-rigid cable. It should be noted that with respect to the connecting cables 126, 128, 130 and 132, the cables can be characterized as jumper assemblies or connecting cables, and can further be described as being two-way female jumper assemblies, and that the end connectors associated therewith are female end connectors.

Example embodiments of separate components which may be utilized with the power distribution system 100 (and other distribution systems in accordance with the invention) will now be described. As will be apparent from the description and the illustrations of the drawings, the systems 110 which utilize five-wire configurations are advantageous in view of their smaller size. Such systems are capable of fitting into narrower wall panels, and also with desk systems having relatively small raceways. Still further, as will be apparent from subsequent description herein, certain components of the distribution systems in accordance with the invention utilize a "straight end" electrical connection between the receptacle blocks and junction blocks.

The configurations of power distribution systems in accordance with the invention facilitate assembly and installation, and usually can be characterized as positive latching mechanisms. In addition, for facilitating installation, and insuring proper installation, male and female connectors utilized with the systems may be keyed for purposes of correct polarization and circuitry. Still further, the keying configurations can be changed for different circuitry.

Figure 2:
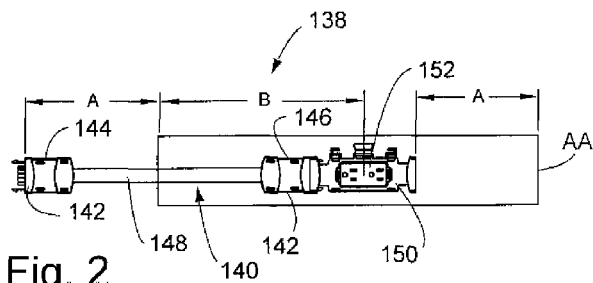
FIG. 2 is a side elevation view of a cable assembly having a predetermined length with a junction block and an end connector.
Figure 3:
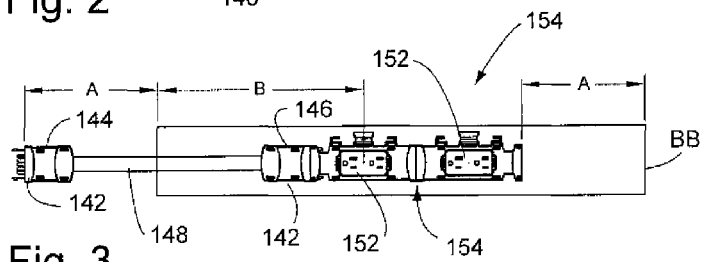
FIG. 3 is a view similar to FIG. 2, but showing a cable assembly of relatively greater length and employing two junction blocks.
Figure 4:
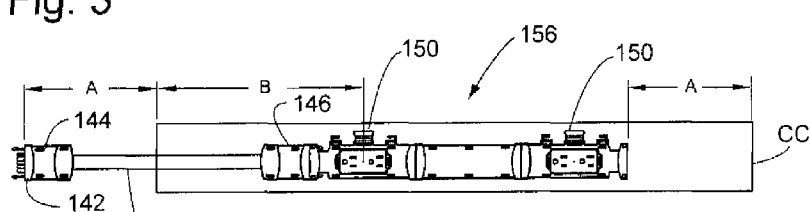
FIG. 4 is a side elevation view similar to FIGS. 2 and 3, and showing a cable configuration utilizing the cable assembly shown in FIG. 2, with a further junction block and an intermediate connector therebetween.
Figure 5:
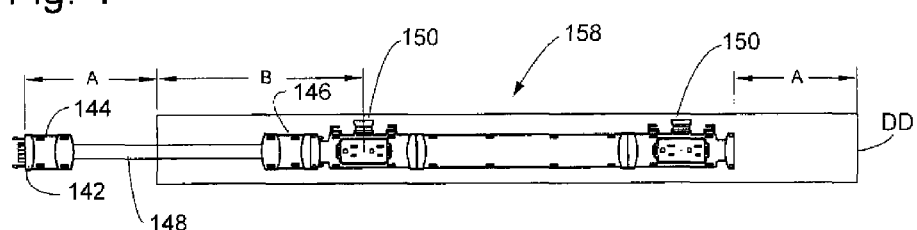
FIG. 5 is a side, elevation view of the cable assembly shown in FIG. 2, with a second junction block and an intermediate connector therebetween, with the intermediate connector having a relatively longer length than the intermediate connector shown in FIG. 4.
Figure 6:
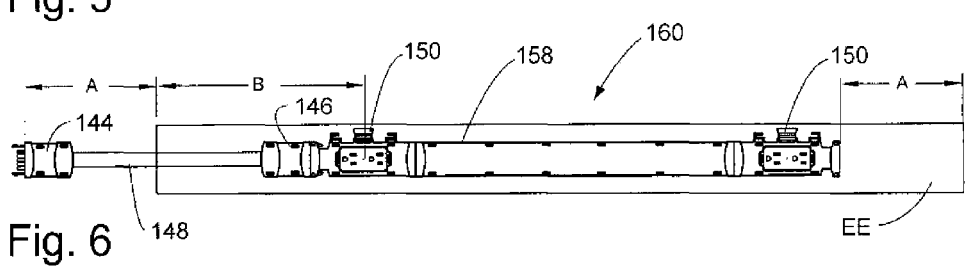
FIG. 6 illustrates the cable assembly shown in FIG. 2, with a second junction block and an intermediate connector having a relatively greater length than the connector shown in FIG. 5.

Turning again to the drawings, FIG. 2 illustrates a first panel component set 138 which can be utilized with a first length of panel. The set 138 includes a first jumper cable assembly or end connector assembly 140, with a pair of end connectors 142. The end connectors 142 include a first end connector 144 extending outwardly from the component set 138, and a second end connector 146 connected directly to a junction block 150. A jumper cable 148 extends between the first and second end connectors 144, 146, respectively. The junction block 150 is shown with a receptacle block 152 electrically connected thereto. FIG. 3 illustrates a similar configuration, but with a double junction block 154. FIG. 4 illustrates a pair of junction blocks 150, with a first junction block extender 156 therebetween. FIG. 5 illustrates the use of a second junction block extender 158, longer than the first junction block extender 156. FIG. 6 illustrates a still further third junction block extender 160.

With respect to each of FIGS. 2-6, it should be noted that the same first jumper cable assembly 140 or first panel component set 138 is utilized for each of the configurations shown in FIGS. 2-6. More specifically, the entirety of the components shown in FIGS. 2-6 can be utilized with panels of different sizes, so as to provide for different numbers of junction blocks (and connected electrical receptacle blocks), as well as to accommodate various positioning of the junction blocks. For example, the component set 138 shown in FIG. 2 is utilized with a panel have a horizontal cross-sectional area and is shown by the designation symbol AA. Correspondingly, FIG. 3 illustrates a panel BB. Panel AA includes a single junction block 150. Panel BB incorporates the double junction block 154. Correspondingly, panel CC is of a greater length, and incorporates a pair of junction blocks 150. Still further, panel DD is of an even greater length, and utilizes a pair of junction blocks 150, with the second junction block extender 158, while the panel CC uses the first junction block extender 156. In addition, FIG. 6 illustrates a cross-sectional area of panel BE, showing an even greater length, and showing a longer third junction block extender 160. In each case, it is noted that the first end connection 144 shown to the left of each of the views of FIGS. 2-6 extends the same distance A from the left side of the panel. Correspondingly, a junction block 150 (or junction block 154) is positioned exactly the same distance inwardly from the left side of the panel for each of the component sets shown in FIGS. 2-6. This distance is illustrated as distance B.

FIGS. 7-10 illustrate various types of connection assemblies which may be utilized with power distribution systems in accordance with the invention. FIG. 7 illustrates a straight connection between a set of panel component sets. FIG. 8 illustrates a 90-degree corner between panel component sets, while FIG. 9 illustrates cross-connections between four component sets. FIG. 10 illustrates a "T" connection between three component sets. FIG. 9 would be utilized with a pair of crossing panels, or a set of four panels, while FIG. 10 illustrates a connection which may be utilized with two or three panels. In each instance, power can be initially supplied from a single location, and distributed to each of the component sets.

FIGS. 11-15 illustrate various jumper cable assemblies of differing lengths, which can be utilized with panels of different lengths. In these particular instances, the jumper cable assemblies are shown as being "pass through" cable assemblies, in that they pass power from one side of a panel to another side of a panel, without any intermediate component sets. FIGS. 11-15 illustrate jumper cable assemblies of differing lengths, for use with different length panels. It should be noted that with each jumper cable assembly, the corresponding end connectors 142 will extend outwardly a distance A. This is independent of the length of the panel. The jumper cable assemblies are shown as jumper cable assemblies 168A, 168B, 168C, 168D and 168E.

Figure 11:
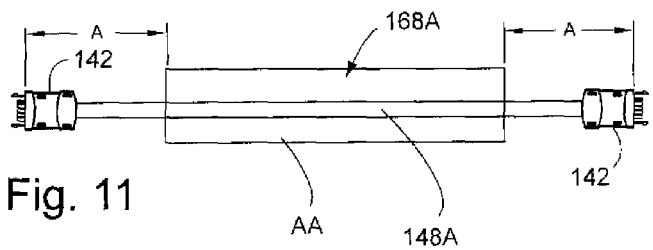
FIG. 11 shows a cable assembly in the form of a connector cable for connecting two junction blocks and having a pair of female end connectors.
Figure 12:
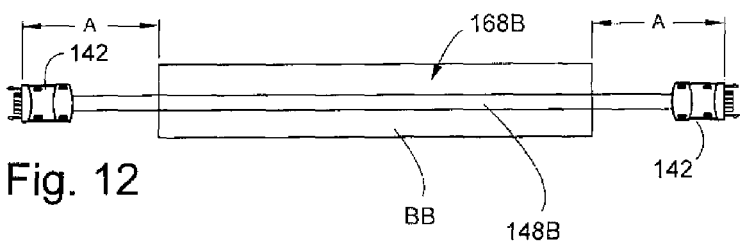
FIG. 12 illustrates a cable assembly similar to that shown in FIG. 11, but showing the cable assembly with a relatively greater length for use with a panel having a greater length.
Figure 13:
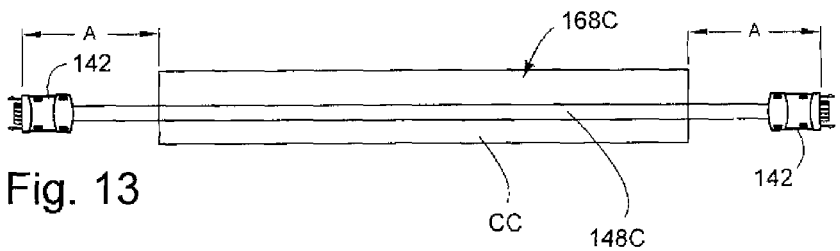
FIG. 13 illustrates a cable assembly in the form of a pass-through connector similar to the cable assemblies shown in FIGS. 11 and 12, but showing the cable assembly as having a relatively greater length, for use with a panel of greater length.
Figure 14:
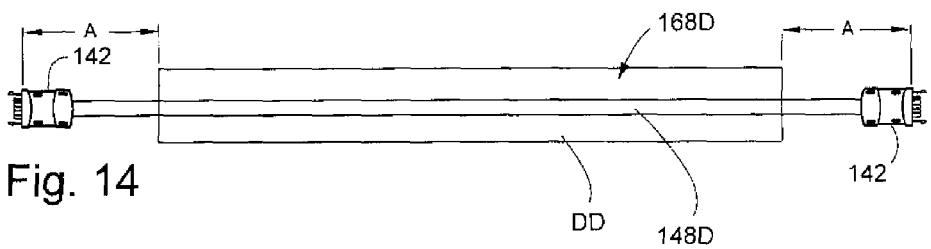
FIG. 14 is a side, elevation view of a cable assembly similar to the views of FIGS. 11, 12 and 13, and showing the cable assembly having a relatively greater length, for use with a panel of still greater length.
Figure 15:
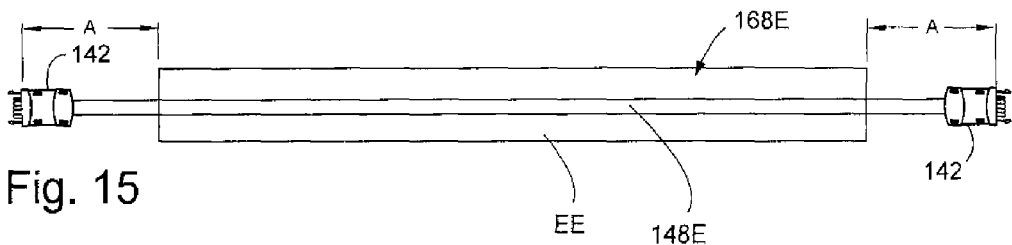
FIG. 15 illustrates a further cable assembly having a pair of female end connectors, similar to the views shown in FIGS. 11-14, but showing the connector cable as having a still further length, for use with a panel of still greater length.

More specifically, and with reference back to FIGS. 2-6, the jumper cable assembly 168A is shown as being utilized with a panel AA having a specific cross-sectional area as shown in FIG. 11. Correspondingly, the jumper cable assembly 168B is used with panel BB, and jumper cable assembly 168C is shown as being utilized with panel CC in FIG. 13. Correspondingly, jumper cable assembly 168D is shown in FIG. 14 as being used with a panel DD, and FIG. 15 illustrates the use of jumper cable assembly 168E with panel EE. Also, it is noted that each of these jumper cable assemblies 168A-168E primarily differ in the length of the jumper cables themselves. Accordingly, the jumper cable used in the assembly 168A is shown as jumper cable 148A. Assembly 168B uses jumper cable 148B, while assembly 168C uses jumper cable 148C. Still further, jumper cable assembly 168D utilizes jumper cable 148D, while jumper cable assembly 168D uses jumper cable 148E. In each case, the same end connectors 142 can be utilized.

Figure 16:
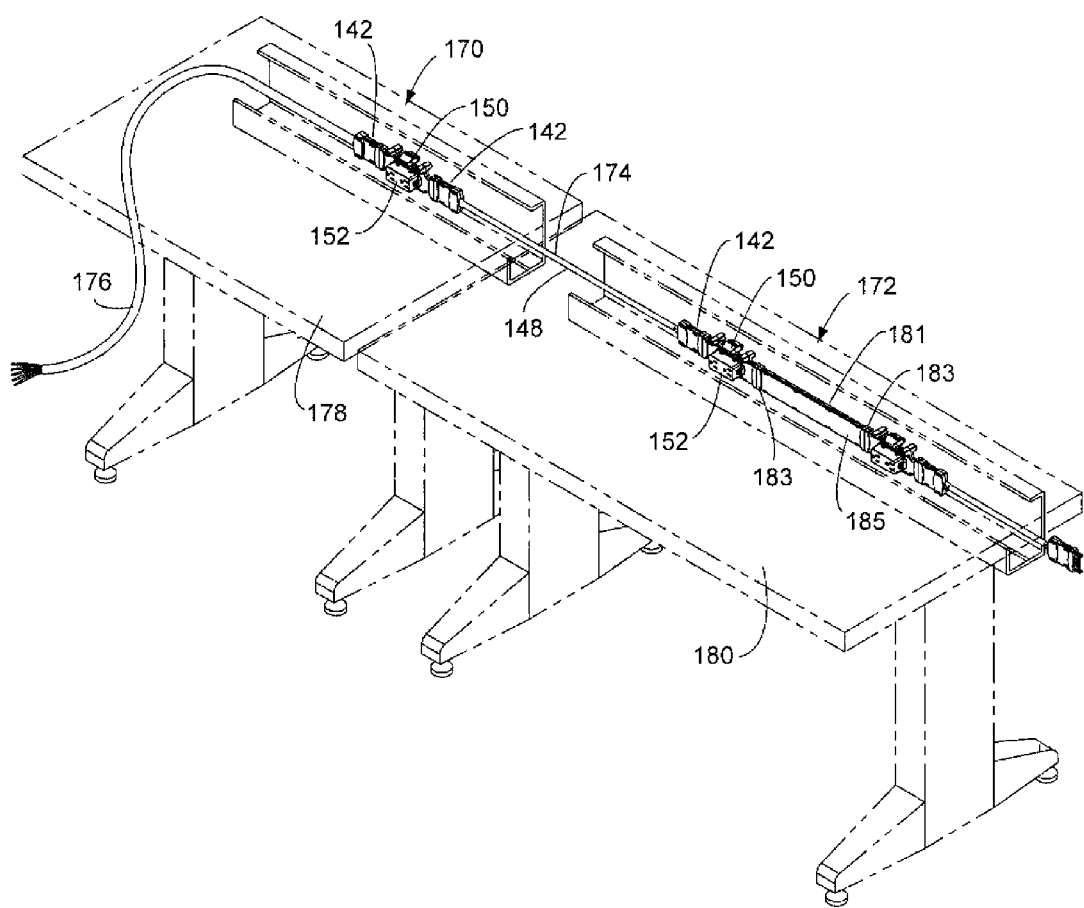
FIG. 16 is a perspective view of a cable assembly configuration in accordance with the invention, used with a pair of work surfaces.

FIG. 16 illustrates the use of power distribution systems in accordance with the invention on a pair of work surfaces 178 and 180. The incoming power supplied through the incoming power cable 176, which is connected to a first component set 170 and work surface 178. A jumper cable assembly 174 connects the first component set 170 to a second component set 172 which is mounted on the work surface 180. With reference to the first and second component sets 170, 172, and other elements associated therewith, the incoming power cable 176 can have a permanently attached female end connector 142 attached thereto. The first component set can consist of a junction block 150 having a receptacle block 152 releasably connected thereto. Correspondingly, the jumper cable assembly 174 can include a jumper cable 148, with a pair of female end connectors 142 connected at opposing ends thereof. Correspondingly, the end connector 142 shown at the far right section of the jumper cable 148 is connected to a junction block 150, having an electrical receptacle block 152 associated therewith. Somewhat different from other components previously described herein, the junction block 150 being currently referenced is connected on its right end to a bus bar connector 181. The bus bar connector 181 operates similar to the jumper cable 148, but can include a series of metallic conductors, rather than flexible wires. Each end of the bus bar connector assembly includes a female end connector 183, which can have a configuration substantially similar to the female end connectors 142 previously described herein. The female end connectors 183 of the bus bar connector assembly 181 are connected together by a bus bar 185.

FIGS. 17-20 illustrate a component set 220 having a pair of receptacle blocks 182 and a junction block 150. A pair of jumper cable assemblies 184 having end connectors 186 with female end terminals 196 are secured to opposing male end connectors 194 of the junction block 150. The receptacle blocks 182 each include female terminal sets 198 which electrically interconnect into male terminal sets 200 of the junction block 150. Each of the receptacle blocks 182 can be of various structures, including example structures as described in subsequent paragraphs herein and illustrated in the subsequent drawings herein. One such type of receptacles which may be utilized is disclosed in Byrne, U.S. Pat. No. 7,410,379, issued Aug. 12, 2008 and titled "Multiple Circuit Receptacles." The Byrne patent is commonly owned, and is incorporated herein by reference. Further, each of the electrical receptacle blocks 182 includes a pair of electrical receptacles 195, so as to form a duplex receptacle block. When plugs are inserted into the outlet receptacles 185, they are conductively connected to the female terminal sets 198.

Figure 17:
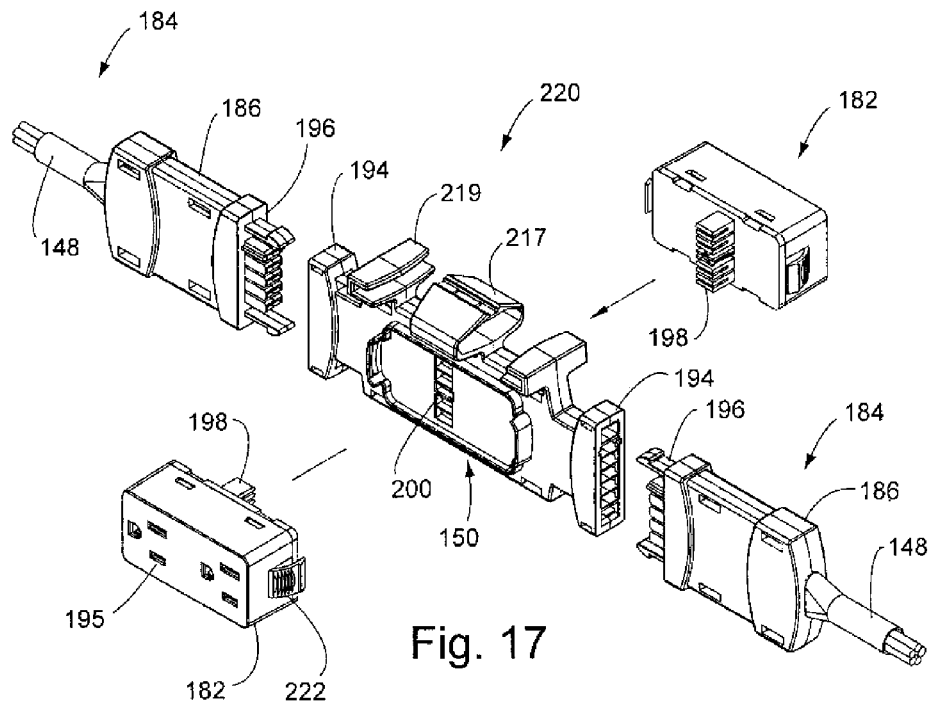
FIG. 17 is a perspective and exploded view of an assembly in accordance with the invention, showing a junction block, two receptacle blocks, and the ends of a pair of opposing connector cables utilizing a pair of female end connectors.
Figure 18:
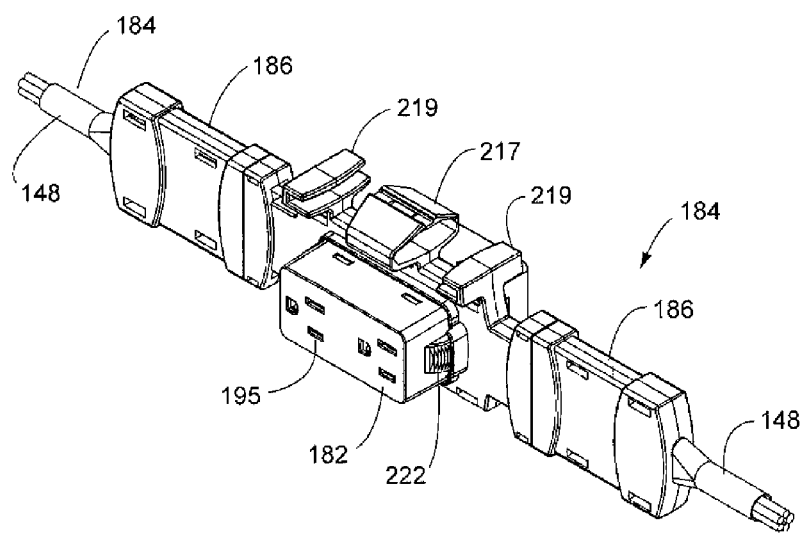
FIG. 18 illustrates the cable assembly configuration of FIG. 17 in an assembled state.
Figure 19:
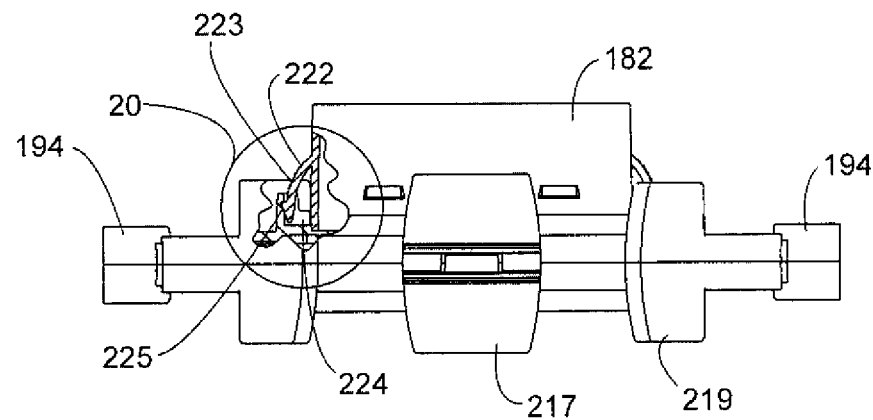
FIG. 19 is a planned and partially sectional view showing the coupling of an electrical receptacle block to a junction block.
Figure 20:
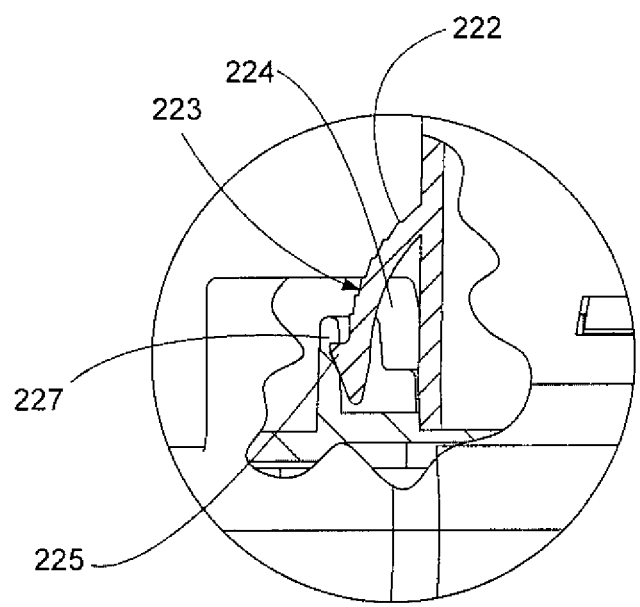
FIG. 20 is a close-up view of one side of a coupling between the electrical receptacle block and the junction block shown in FIG. 19, with the close-up view being within the circle 20 shown in FIG. 19.

As also shown in FIGS. 17-20, and primarily in FIGS. 19 and 20, the receptacle blocks 182 include a pair of beveled connectors 222 having what could be characterized as a series of notched steps 223 on the opposing sides of the receptacle block 182. At the ends of each of the connectors 222 is a lip 225. The beveled connectors 222 are flexible and curved, so as to fit into receptors 224 located on opposing sides of each side face of the junction block 150. As a receptacle block 182 is fitted into the junction block 150, the beveled connectors 222 are received within the receptors 224, as particularly shown in FIGS. 19 and 20. With this configuration, the lips 225 are essentially "captured" within the receptors 224, on ledges 227 (FIG. 20). With this capture, if a user would exert pulling forces on a receptacle block 182 so as to remove the receptacle block 182 from the junction block 150, the engagement of the lips 225 with the ledges 227 would prevent any movement. To release the receptacle block 182 from the junction block 150, forces need to be exerted laterally against the connectors 222. Such lateral forces will cause the lips 225 to be removed from the engagement with the ledges 227. With this removal of engagement, the receptacle block 182 can then be pulled away from the junction block 150.

In addition to the elements previously described herein with respect to the junction block 150, the junction block 150 can also include a central center connector 217 and a pair of upper lateral connectors 219 located at the top portion of the junction block 150, as particularly shown in FIGS. 17, 18 and 19. These connectors can connect to various elements of housing brackets or the like, for purposes of retaining the junction block 150 within raceways or other office furniture components. The use of such connectors 217, 219 is known in the art. For example, one embodiment of such connector housings is shown in Byrne, U.S. Pat. No. 5,259,787, issued Nov. 9, 1993, and titled "Mounting Assembly." The Byrne patent is commonly owned and is incorporated by reference herein. A further component set 230 is shown in FIGS. 21 and 22. The component set 230 is similar to component set 220, but includes a connector 232 having a center female connector set 234 adapted to be received by a male end connector set 194 of the junction block 150. On the opposing end of the connector 232 are a pair of spaced apart male connector sets 236. With these connector sets 236, a pair of jumper cable assemblies 184 may be connected to the end of the connector 232.

FIGS. 23, 24 and 24A illustrate a junction block 150 having a male junction block terminal set 238. FIG. 24A illustrates how the male terminal set 238 may be utilized so as to provide three separate circuits from five wires. The three separate circuits are shown in FIG. 24A. Also, FIG. 24 shows the concept of utilizing a keyed connector 240 within the male end connectors 194 of the junction block 150, so as to insure appropriate polarity and circuitry with respect to interconnection with end connectors of jumper cable assemblies and the like.

FIGS. 25, 26 and 26A illustrate a further junction block 150 being set up with a set of male junction block terminals in a set 242 and configure it so as to provide two circuits to a receptacle block 182 to be connected. Further, FIG. 26 illustrates a keyed connector 224 in a different position than the keyed connector 240 shown with respect to FIG. 24.

FIGS. 27 and 28 illustrate different types of keyed connector positions for the male end connectors 194 of the junction blocks 150. FIG. 27 shows the keyed connector as being located at the "hot-1" terminal, while the keyed connector in FIG. 28 is located on the ground terminal. FIGS. 29 and 30 illustrate the electrical interconnection of the receptacle block 182 to a junction block 150, through electrical coupling of the female terminal sets 198 of the receptacle block 182 with the male junction block terminal set 200.

FIGS. 31-36 show the individual and separate views of the junction block 150 illustrated in FIG. 23.

FIGS. 37-42 show the various views of a double junction block 154 which may be utilized in accordance with the invention. The double junction block 154 essentially consists of two of the junction blocks 150. In this manner, two separate receptacle blocks can be electrically interconnected with the junction block 154 on each side of the double junction block 154.

A different configuration is shown in FIGS. 43-48. In this configuration, a pair of junction blocks 150 are connected together, but spaced apart through the use of a junction block connector 250. The junction block connector 250 can be utilized so as to provide system component sets having junction blocks spaced apart by different distances. That is, the junction block connector 250 can be constructed so as to be of different lengths. While FIG. 49 illustrates a single junction block 150, and FIG. 50 illustrates a double junction block 154, FIGS. 51, 52 and 53 illustrate the use of junction block connectors 250 of differing lengths.

FIGS. 54-60 illustrate the assembly of a junction block 150. The assembly of the junction block 150 includes a junction block base 252 and a set of five terminal blades 256. Each of the terminal blades 256 includes a bead 258 which, as shown in FIGS. 57 and 58, can be used to assist in securing the blade terminal 256 within the junction block base 252. When the blades 26 have been inserted, a junction block cover 260 can be secured to the junction block base 252. This occurs through a series of catch mechanisms and latches 262 located on the junction block base 252 and the cover 260.

Also, FIG. 57 illustrates one of the blades 256 can be positioned so as to be longer than the other ones of the blades 256 and extend further outwardly through the corresponding male end connectors 194. This concept is particularly shown in FIGS. 59 and 60. FIG. 60 illustrates that one of the terminal blades 256 extends outwardly a distance T1 (see FIG. 60) relative to the other blades 256. This can provide for some keying, assurance of polarity and provide, if necessary, an indication of the location of a ground terminal.

FIGS. 61 and 62 illustrate the use of extended length blade terminals 264 and the assembly of the double junction block 154. FIGS. 63-67 illustrate the assembly of a pair of junction blocks 150 with a junction block connector 250 positioned therebetween, and with the use of a further set of extended length terminal blades 266. Also, FIGS. 63 and 64 illustrate the use of a nub 268 and a catch 270 located at corners of the junction block 250 and each junction block 150, respectively, for purposes of coupling together the connector 250 and the block 150. FIGS. 68-70 illustrate perspective views of various component sets utilizing a pair of the junction blocks 150 and junction block connectors 250 of differing lengths. As apparent from the prior description, each of these different embodiments would require extended terminal blades having differing lengths.

FIGS. 71-76 illustrate specific views of and example ones of the receptacle blocks 182. FIGS. 77-82 also show a receptacle block in accordance with the invention, but show a receptacle block 182, having a differing width than receptacle block 182 shown in FIGS. 71-76. FIG. 83 illustrates the receptacle block 182 as having a width W1, while the receptacle block 182A has a width of W2.

FIGS. 85 and 86 illustrate a terminal assembly 270, which may be utilized to provide for the receptacle block terminal sets 198 to be used within the receptacle blocks 182. FIGS. 87 and 88 illustrate terminal assemblies similar to assembly 270, with the assembly in FIG. 87 having a width of W3, while the assembly of FIG. 88 has a width W4. Differing terminal assemblies are shown in FIGS. 89 and 90, with the terminal assembly shown in FIG. 89 as having a length L5, and the terminal assembly shown in FIG. 90 as having a length L6. Correspondingly, the terminal assembly in FIG. 91 has a length L7, while a substantially identical terminal assembly in FIG. 92 has a length L8. FIGS. 93-95 show the complete assembly of the terminal assemblies with the receptacle block 182. FIGS. 96-101 show various female terminal set configurations 198 within various terminal blocks 182, in accordance with the invention. FIGS. 102-107 show the configuration of a terminal assembly 272, in various views, while FIGS. 108-113 show a differing terminal assembly 274. Still further, FIGS. 114-119 show a third terminal assembly 276. These terminal assemblies 270, 272 and 274 are also shown in FIGS. 120, 121 and 122, respectively.

FIGS. 123-128 show a further terminal assembly 276 having a female connector 278 on one side, and a pair of male connectors 280 on the other side. FIGS. 129-134 show a further terminal assembly 282 having one female terminal on one side, and a pair of female terminals on the other side.

The terminal assemblies 276 and 282 are shown in FIGS. 135 and 136, respectively.

FIGS. 137-146 show the capability of changing circuit configurations, based on rotation of the receptacle block 182. FIGS. 137-142 show various views of the receptacle block 182, with FIG. 137 showing a first configuration. In contrast, FIGS. 145 and 146 show the junction block rotated 180 degrees relative to the configuration shown in FIG. 137. This provides for the capability of selecting a separate circuit, without having to use a different junction block. Concepts associated with receptacles having multiple circuit configurations are disclosed in the commonly-owned Byrne U.S. Pat. No. 7,410,379 issued Aug. 12, 2008, and incorporated herein by reference.

FIGS. 147-149 illustrate the assembly of one of the receptacle blocks 182. FIGS. 150 and 151 illustrate the receptacle block 182 in one circuit configuration, while FIGS. 153 and 154 illustrate the same receptacle block 182 in a second circuit configuration, rotated 180 degrees. FIGS. 155-160 show various views of a jumper cable assembly 184 having an end connector 186. This particular jumper cable assembly 184 utilizes a conduit 300 for the cable. FIGS. 161-166 show another jumper cable assembly 184, with this jumper cable assembly utilizing a cable consisting of a vinyl coating 302. FIGS. 167-172 also show a portion of a jumper cable assembly 184, with an end connector 186. However, in this particular instance, the cable assembly 184 includes a cable which can be characterized as a braided cable 304. Such a cable is advantageous in its flexibility. FIGS. 173 and 174 show the assembly of a jumper block assembly 184 with an end connector 186 and a conduit 300. FIGS. 175 and 176 show the assembly of an end connector 186 with a vinyl coating 302 for the jumper cable. FIGS. 177 and 178 show the use of a braided cable 304 with an end connector 186, braided cable 304, and a cable connector element 306.

FIGS. 179-181 show the entirety of a jumper cable assembly 184 with the use of conduit 300, vinyl coating 302 and braided cable 304, respectively. FIGS. 182 and 183 illustrate the jumper cable 184 with the use of braided cable 304, and the capability of flexing the braided cables so as to actually tie the same into a knot to shorten the length of the cable.

FIG. 184 illustrates an end connector 186 connected to a vinyl coating 304 having incoming power wires 308.

FIGS. 185-190 show an end connector 186 of a jumper cable assembly 184, with the end connector 186 having a set of reverse male terminals 310 and using a conduit 300. The reverse terminals 310 allow the connection of another jumper cable assembly 184. FIGS. 191-196 illustrate a jumper cable assembly similar to that shown in FIGS. 185-190 but using a braided cable 304.

FIGS. 197-202 illustrate various views of a connector assembly which may be used with the end connectors shown in FIGS. 185-196. The terminal assembly is terminal assembly 312 and includes a single-sided female terminal 314 on one side, and a male terminal 316 and female terminal 318 on the opposing side.

FIGS. 203-208 illustrate various views of the connector element 306 previously described herein. The connector element 306 is used to connect a braided cable 304 to an end connector 194 of a junction block 150. FIG. 209 shows an exploded view of this assembly. FIGS. 210 and 211 show the use of the connector element 306 with an end connector corresponding to that shown in FIGS. 191-196.

Figure 216:
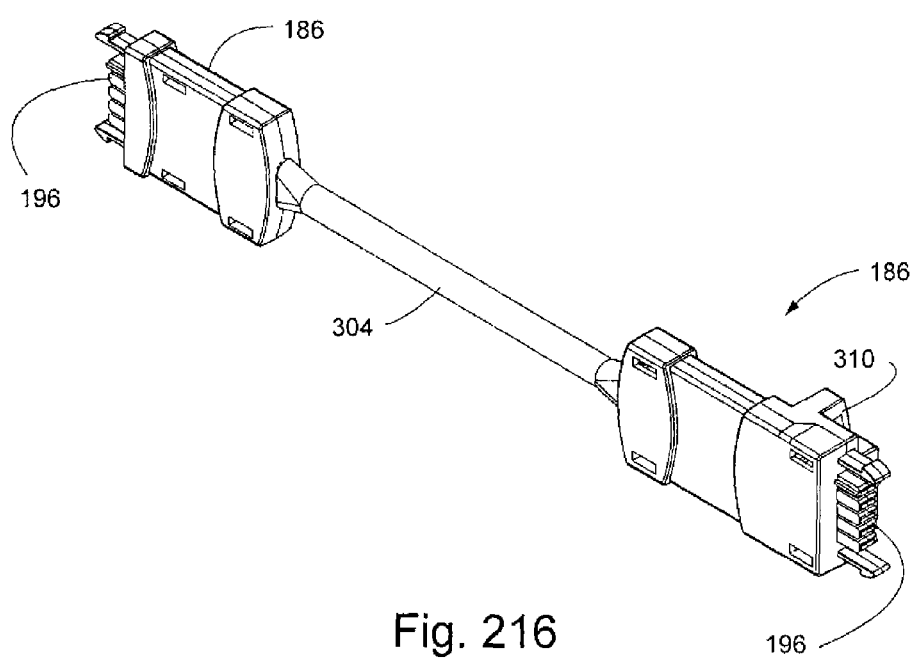

FIGS. 212-214 show the assembly of the end connector 186 and conduit 300 illustrated in FIGS. 185-190. FIGS. 215 and 216 illustrate the entirety of a jumper cable assembly 184, with the end connector 186 shown in FIGS. 213 and 214. FIG. 215 illustrates the same end connector, with a braided cable 304.

FIGS. 217-225 show a further connector assembly 340. The connector assembly 340 includes a center connect female terminal set 342 extending outwardly from one side of the connector assembly 340. Extending outwardly from the opposing side of the connector assembly 340, and shown particularly in FIG. 221, are a pair of male terminal sets 344. FIGS. 223-225 show the assembly of the connector assembly 340, with a set of terminal assemblies 346. FIGS. 226-231 show various views of one of the terminal assemblies 346. As shown therein, each terminal assembly 346 includes a female terminal as a single terminal on one end, and a pair of male terminal blades on the opposing end.

For additional information, reference can be made to a commonly-owned patent application identified as Byrne, with the application published and entitled Modular Electrical System Utilizing Four-Wire Circuitry. To the extent the Application has been published, the Application is incorporated by reference herein.

It will be apparent to those skilled in the pertinent arts that still other embodiments of electrical assemblies in accordance with the invention can be designed. That is the principles of an electrical assembly in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The invention claimed is:

1. A power distribution assembly adapted for use with multiple circuits, said assembly comprising:

an incoming power cable connectable to a source of electrical power;

a first jumper cable assembly having a first end connector physically and electrically connected to said incoming power cable, a second end connector having a set of female electrical terminals, and a jumper cable physically and electrically connected between said first end connector and said second end connector;

a junction block releasably, physically and electrically connectible to said second end connector;

a first electrical receptacle block releasably connectable to said junction block;

a second electrical receptacle block releasably connectable to said junction block;

said junction block providing for reception and transmission of electrical power on at least two electrical circuits, and adapted to electrically receive a receptacle block connectible to said first circuit, and a second receptacle block connectible to said second circuit;

said junction block adapted to receive five wires or cables therein, with said five wires or cables carrying said two electrical circuits and arranged so that end connectors connected to said five wires or cables are configured in a straight line vertical orientation; and said end connectors are keyed so as to prohibit inadvertent misconnections and said first electrical receptacle block is releasably connected to a first side of said junction block, and said second electrical receptacle block is releasably connected to an opposing side of said junction block.

* * * * *